(12) United States Patent
Lee et al.

(10) Patent No.: US 9,948,416 B2
(45) Date of Patent: Apr. 17, 2018

(54) BROADCAST RECEIVING DEVICE AND OPERATING METHOD THEREOF

(71) Applicant: LG ELECTRONICS INC., Seoul (KR)

(72) Inventors: Jinwon Lee, Seoul (KR); Seungryul Yang, Seoul (KR); Woosuk Ko, Seoul (KR); Sungryong Hong, Seoul (KR); Minsung Kwak, Seoul (KR); Woosuk Kwon, Seoul (KR); Sejin Oh, Seoul (KR); Kyoungsoo Moon, Seoul (KR); Seungjoo An, Seoul (KR); Jungwook Park, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/114,348

(22) PCT Filed: Jan. 29, 2015

(86) PCT No.: PCT/KR2015/000984
§ 371 (c)(1),
(2) Date: Jul. 26, 2016

(87) PCT Pub. No.: WO2015/115842
PCT Pub. Date: Aug. 6, 2015

(65) Prior Publication Data
US 2017/0012725 A1   Jan. 12, 2017

Related U.S. Application Data

(60) Provisional application No. 62/040,425, filed on Aug. 22, 2014, provisional application No. 61/935,324, filed on Feb. 3, 2014.

(51) Int. Cl.
*H04N 21/472* (2011.01)
*H04N 21/81* (2011.01)
(Continued)

(52) U.S. Cl.
CPC ............ *H04H 20/59* (2013.01); *H04H 20/08* (2013.01); *H04H 60/90* (2013.01);
(Continued)

(58) Field of Classification Search
CPC .. H04N 21/2387; H04N 21/242; H04N 21/63; H04N 21/4126; H04N 21/8106;
(Continued)

(56) References Cited

U.S. PATENT DOCUMENTS

| 6,097,441 A | 8/2000 | Allport |
| 2005/0110909 A1 | 5/2005 | Staunton et al. |

(Continued)

FOREIGN PATENT DOCUMENTS

| CN | 101150714 A | 3/2008 |
| CN | 101388782 A | 3/2009 |

(Continued)

*Primary Examiner* — Pankaj Kumar
*Assistant Examiner* — Alazar Tilahun
(74) *Attorney, Agent, or Firm* — Birch, Stewart, Kolasch & Birch, LLP

(57) ABSTRACT

An apparatus for processing a hybrid broadcast service, the apparatus comprising a reception module for receiving broadcast signals though a broadcast channel or contents through a broadband channel for the hybrid broadcast service, wherein the broadcast signals include data for the hybrid broadcast service and an EAM (Emergency Alert message) and a processor for receiving a request from a companion device and sending at least one of a content or continuous components or files or data or media timeline information of the EAM (Emergency Alert message) based on the request, wherein the continuous components or the (Continued)

files or the data are a part of the hybrid broadcast service which is currently selected.

18 Claims, 43 Drawing Sheets

(51) Int. Cl.
  *H04N 21/61* (2011.01)
  *H04H 20/59* (2008.01)
  *H04H 20/08* (2008.01)
  *H04H 60/90* (2008.01)
  *H04N 21/41* (2011.01)
  *H04N 21/439* (2011.01)
  *H04N 21/44* (2011.01)
  *H04N 21/858* (2011.01)
  *H04N 21/431* (2011.01)
  *H04N 21/436* (2011.01)
  *H04N 21/4722* (2011.01)

(52) U.S. Cl.
  CPC ..... *H04N 21/4122* (2013.01); *H04N 21/4316* (2013.01); *H04N 21/4394* (2013.01); *H04N 21/43615* (2013.01); *H04N 21/44008* (2013.01); *H04N 21/4722* (2013.01); *H04N 21/6112* (2013.01); *H04N 21/6118* (2013.01); *H04N 21/6125* (2013.01); *H04N 21/814* (2013.01); *H04N 21/858* (2013.01); *H04N 21/8586* (2013.01)

(58) Field of Classification Search
  CPC ............. H04N 21/8545; H04N 21/814; H04N 21/44008; H04N 21/4882; H04N 21/6118; H04N 21/6125; H04N 21/6405; H04N 21/858; H04N 7/08; H04H 20/18; H04H 2201/37; H04H 60/90
  See application file for complete search history.

(56) References Cited

U.S. PATENT DOCUMENTS

| | | |
|---|---|---|
| 2010/0169504 A1 | 7/2010 | Gabin et al. |
| 2012/0089923 A1 | 4/2012 | Pettit et al. |
| 2013/0031581 A1 | 1/2013 | Narasimhan et al. |
| 2013/0055323 A1 | 2/2013 | Venkitaraman et al. |
| 2013/0173826 A1 | 7/2013 | Kim et al. |
| 2013/0247094 A1* | 9/2013 | Hardin ............... H04N 21/2385 725/33 |
| 2013/0305305 A1 | 11/2013 | Park et al. |
| 2013/0344798 A1 | 12/2013 | Walker et al. |
| 2014/0040424 A1* | 2/2014 | Keum ................. H04L 67/10 709/217 |
| 2014/0215535 A1* | 7/2014 | Elliott ............... H04N 21/2387 725/81 |

FOREIGN PATENT DOCUMENTS

| | | |
|---|---|---|
| CN | 102508602 A | 6/2012 |
| CN | 103428533 A | 12/2013 |
| EP | 2 482 550 A2 | 8/2012 |
| JP | 2010-4344 A | 1/2010 |
| JP | 2010-171896 A | 8/2010 |
| KR | 10-2013-0117778 A | 10/2013 |
| KR | 10-2014-0004131 A | 1/2014 |
| WO | 2013/061525 A1 | 5/2013 |

\* cited by examiner

[Fig. 1]
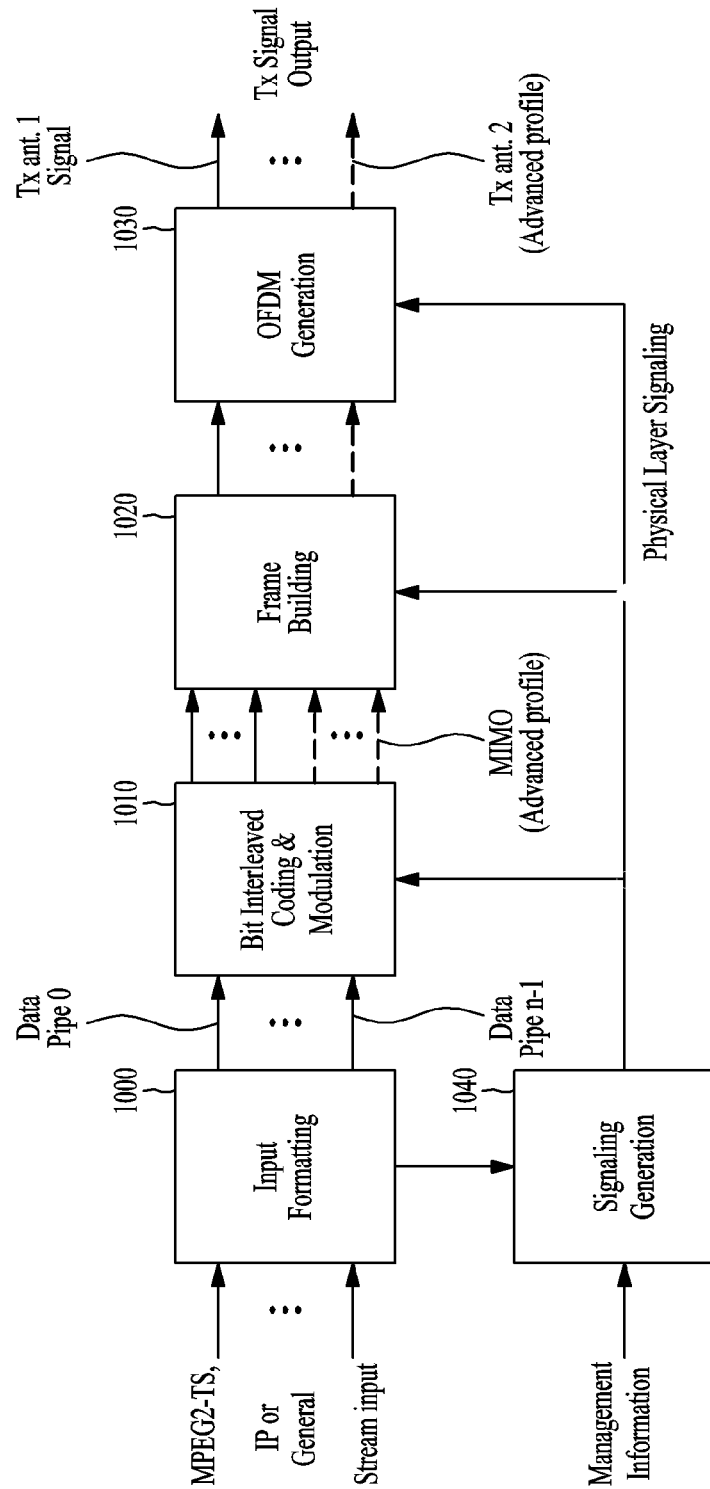

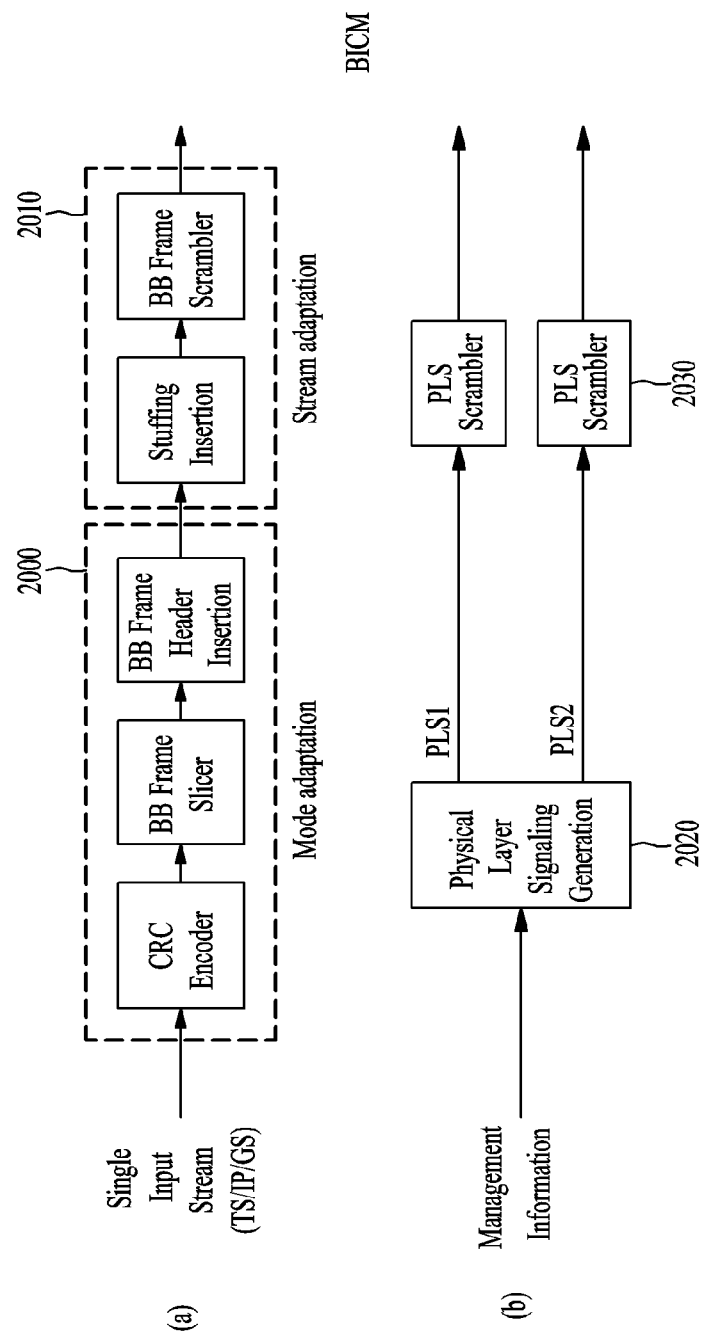
[Fig. 2]

[Fig. 3]
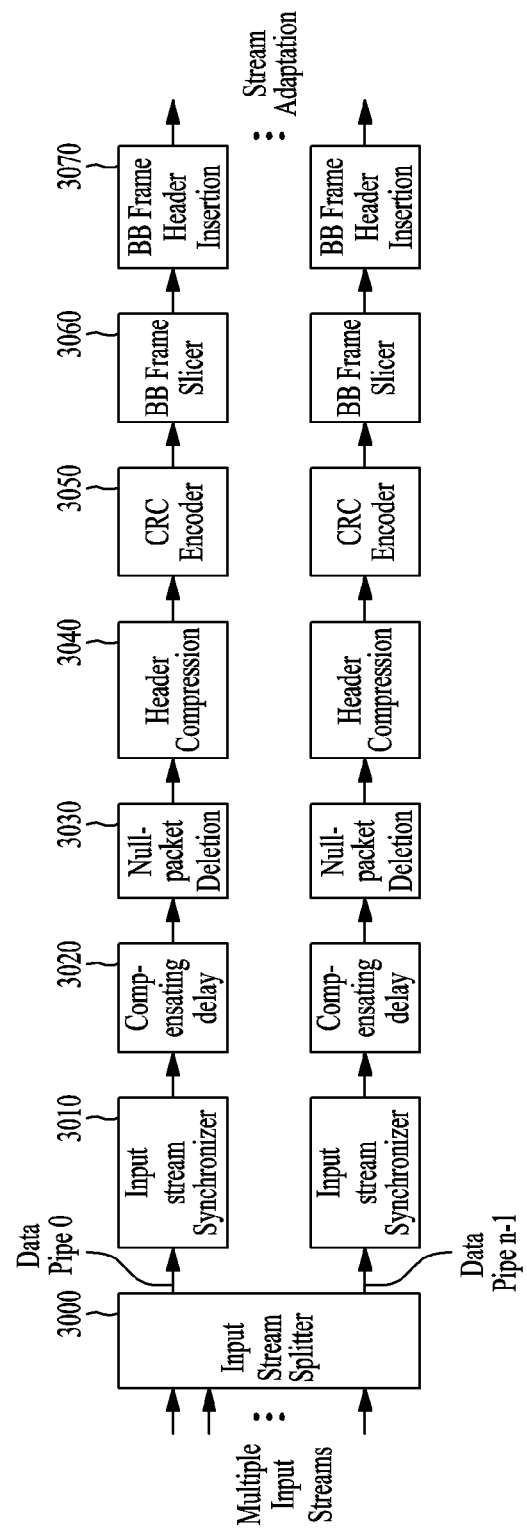

[Fig. 4]
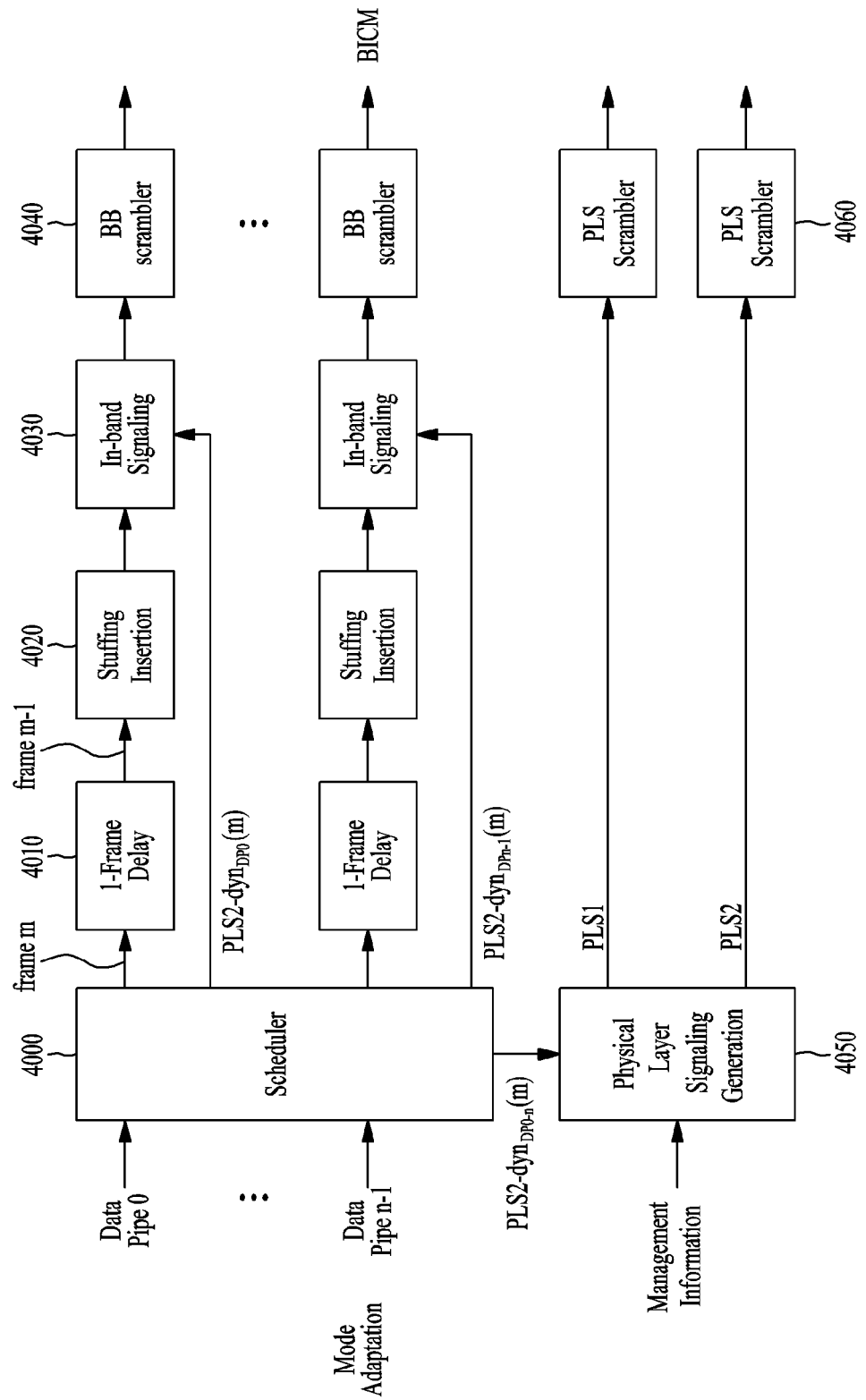

[Fig. 5]
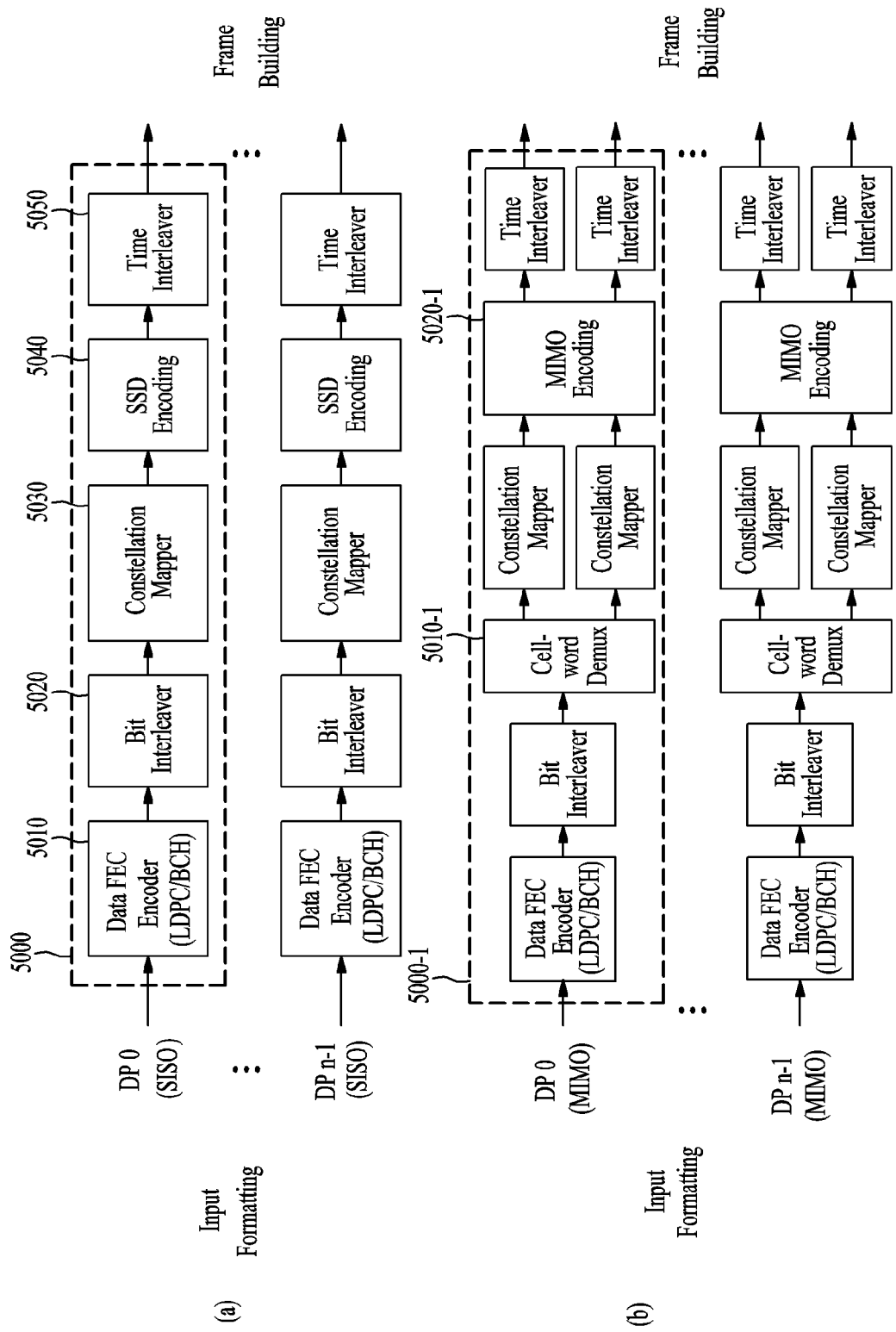

[Fig. 6]
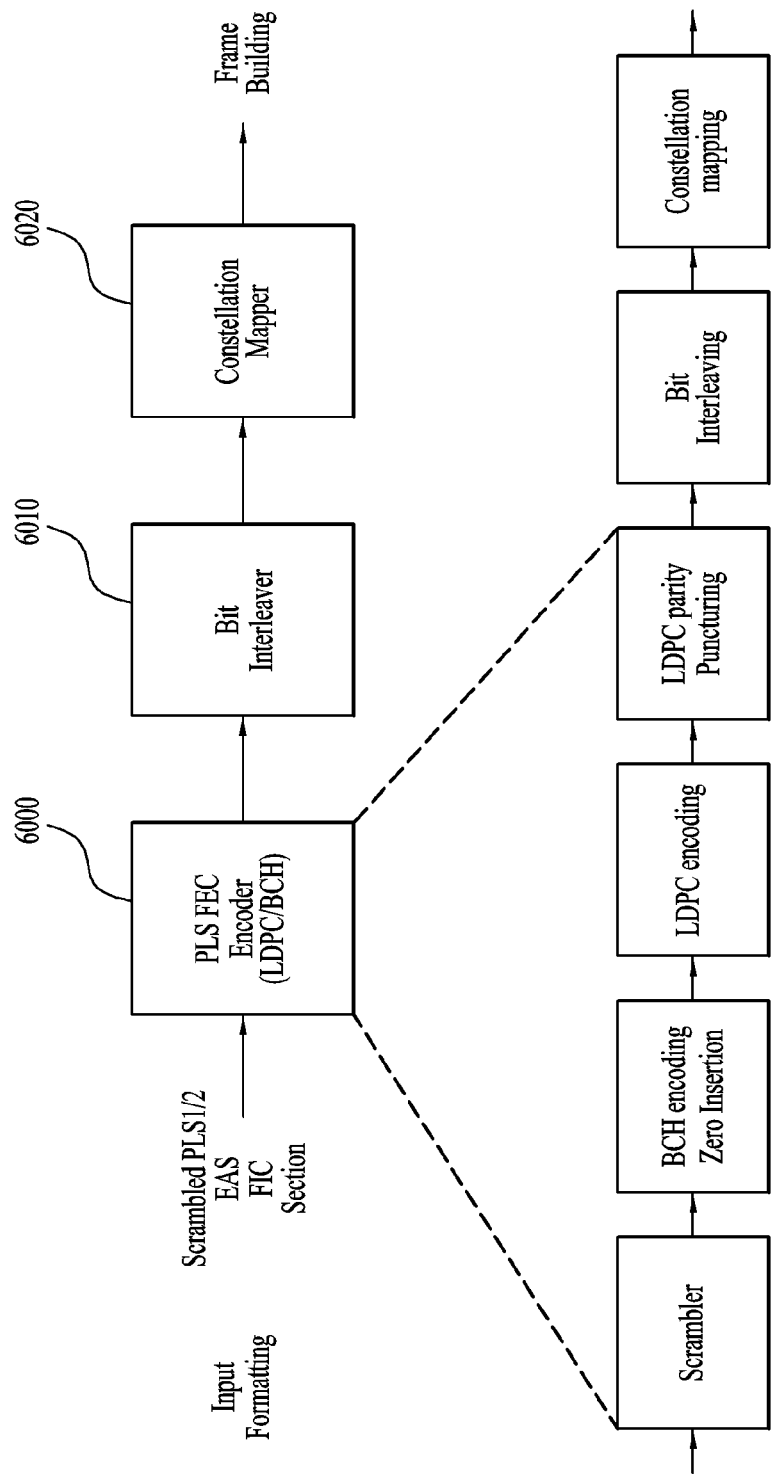

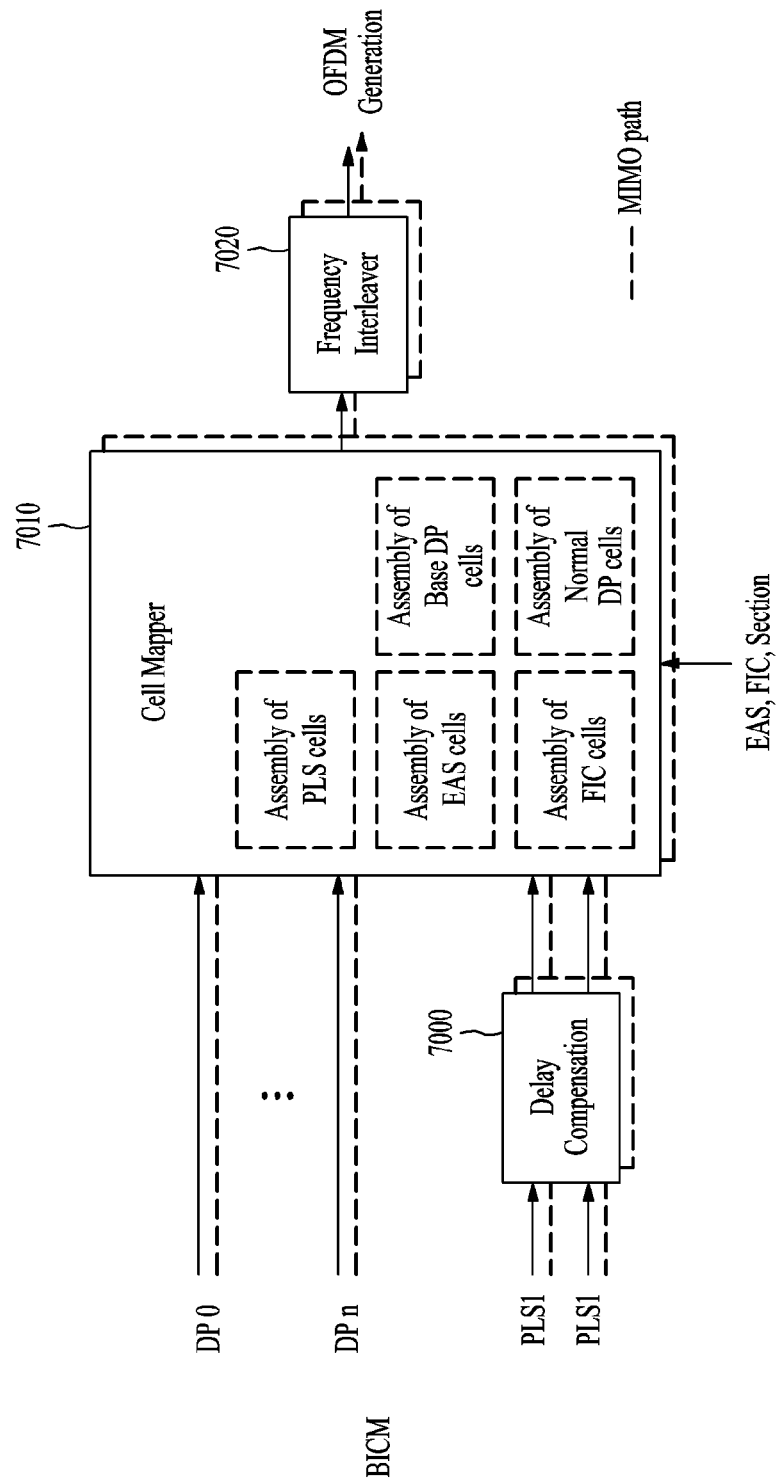
[Fig. 7]

[Fig. 8]
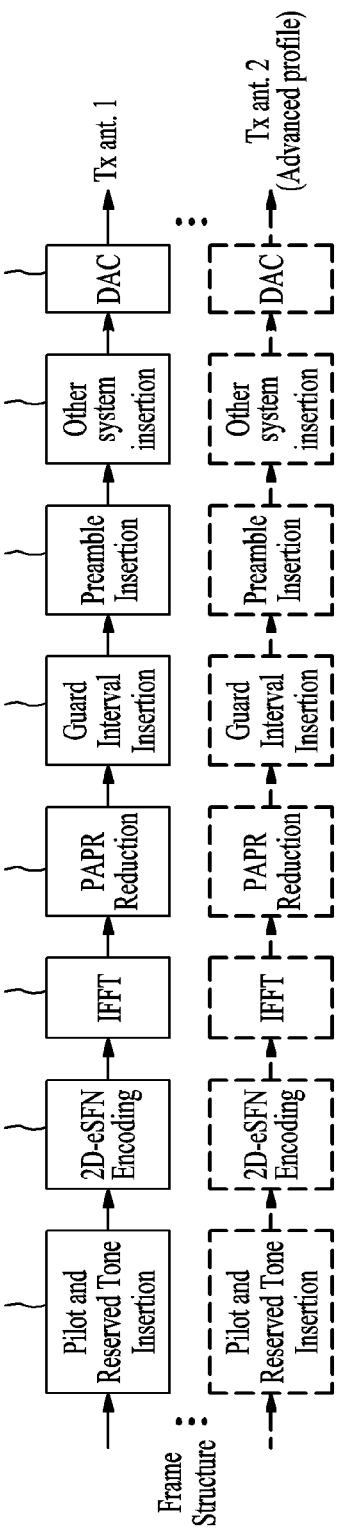

[Fig. 9]
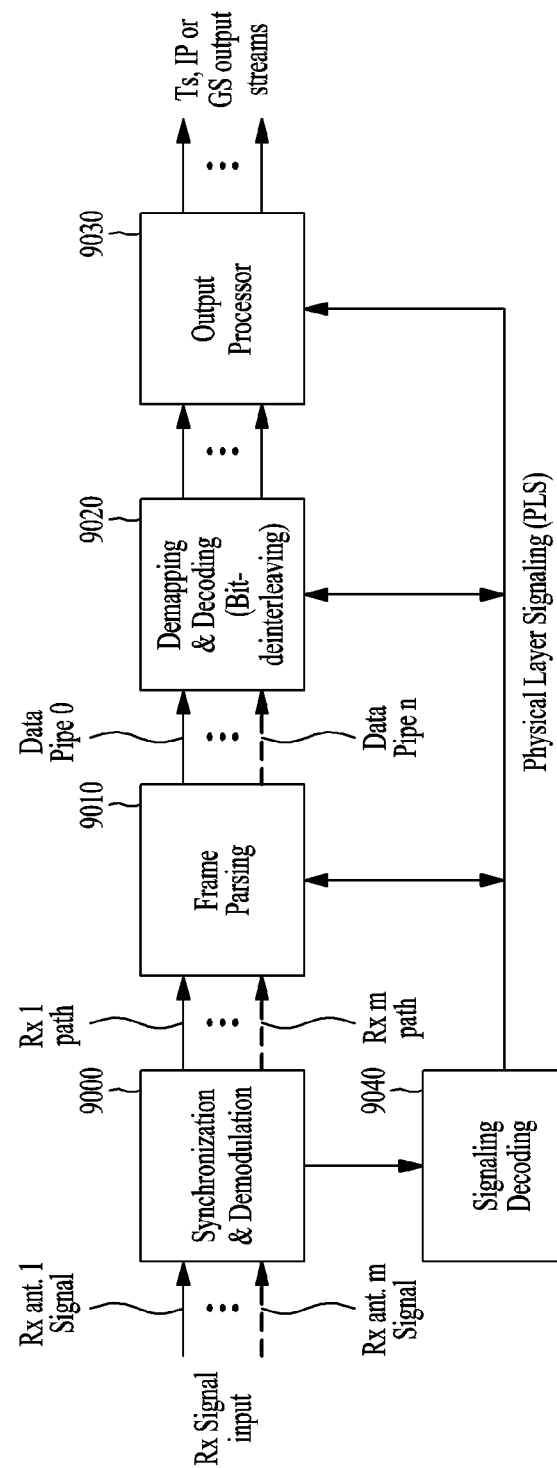

[Fig. 10]
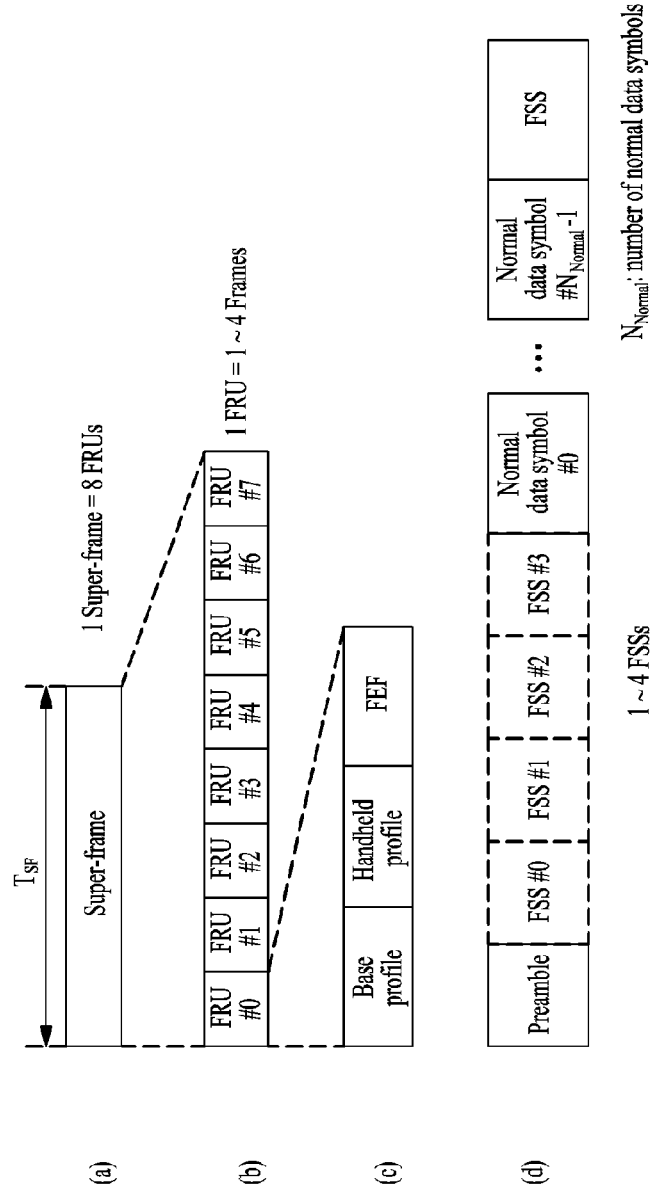
[Fig. 11]
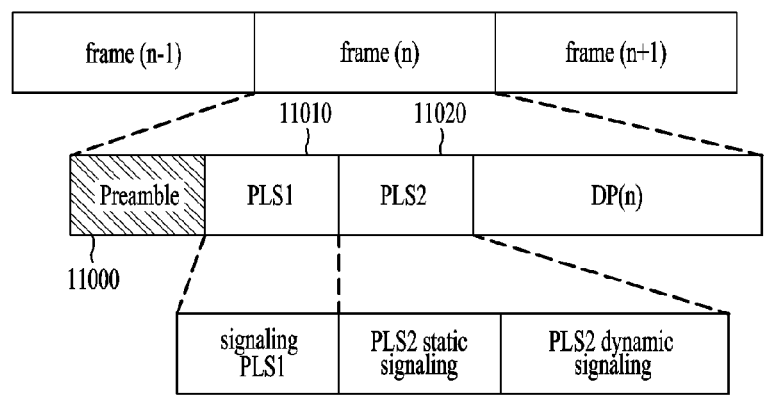

[Fig. 12]

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Fig. 13]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Fig. 14]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE = = TS('00') | |
|         DNP_MODE | 2 |
|         ISSY_MODE | 2 |
|         HC_MODE_TS | 2 |
|         if HC_MODE_TS = = '01' or '10' | |
|             PID | 13 |
|         end | |
|     if DP_PAYLOAD_TYPE = = IP('01') | |
|         HC_MODE_IP | 2 |
|     end | |
|     RESERVED | 8 |
| end | |
| if FIC_FLAG = = 1 | |
|     FIC_VERSION | 8 |
|     FIC_LENGTH_BYTE | 13 |
|     RESERVED | 8 |
| end | |
| if AUX_FLAG = = 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

[Fig. 15]
| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1:NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG = 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |
[Fig. 16]

[Fig. 17]
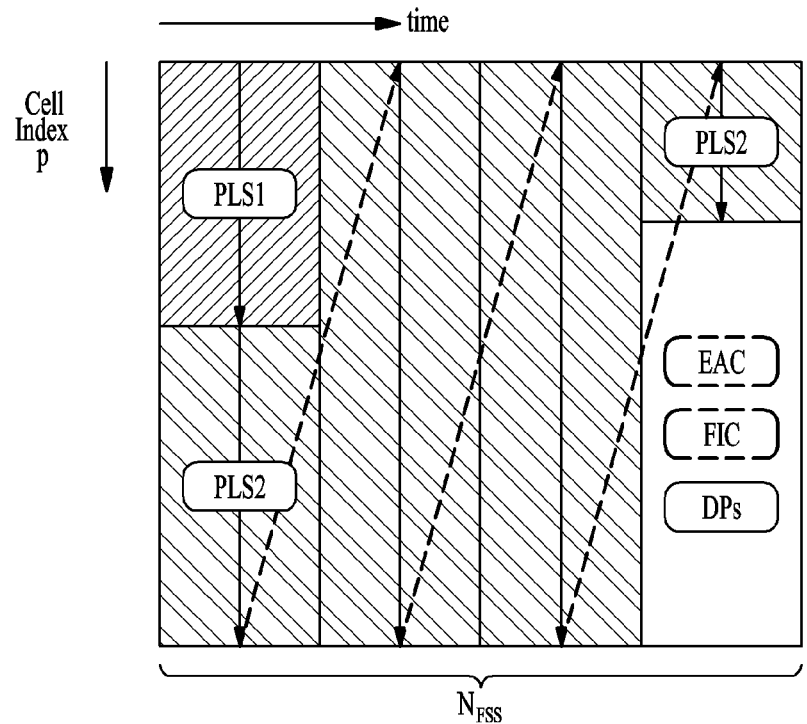
[Fig. 18]
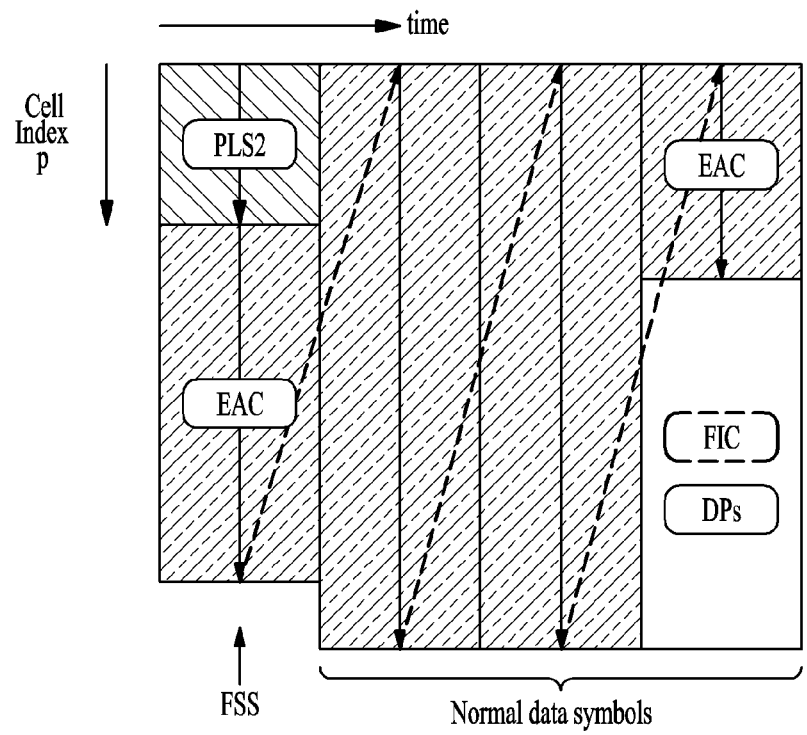

[Fig. 19]
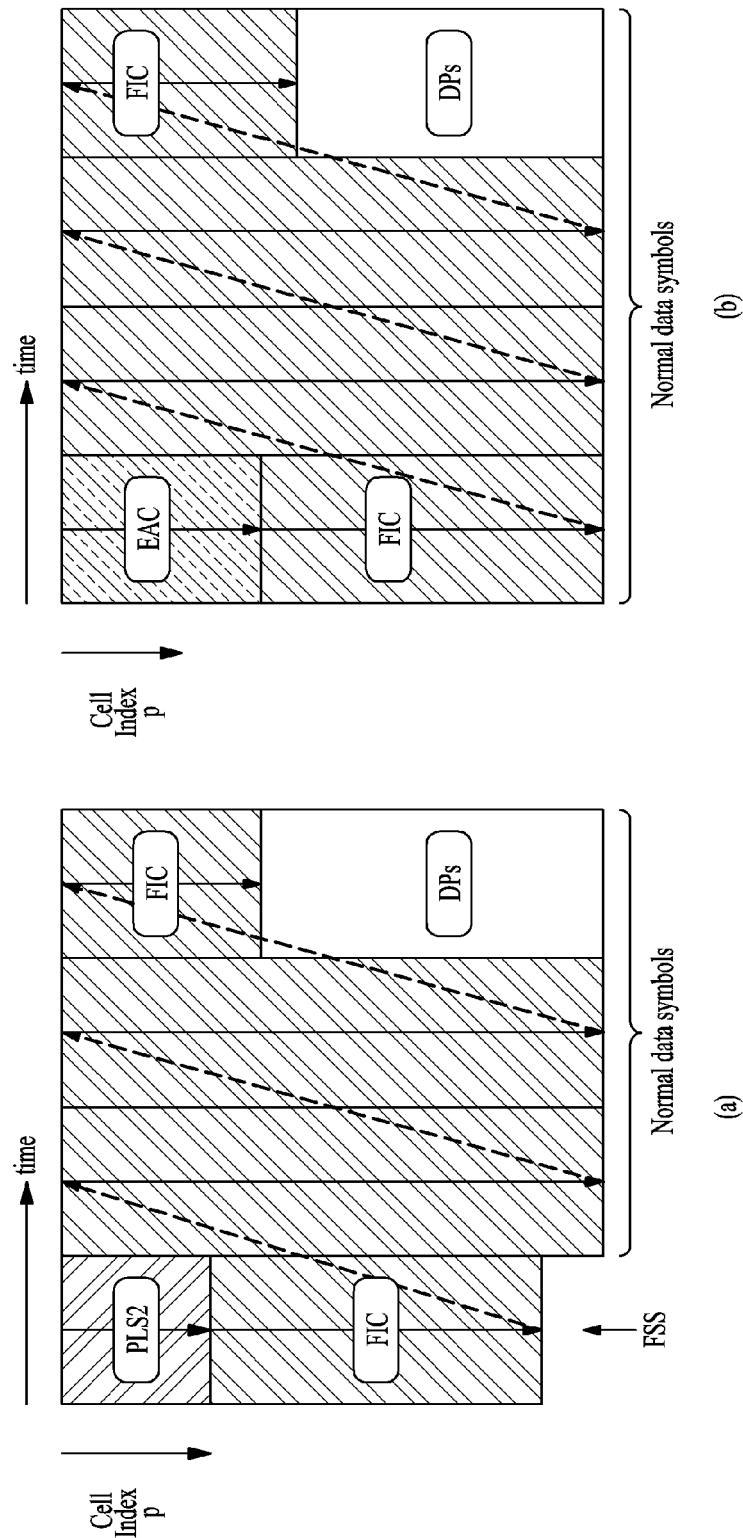

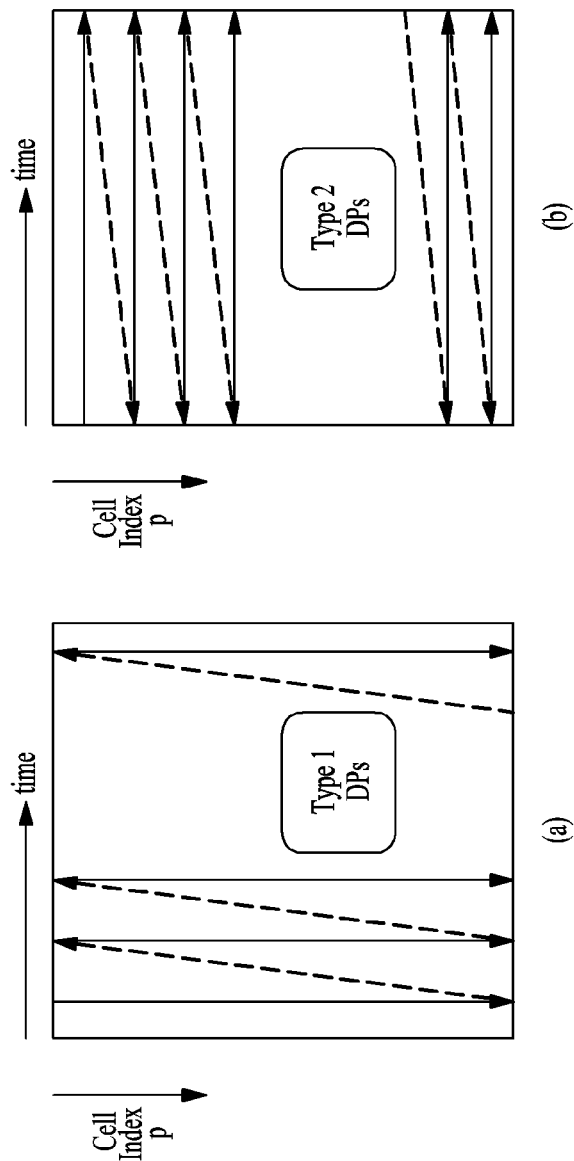
[Fig. 20]

[Fig. 21]
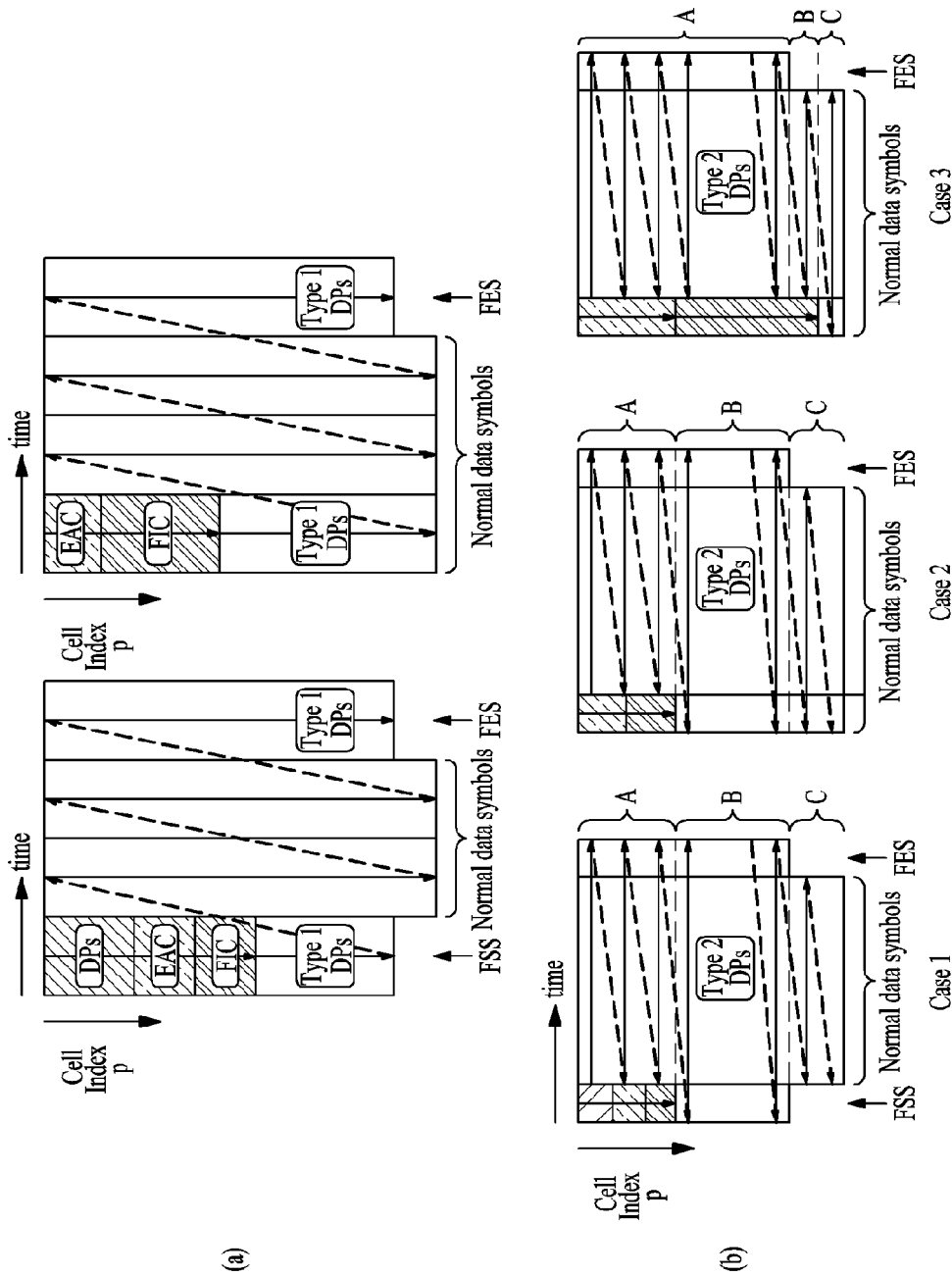
[Fig. 22]
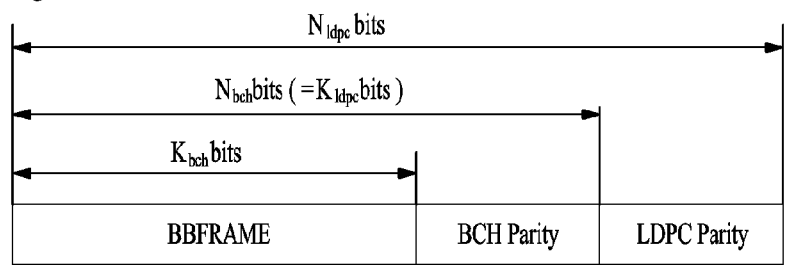

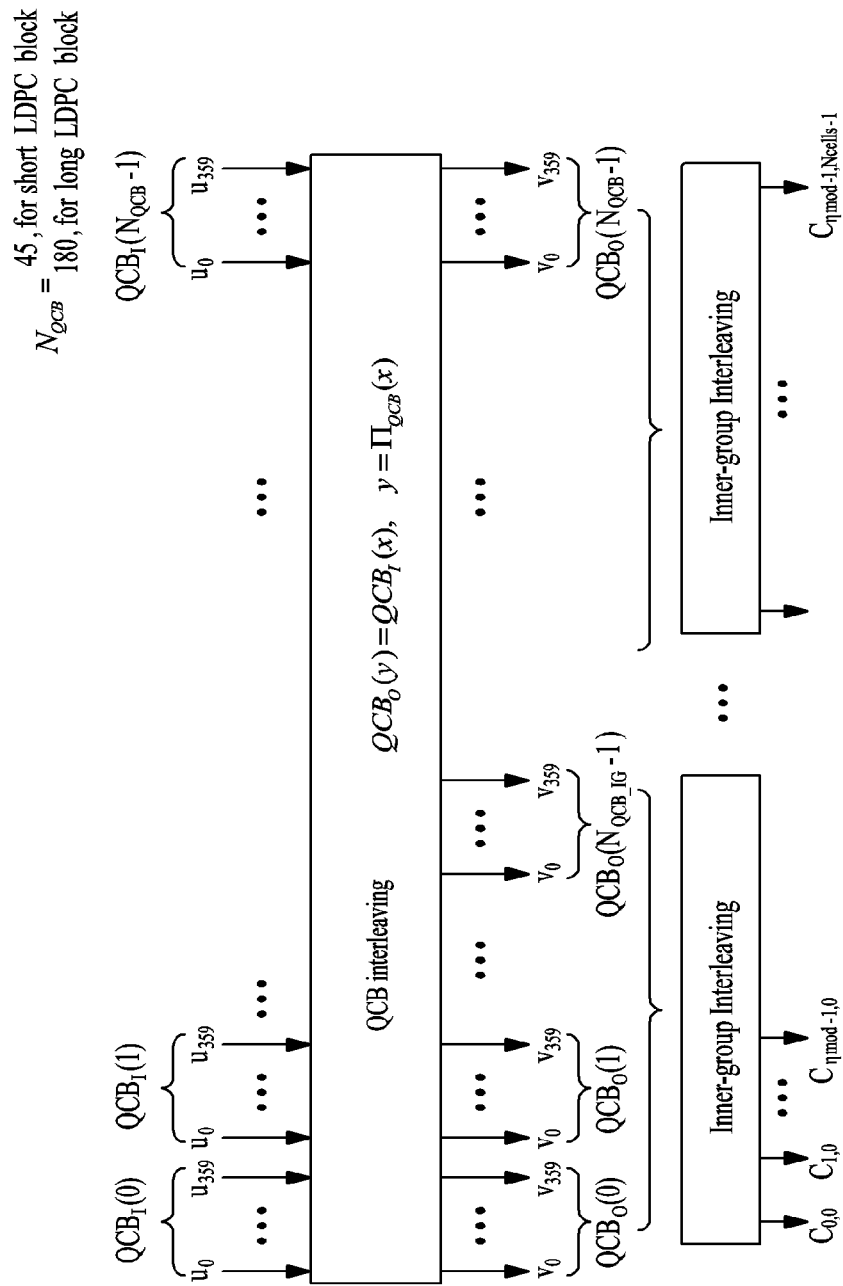
[Fig. 23]

[Fig. 24]
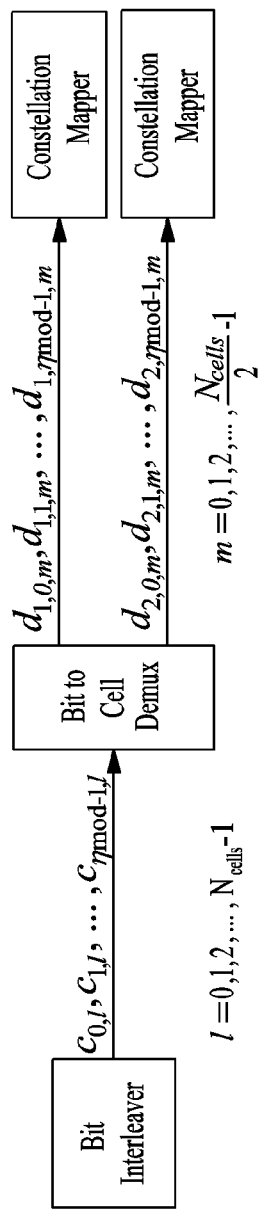
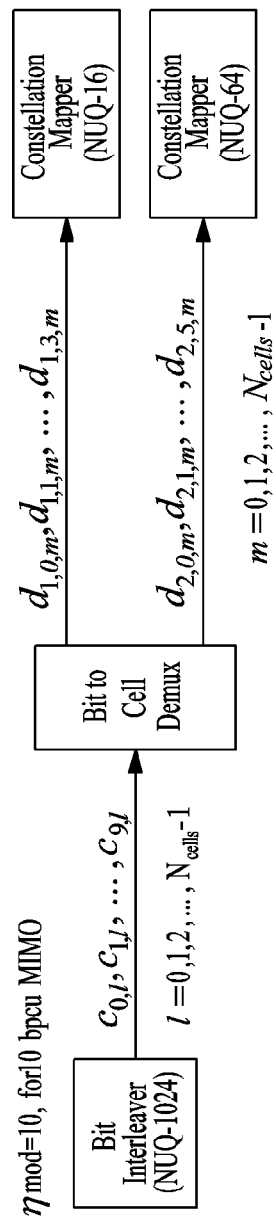

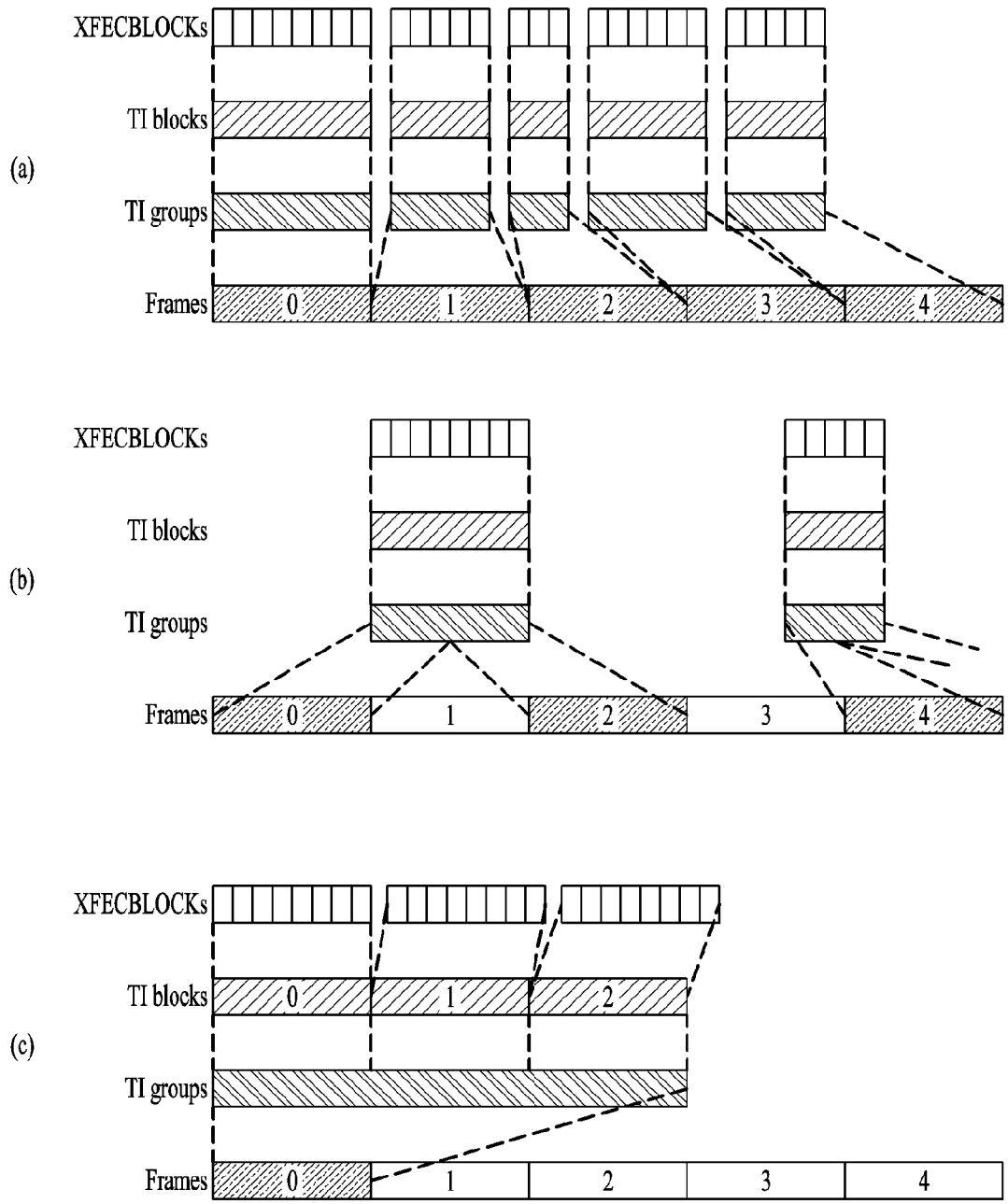
[Fig. 25]

[Fig. 26]
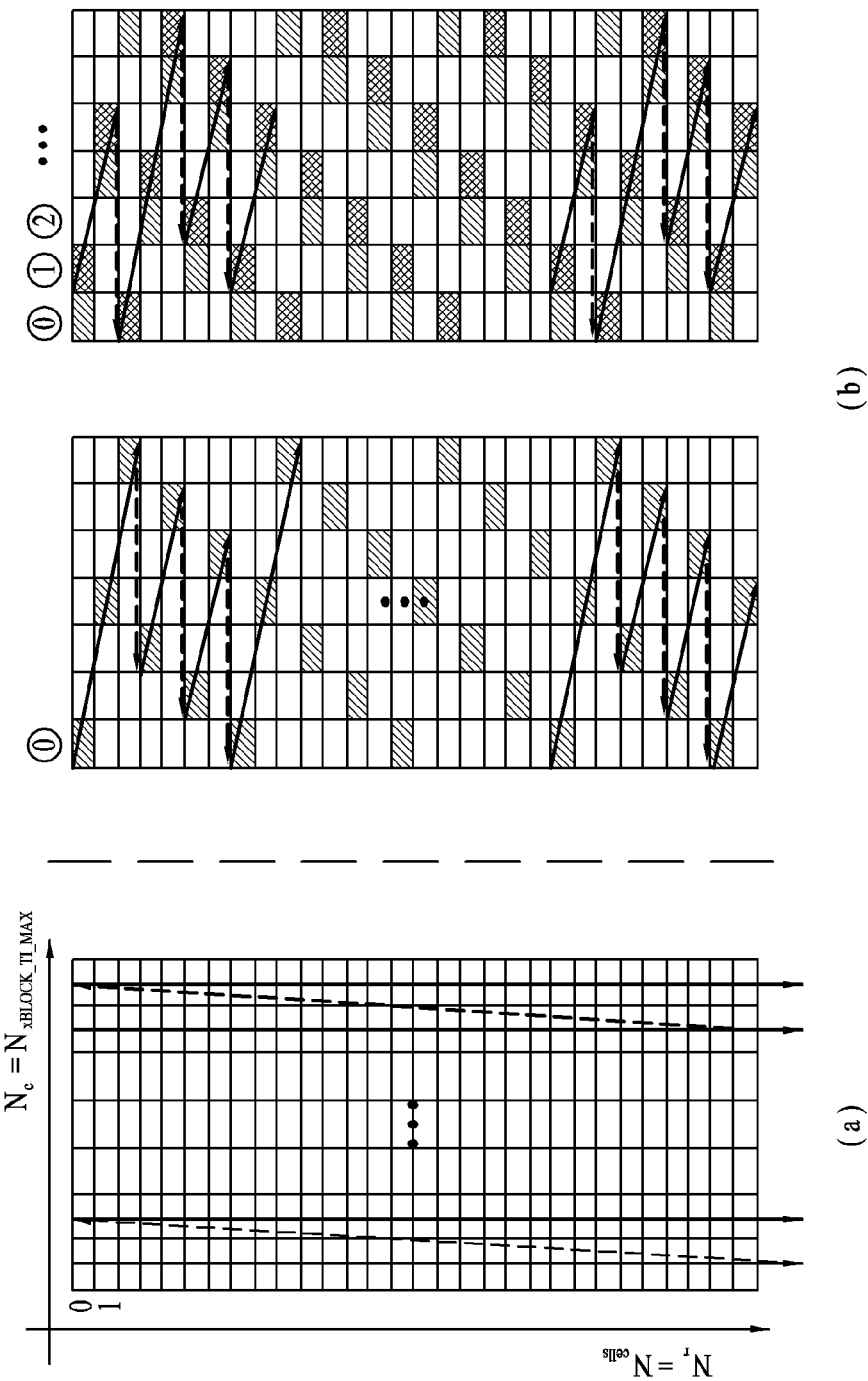

[Fig. 27]
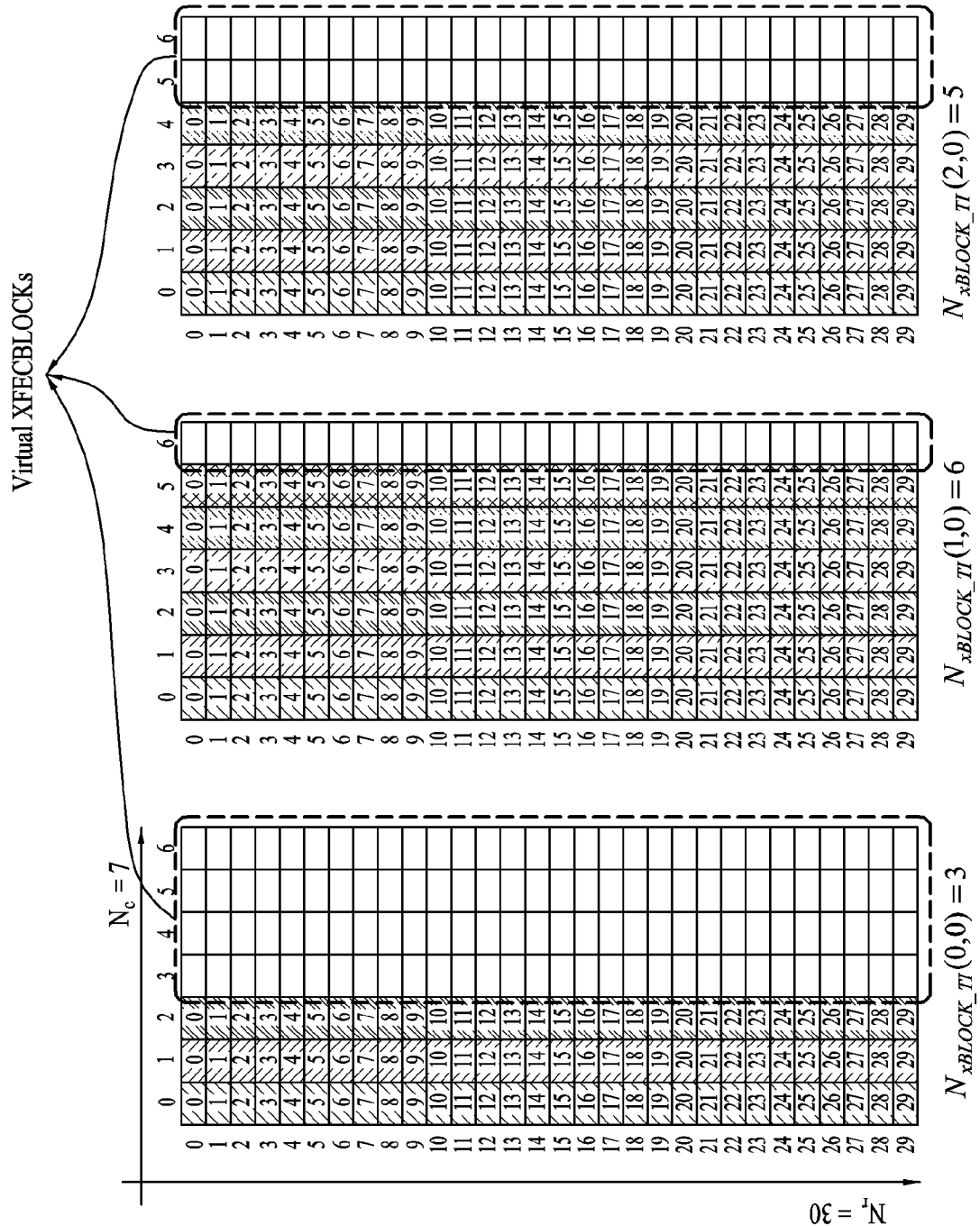

[Fig. 28]
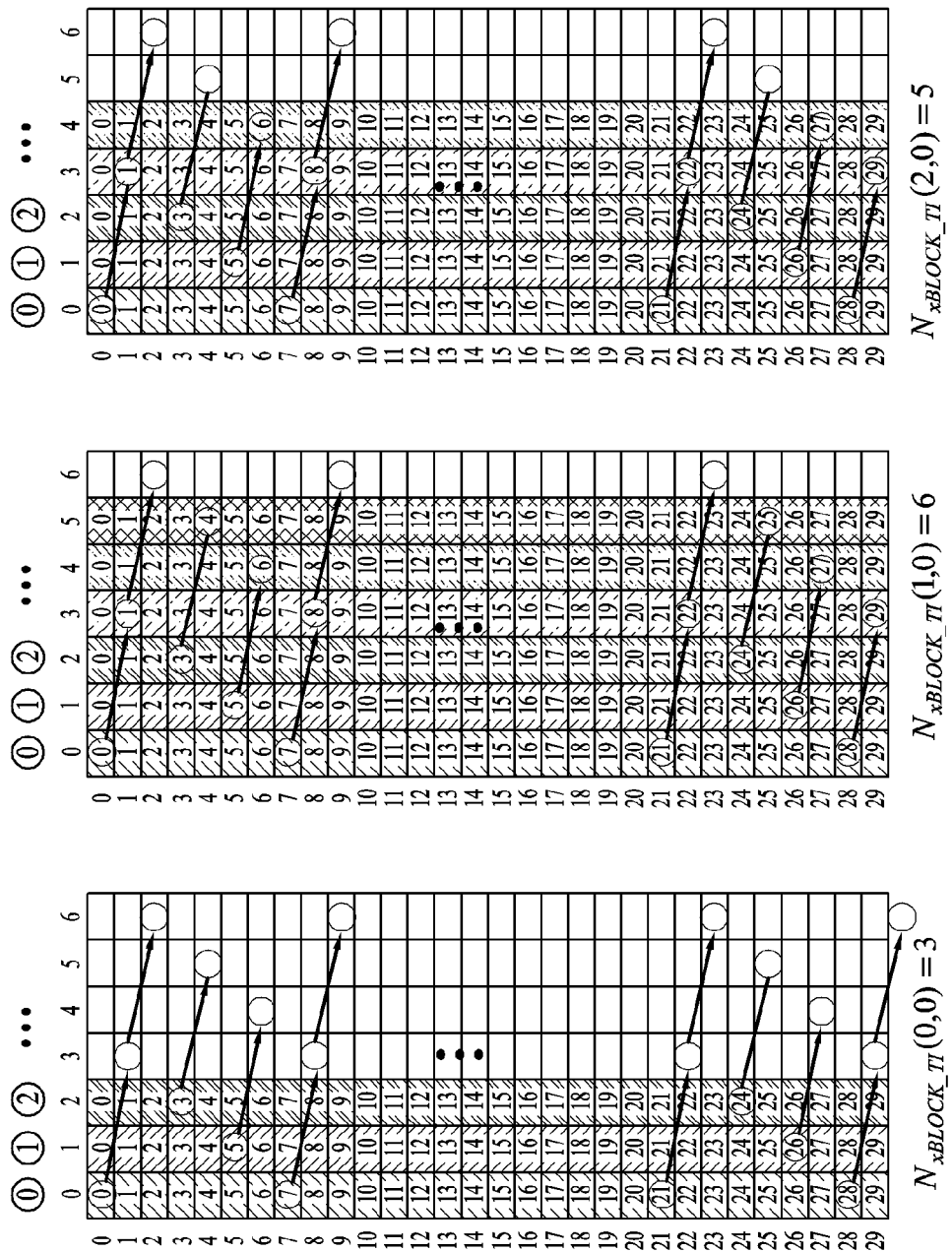

[Fig. 29]

[Fig. 30]
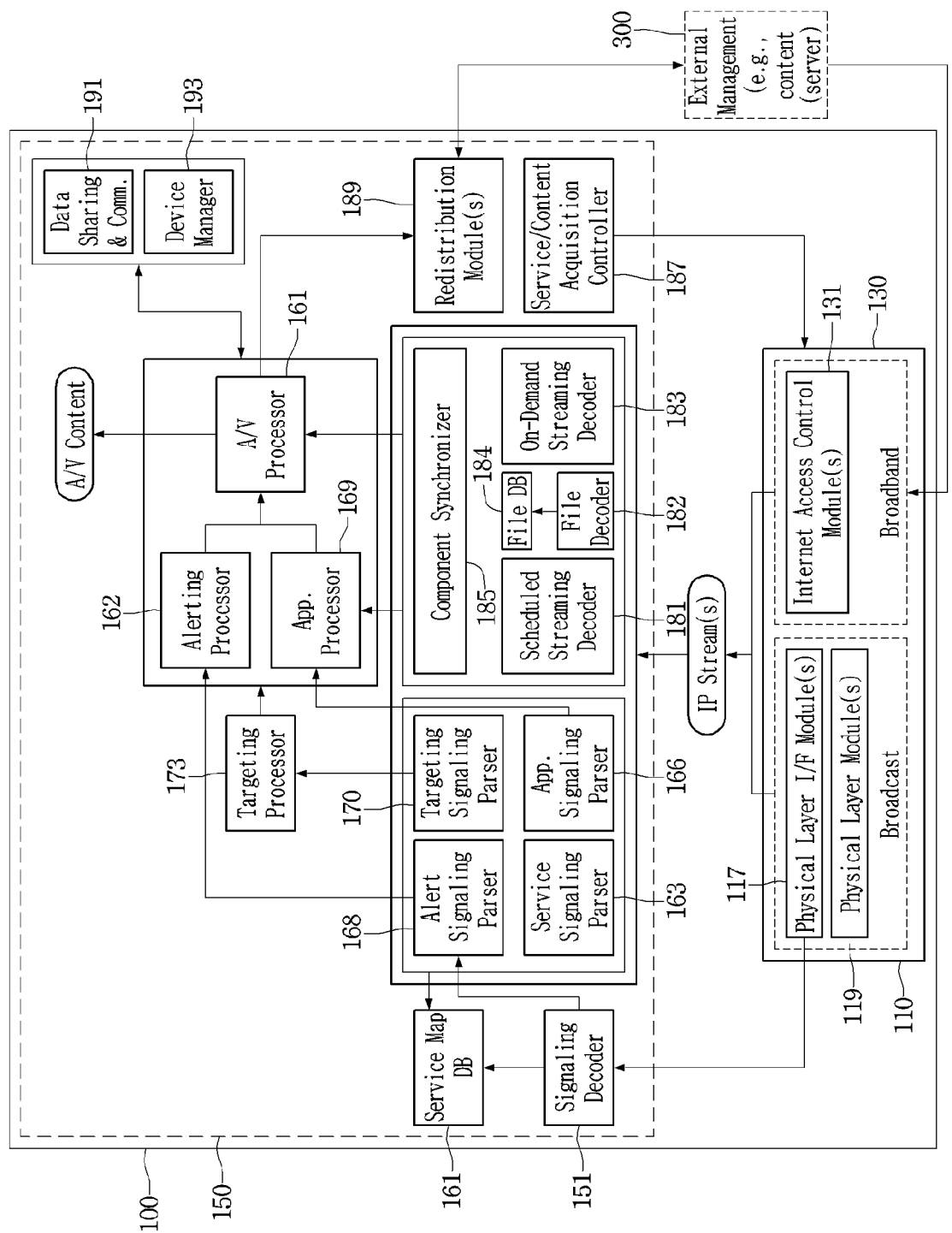

[Fig. 31]
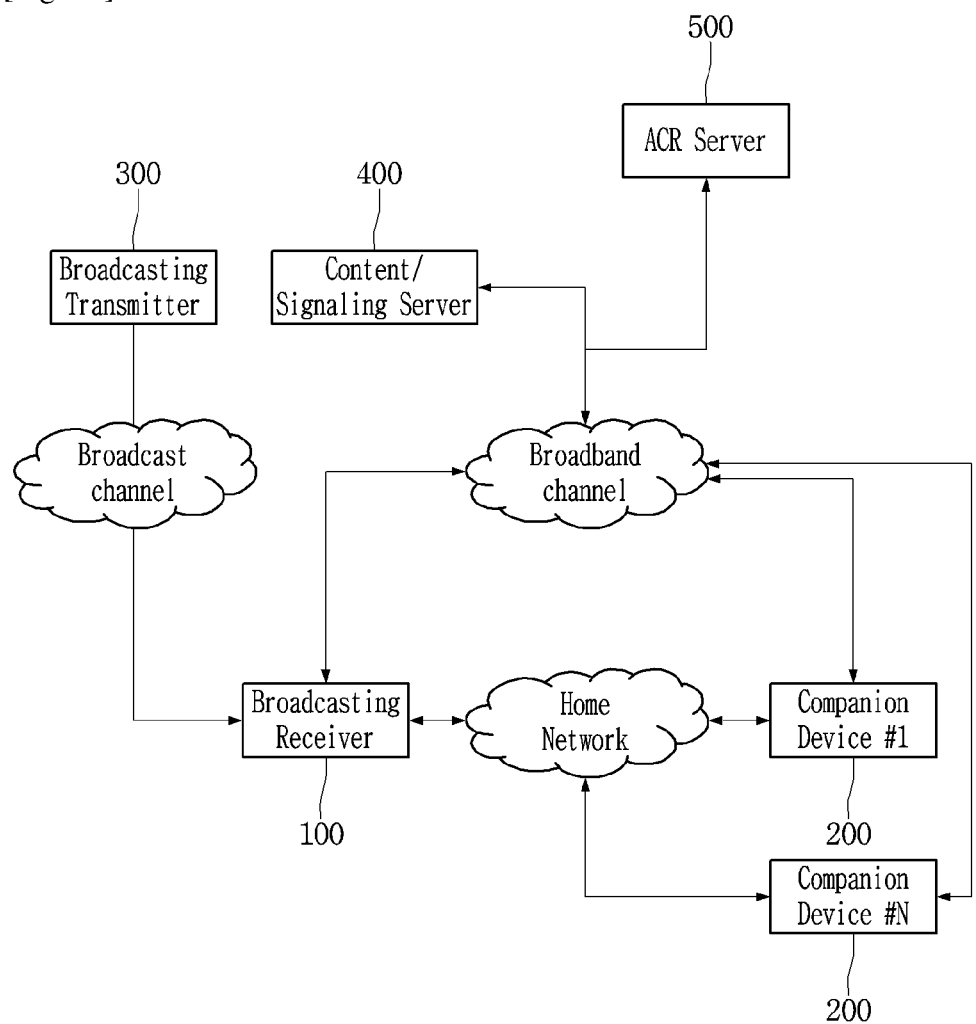

[Fig. 32]

| XML Element/Attribute | Cardinality | Data Type | Description |
|---|---|---|---|
| ServiceInfo | | | |
| @ServiceId | 1 | unsignedShort | Unique identifier for Service |
| @ServiceName | 0..N | string | Human readable name of the service |
| @MajorChanNum | 0..1 | integer 0..15 | Major "channel number" of the service, for service selection |
| @MinorChanNum | 0..1 | integer 0..15 | Minor "channel number" of the service, for service selection |
| @Description | 0..N | string | Textual description of the service |
| @Genre | 0..N | string | Genre(s) of the service |
| @Icon | 0..N | Base64Binary | Icon used to represent the service |
| @Language | 0..1 | string | Primary language used in the service |
| @UsageReportInfo | 0..N | string | Parameters to be used for service usage reporting (e.g., URL, reporting interval, etc.) |
| @Targeting | 0..N | string | Targeting properties for the service |
| @ServiceProtection | 0..1 | string | Service protection properties for the service |
| @AdvisoryRating | 0..N | string | Content advisory rating(s) for the service |
| ComponentItem | 1..N | | Component information of the service |
| @ComponentId | 1 | unsignedShort | Unique identifier for component of Service |
| @ComponentType | 1 | string | Component type |
| @ComponentName | 0..N | string | Human readable name of the component of Service |
| @StartTime | 0..1 | unsignedShort | Start time of the component |
| @Duration | 0..1 | unsignedShort | Duration of the component |
| @TargetScreen | 0..N | string | Targeting window of component (e.g. Secondary screen) |
| @URL | 0..N | any URI | URL of component in the Content Server |
| @ContentAdvisory | 0..N | string | Content advisory rating(s) for the component |
| @Genre | 0..N | string | Genre(s) of the component |

[Fig. 33]

| Variable Name | Req/Opt | Data Type | Evented? |
|---|---|---|---|
| Service Property | Required | string | Yes |

[Fig. 34]

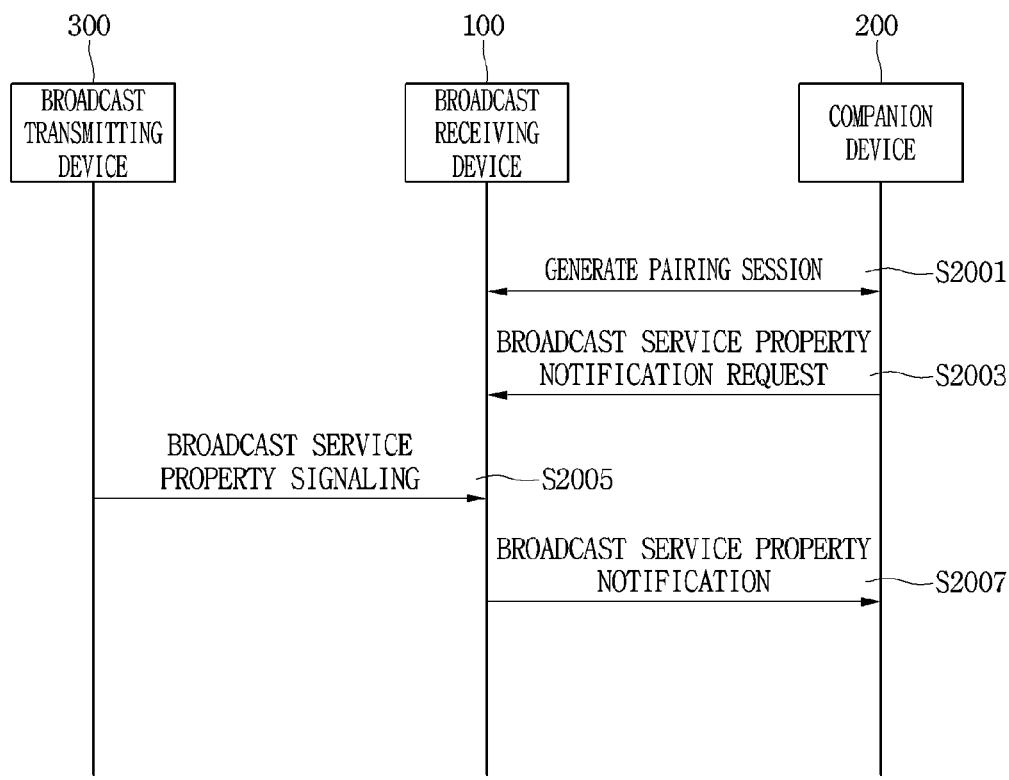

[Fig. 35]

```
<?xml Version="1.0"?>
<propertyset>
  <property>
    <ServiceId>a000001</ServiceId>
  </property>
  <property>
    <ServiceName>MBC Music</ServiceId>
  </property>
  <property>
    <ContentId>mbcradio002</ServiceId>
  </property>
  <property>
    <ContentName>Pop Chart</ServiceId>
  </property>
  <property>
    <MajorChanNum>11</ServiceId>
  </property>
  <property>
    <MinorChanNum>5</ServiceId>
  <property>
  ....
</propertyset>
```

[Fig. 36]

| Variable Name | Req/Opt | Data Type | Evented? |
|---|---|---|---|
| Service Property | Required | string | No |
| ServicePropertyName | Required | string | No |
| ServicePropertyChangeFlag | Required | boolean | Yes |

(a)

| Name | Required/Optional |
|---|---|
| GetServiceProperty | Required |

(b)

| Argument | Direction | Related State Variable |
|---|---|---|
| ServicePropertyName | IN | ServicePropertyName |
| ServiceProperty | OUT | ServiceProperty |

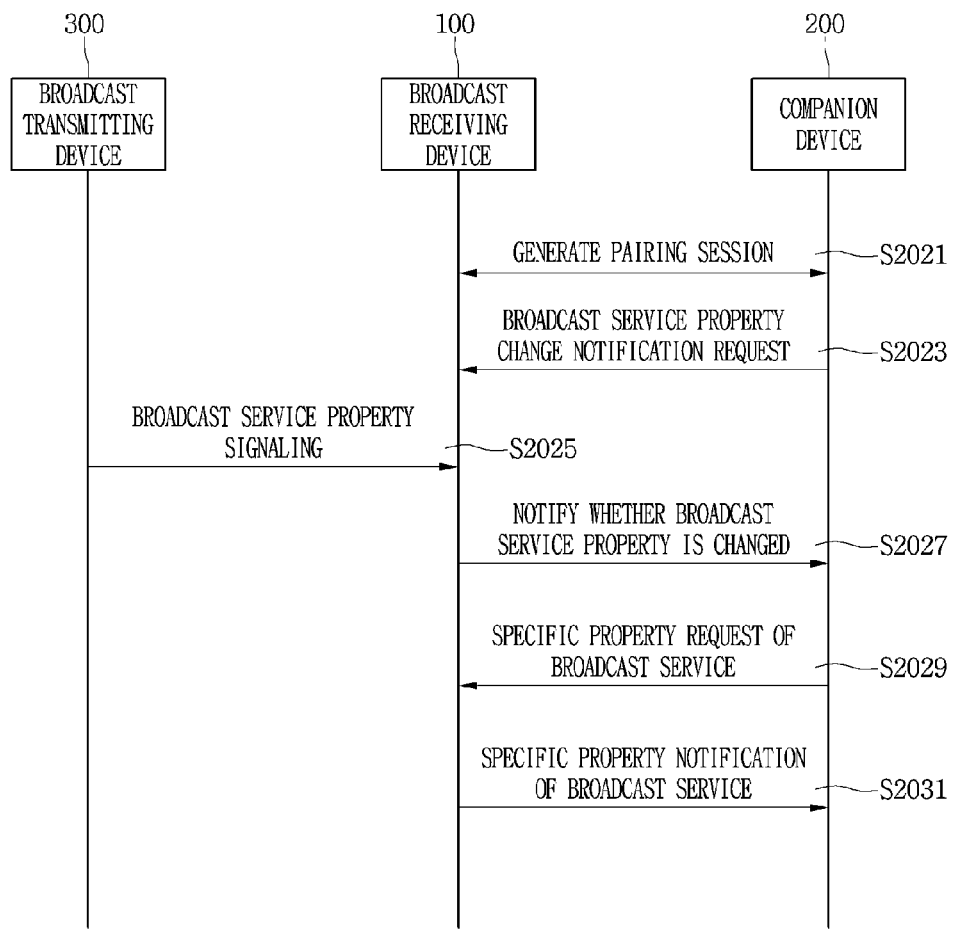

[Fig. 38]

```
<?xml Version="1.0"?>
<propertyset>
  <property>
    <ServicePropertyChangeFlag>true</ServicePropertyChangeFlag>
  </property>
</propertyset>
```

[Fig. 39]

| Variable Name | Req/Opt | Data Type | Evented? |
|---|---|---|---|
| Service Property | Required | string | No |
| ServicePropertyName | Required | string | No |
| ServicePropertyChangeFlag | Required | bin.hex | Yes |

[Fig. 40]

```
<?xml Version="1.0"?>
<propertyset>
  <property>
    <ServicePropertyChangeFlag>90080004</ServicePropertyChangeFlag>
  </property>
</propertyset>
```

[Fig. 41]

| Variable Name | Req/Opt | Data Type | Evented? |
|---|---|---|---|
| Service Property | Required | string | No |
| ServicePropertyName | Required | string | No |
| ServicePropertyChangeFlag | Required | bin.hex | Yes |
| ServicePropertyURL | Optional | string | No |

[Fig. 42]
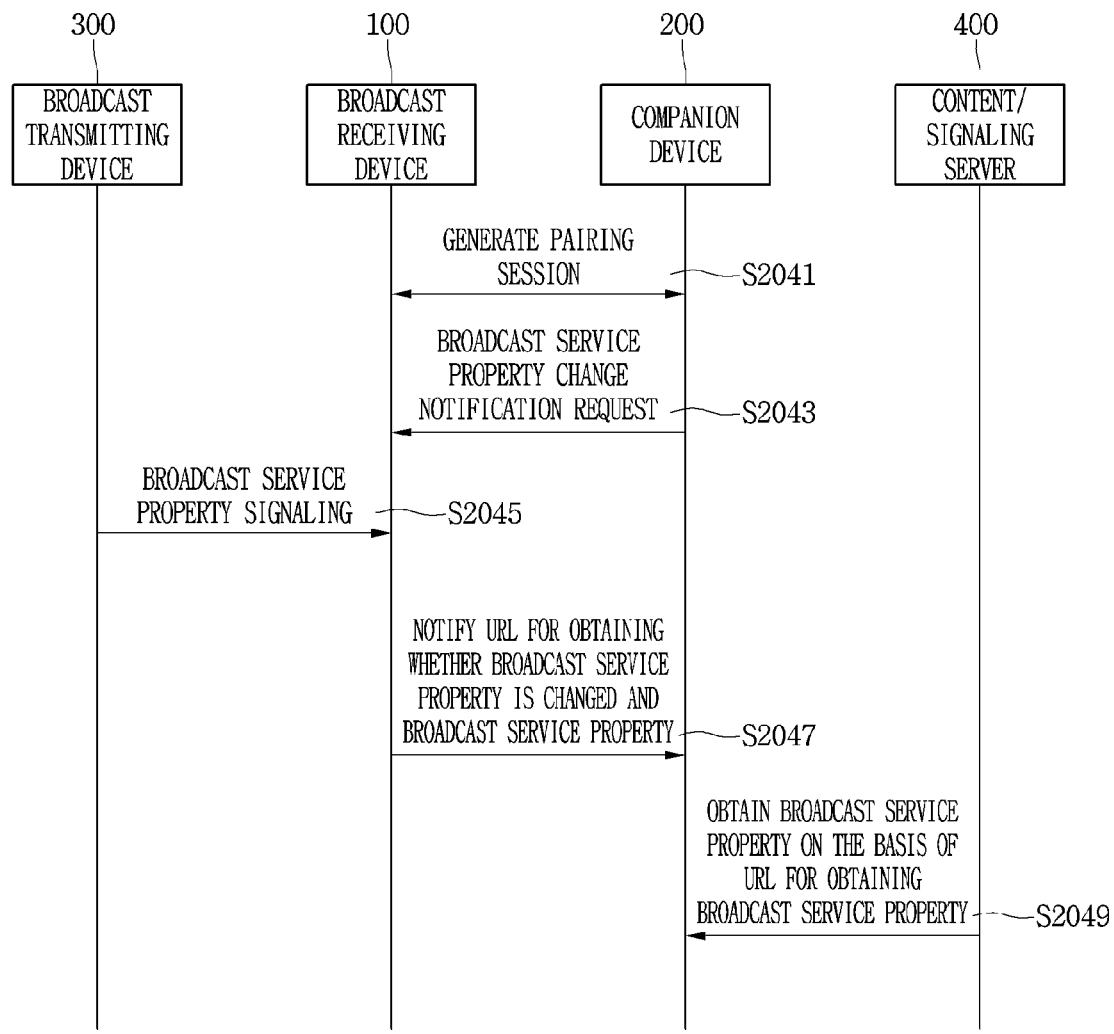

[Fig. 43]

| Variable Name | Req/Opt | Data Type | Evented? |
|---|---|---|---|
| Service Property | Required | string | No |
| ServicePropertyName | Required | string | No |

(a)

| Name | Required/Optional |
|---|---|
| GetServiceProperty | Required |
| SetServiceProperty | Required |

(b)

| Argument | Direction | Related State Variable |
|---|---|---|
| ServicePropertyName | IN | ServicePropertyName |
| ServiceProperty | OUT | ServiceProperty |

(c)

| Argument | Direction | Related State Variable |
|---|---|---|
| ServicePropertyName | IN | ServicePropertyName |

(d)

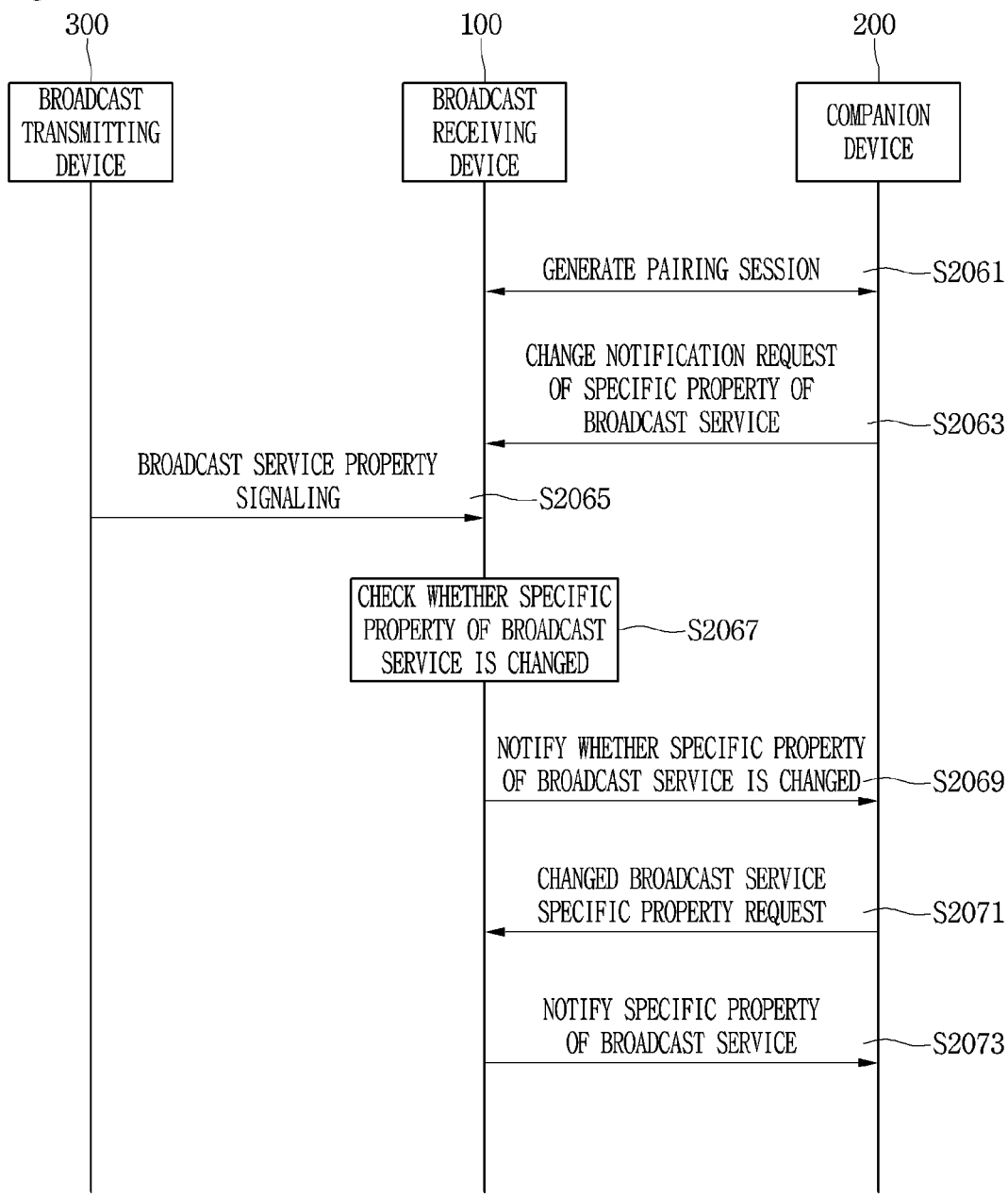
[Fig. 44]

[Fig. 45]
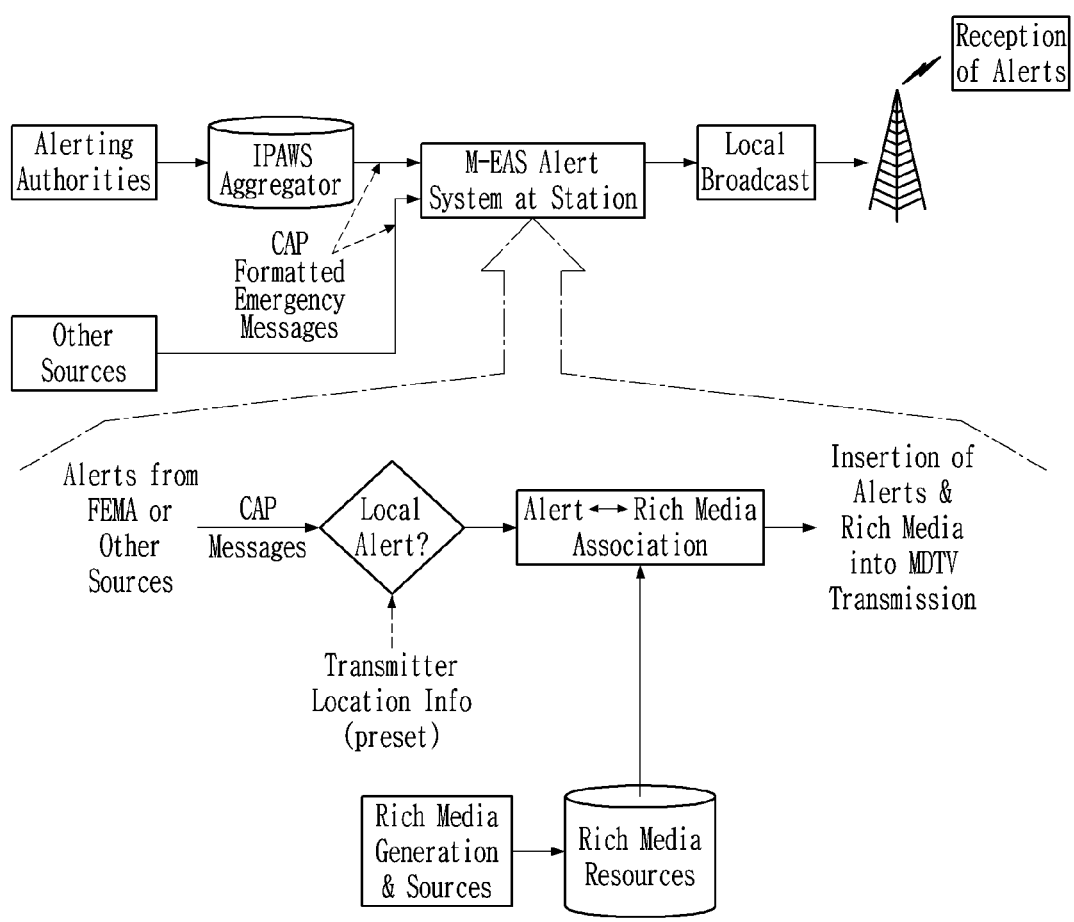

[Fig. 46]
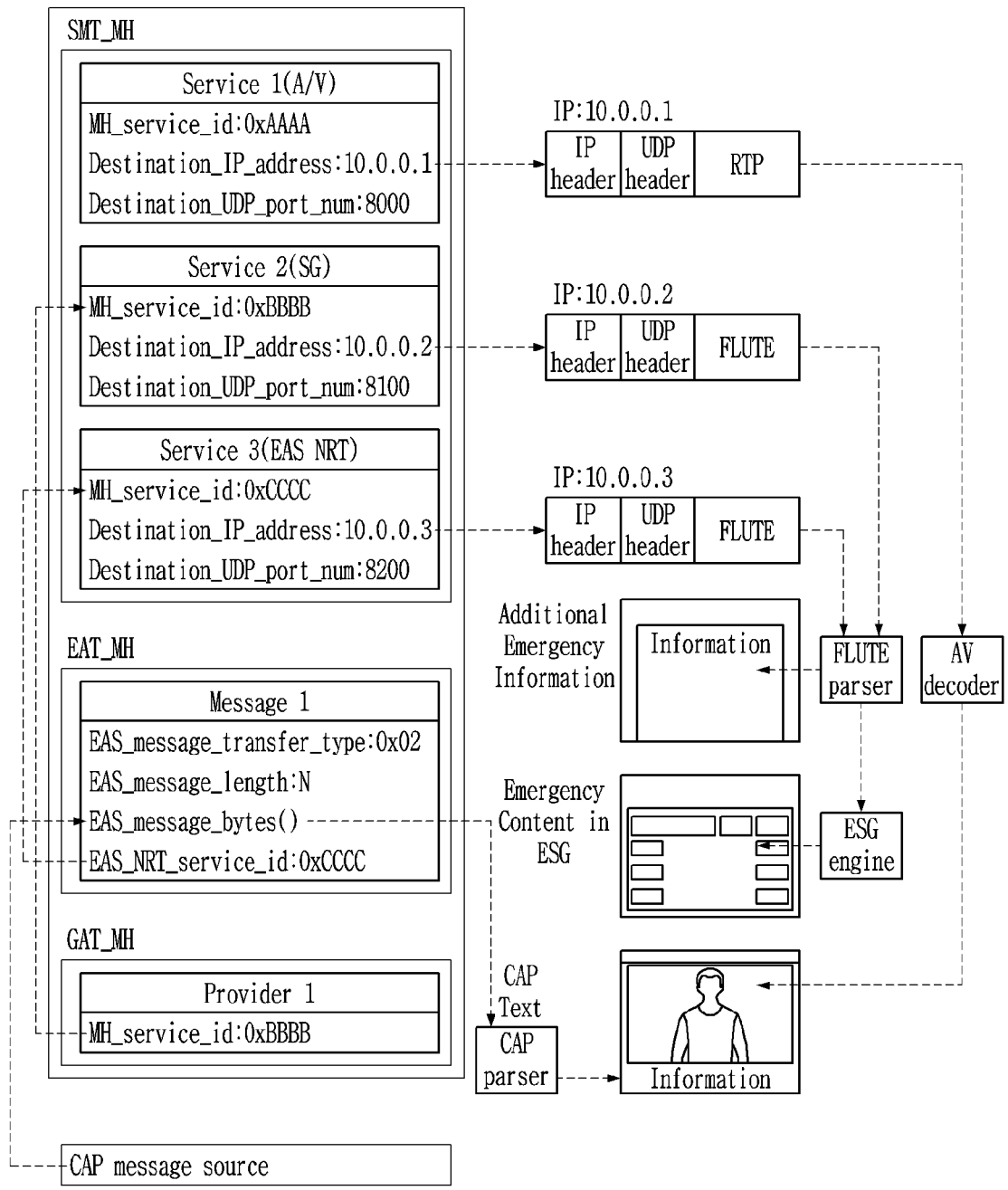

[Fig. 47]

```xml
<?xml version = "1.0" encoding = "UTF-8"?>
<alert xmlns = "http://www.incident.com/cap/1.0">
  <identifier>KSTO1055887203</identifier>
  <sender>KSTO@NWS.NOAA.GOV</sender>
  <sent>2003-06-17T14:57:00-07:00</sent>
  <status>Actual</status>
  <msgType>Alert</msgType>
  <scope>Public</scope>
  <info>
    <category>Met</category>
    <event>SEVERE THUNDERSTORM</event>
    <urgency>Immediate</urgency>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT...NATIONAL WEATHER SERVICE DOPPLER RADAR INDICATED A SEVERE THUNDERSTORM OVER SOUTH CENTRAL ALPINE COUNTRY...OR ABOUT 18 MILES SOUTHEAST OF KIRKWOOD...MOVING SOUTHWEST AT 5 MPH. HAIL...INTENSE RAIN AND STRONG DAMAGING WINDS ARE LIKELY WITH THIS STORM.</description>
    <instruction>TAKE COVER IN A SUBSTANTIAL SHELTER UNTIL THE STORM PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME NORTHEASTERN CALAVERAS COUNTY IN CALIFONIA, SOUTHWESTERN ALPINE COUNTY IN CALIFORNIA</areaDesc>
      <polygon>38.47,-120.14 38.34,-119.95 38.52,-119.74 38.62,-119.89 38.47,-120.14</polygon>
      <geocode>fips6=006109</geocode>
      <geocode>fips6=006009</geocode>
      <geocode>fips6=006003</geocode>
    </area>
  </info>
</alert>
```

[Fig. 48]

| Variable Name | Req/Opt | Data Type | Evented? |
|---|---|---|---|
| EmergencyAlert | Required | string | Yes |
| EmergencyAlertProperty | Required | string | No |

(a)

| Name | Required/Optional |
|---|---|
| GetAllEmergencyAlertMessage | Required |

(b)

| Argument | Direction | Related State Variable |
|---|---|---|
| EmergencyAlertProperty | OUT | EmergencyAlertProperty |

```
<EmergencyAlert>
    <dateTime>20140122T052000</dateTime>
    <messageType>CAP</messageType>
    <version>1.1</version>
</EmergencyAlert>
```

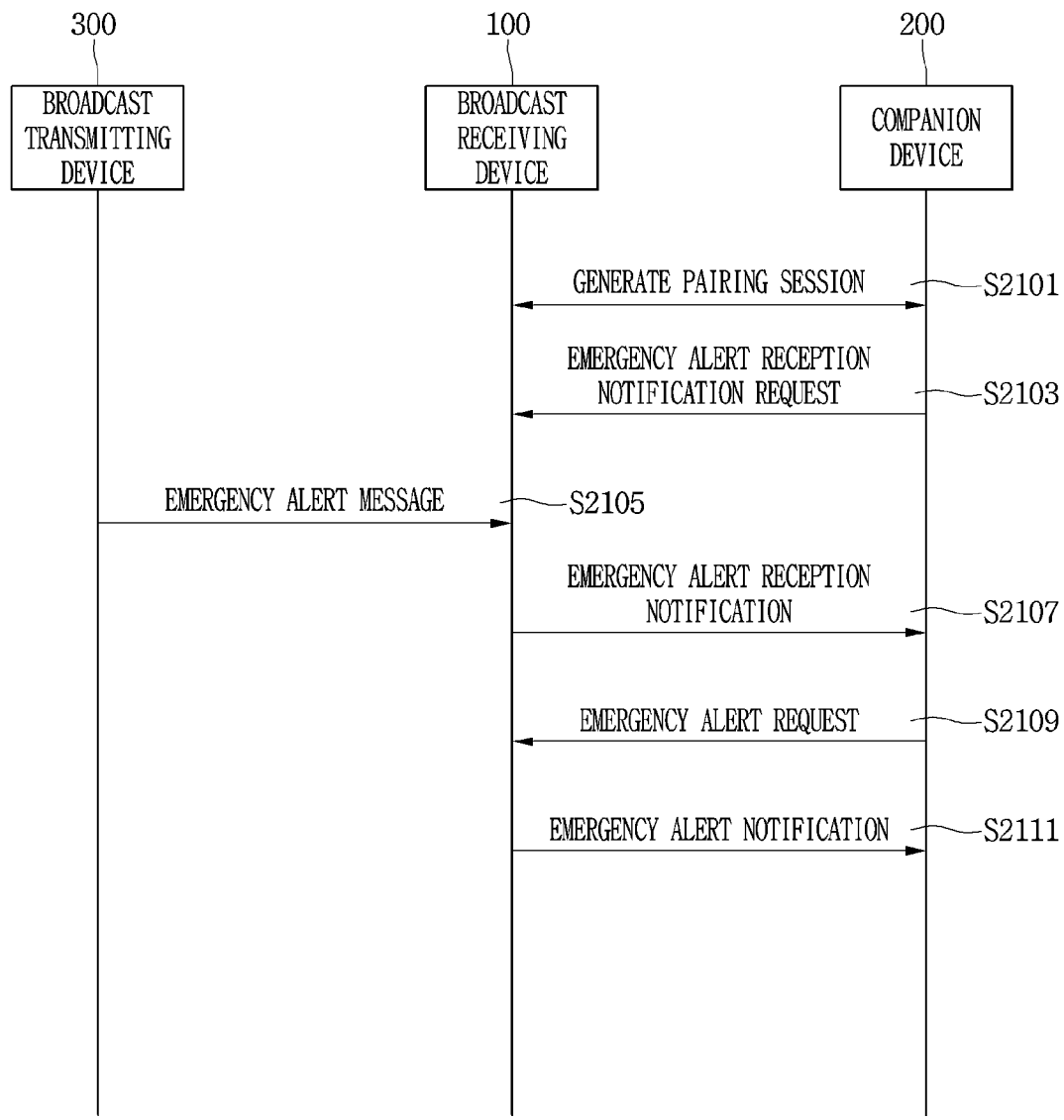

[Fig. 52]

| Urgency |
|---|
| Immediate - 5 |
| Expected - 4 |
| Future - 3 |
| Past - 2 |
| Unknown - 1 |

| Severity |
|---|
| Extreme - 5 |
| Severe - 4 |
| Moderate - 3 |
| Minor - 2 |
| Unknown - 1 |

| Certainty |
|---|
| Very likely (>85%) - 5 |
| Likely (>50%) - 4 |
| Possible (<50%) - 3 |
| Unlikely (0%) - 2 |
| Unknown - 1 |

[Fig. 53]

| Urgency |
|---|
| Immediate - 9 |
| Expected - 8 |
| Future - 7 |
| Past - 5 |
| Unknown - 0 |

| Severity |
|---|
| Extreme - 5 |
| Severe - 4 |
| Moderate - 3 |
| Minor - 2 |
| Unknown - 0 |

| Certainty |
|---|
| Very likely (>85%) - 6 |
| Likely (>50%) - 5 |
| Possible (<50%) - 4 |
| Unlikely (0%) - 3 |
| Unknown - 0 |

[Fig. 54]

| Variable Name | Req/Opt | Data Type | Evented? |
|---|---|---|---|
| EmergencyAlert | Required | string | Yes |
| EmergencyAlertProperty | Required | string | No |
| EmergencyAlertField | Required | string | No |

(a)

| Name | Required/Optional |
|---|---|
| GetEmergencyAlertMessage | Required |

(b)

| Argument | Direction | Related State Variable |
|---|---|---|
| EmergencyAlertField | IN | EmergencyAlertField |
| EmergencyAlertProperty | OUT | EmergencyAlertProperty |

(c)

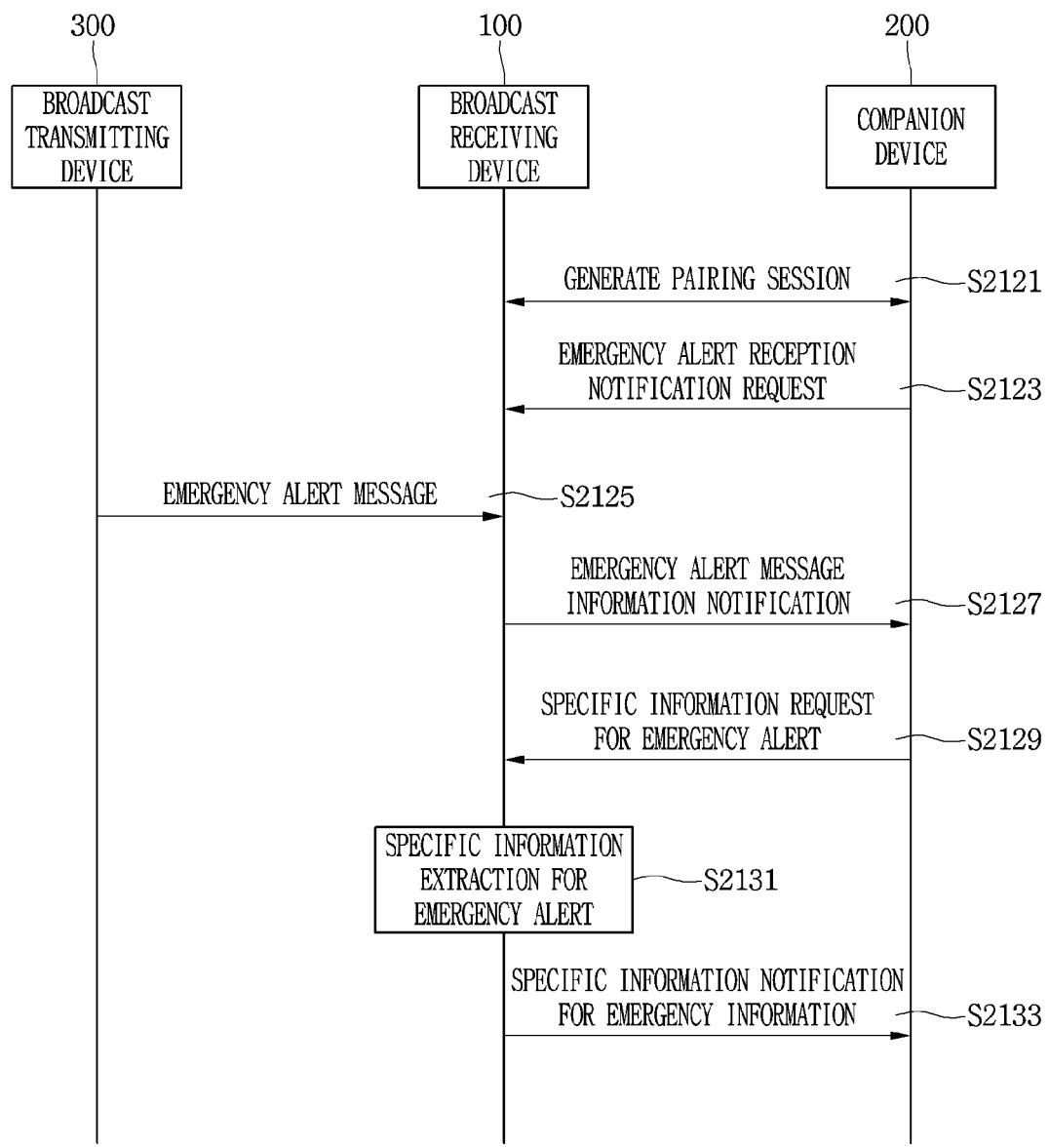

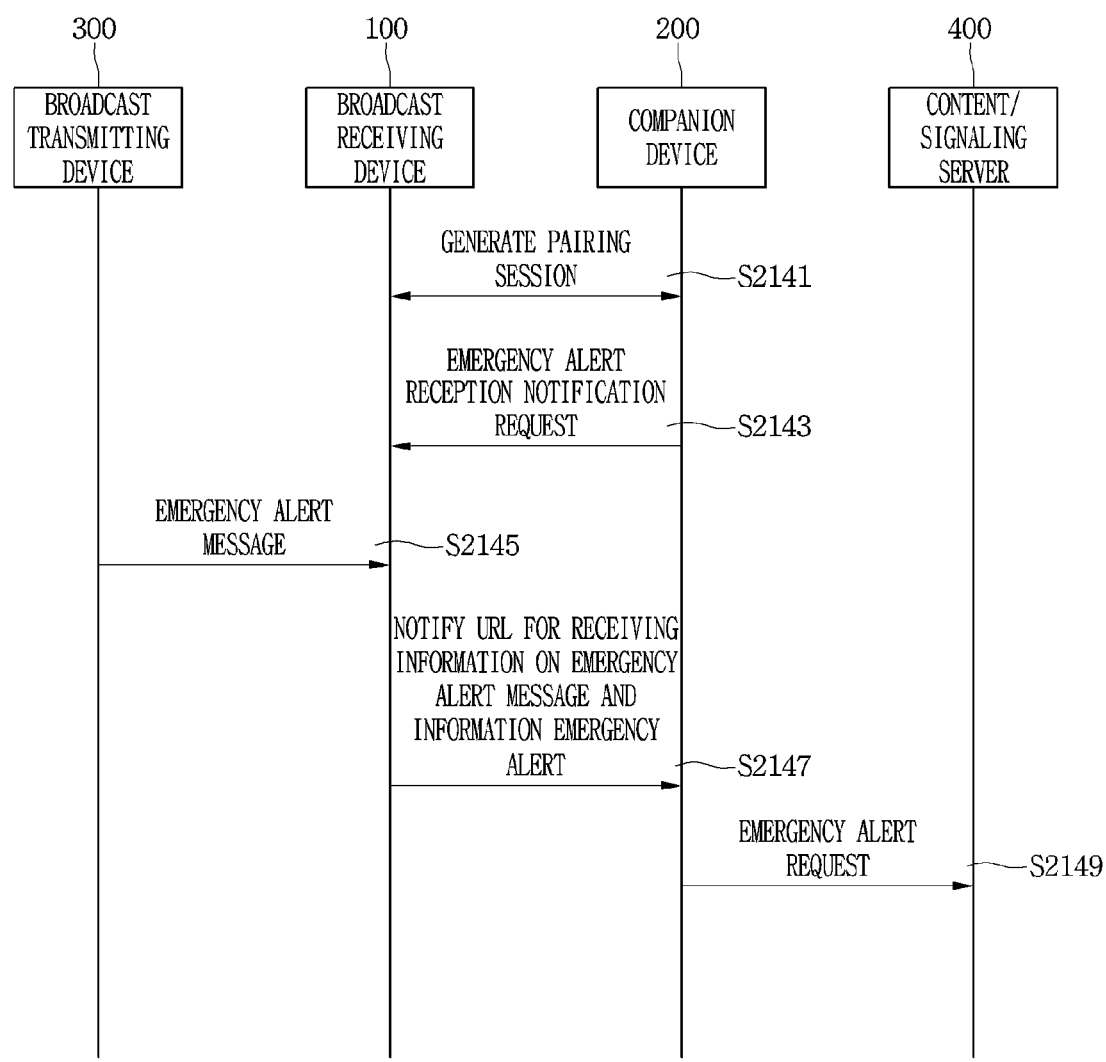

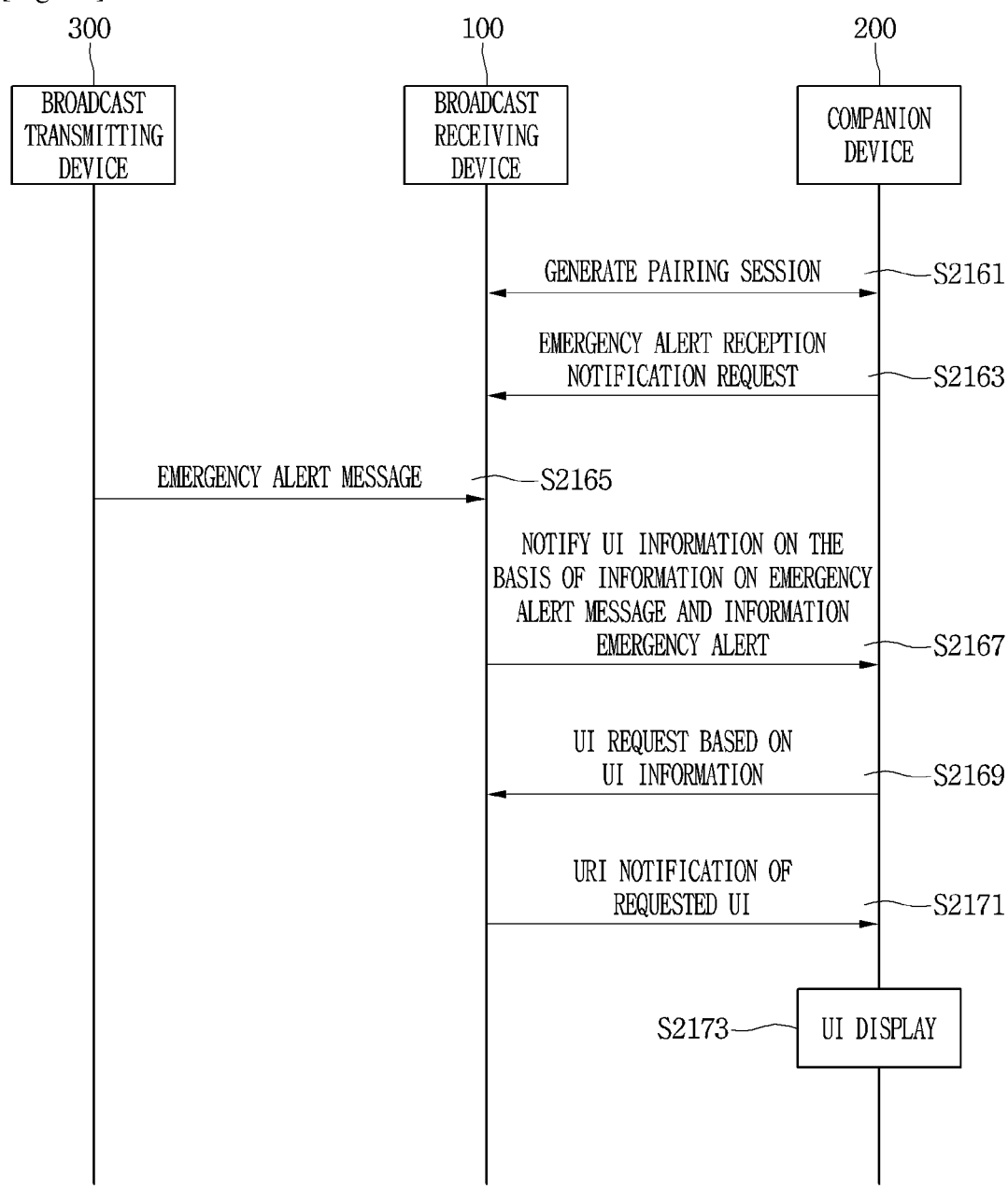
[Fig. 57]

[Fig. 58]
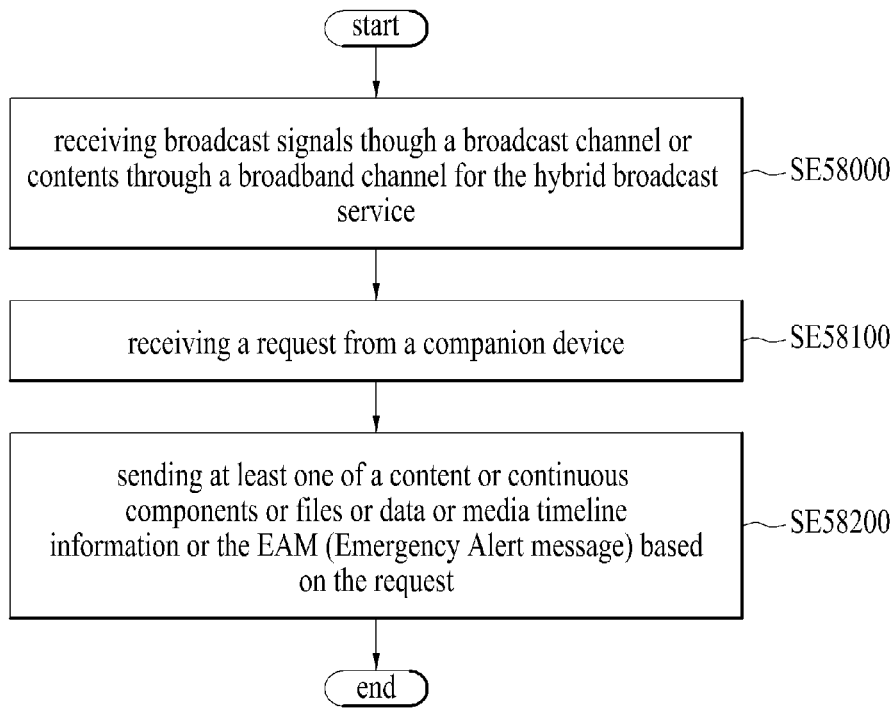
[Fig. 59]
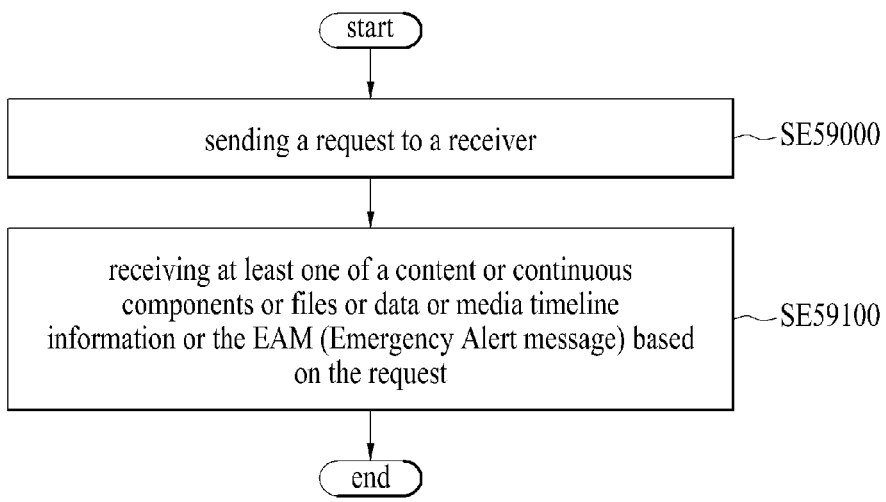

BROADCAST RECEIVING DEVICE AND OPERATING METHOD THEREOF

CROSS REFERENCE TO RELATED APPLICATIONS

This application is the National Phase of PCT/KR2015/000984 filed Jan. 29, 2015, which claims priority under 35 U.S.C. § 119(e) to U.S. Provisional Application Nos. 61/935,324 filed on Feb. 3, 2014; and 62/040,425 filed on Aug. 22, 2014, all of which are hereby expressly incorporated by reference into the present application.

TECHNICAL FIELD

The present disclosure relates to a broadcast receiving device and an operating method thereof.

BACKGROUND ART

With developments of digital broadcast and communication environments, hybrid broadcasts using communication networks (for example, broadband) in addition to existing broadcast networks receive attentions. Additionally, such hybrid broadcasts provide applications or broadcast services interoperating with terminal devices such as smartphones or tablets. As the uses of terminal devices such as smartphones or tablets increase, it is necessary to provide broadcast services efficiently interoperating with the terminal devices.

Especially, broadcast services efficiently providing the properties of broadcast services or information such as an emergency alarm transmitted through broadcasts to terminal devices such as smartphones or tablets are required.

DISCLOSURE OF INVENTION

Technical Problem

Embodiments provide a broadcast receiving device providing broadcast services efficiently interoperating with terminal devices and an operating method thereof.

Embodiments also provide a broadcast receiving device providing broadcast services efficiently transmitting information to terminal devices and an operating method thereof.

Solution to Problem

To achieve the object and other advantages and in accordance with the purpose of the invention, as embodied and broadly described herein, the present invention provides a method for processing a hybrid broadcast service, the method comprising, receiving broadcast signals though a broadcast channel or contents through a broadband channel for the hybrid broadcast service, wherein the broadcast signals include data for the hybrid broadcast service and an EAM (Emergency Alert message), receiving a request from a companion device, sending at least one of the content or continuous components or files or data or media timeline information or the EAM (Emergency Alert message) based on the request, wherein the continuous components or the files or the data are a part of the hybrid broadcast service which is currently selected.

Advantageous Effects of Invention

According to an embodiment of the present invention, provided are a broadcast receiving device providing broadcast services efficiently interoperating with terminal devices and an operating method thereof.

According to an embodiment of the present invention, provided are a broadcast receiving device providing broadcast services efficiently transmitting information to terminal devices and an operating method thereof.

BRIEF DESCRIPTION OF DRAWINGS

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFMD generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates the basic operation of a twisted row-column block interleaver according to an embodiment of the present invention.

FIG. 27 illustrates an operation of a twisted row-column block interleaver according to another embodiment of the present invention.

FIG. 28 illustrates a diagonal-wise reading pattern of a twisted row-column block interleaver according to an embodiment of the present invention.

FIG. 29 illustrates interleaved XFECBLOCKs from each interleaving array according to an embodiment of the present invention.

FIG. 30 is a view illustrating a configuration of a broadcast receiving device according to an embodiment of the present invention.

FIG. 31 is a view illustrating a broadcast system providing a broadcast service interoperating with a companion device according to an embodiment of the present invention.

FIG. 32 is a view illustrating the properties of signaled broadcast service according to an embodiment of the present invention.

FIG. 33 is a view illustrating a parameter representing a state of a signaled broadcast service property according to an embodiment of the present invention.

FIG. 34 is a ladder diagram illustrating operations when a broadcast receiving device signals a broadcast service property to a companion device according to an embodiment of the present invention.

FIG. 35 is a view illustrating a data format of a broadcast service property that a broadcast receiving device signals to a companion device according to an embodiment of the present invention.

FIG. 36 is a view illustrating a parameter representing a state of a broadcast service property that a broadcast receiving device signals to a companion device, an action for broadcast service property, and an argument of an action according to another embodiment of the present invention.

FIG. 37 is a ladder diagram illustrating operations when a broadcast receiving device signals a broadcast service property to a companion device according to another embodiment of the present invention.

FIG. 38 is a view illustrating a data format of whether a broadcast service property is changed that a broadcast receiving device signals to a companion device according to another embodiment of the present invention.

FIG. 39 is a view illustrating parameters representing a state of a broadcast service property that a broadcast receiving device signals to a companion device according to another embodiment of the present invention.

FIG. 40 is a view illustrating a data format of whether a broadcast service property is changed that a broadcast receiving device signals to a companion device according to another embodiment of the present invention.

FIG. 41 is a view illustrating parameters representing a state of a broadcast service property that a broadcast receiving device signals to a companion device according to another embodiment of the present invention.

FIG. 42 is a ladder diagram illustrating operations when a broadcast receiving device signals a broadcast service property to a companion device according to another embodiment of the present invention.

FIG. 43 is a view illustrating a parameter representing a state of a broadcast service property that a broadcast receiving device signals to a companion device, an action for broadcast service property, and an argument of an action according to another embodiment of the present invention.

FIG. 44 is a ladder diagram illustrating operations when a broadcast receiving device signals a broadcast service property to a companion device according to another embodiment of the present invention.

FIG. 45 is a view illustrating operations when an emergency alert is generated and transmitted through a broadcast network according to an embodiment of the present invention.

FIG. 46 is a view when a broadcast receiving device extracts and displays emergency information signaled through a broadcast network according to an embodiment of the present invention.

FIG. 47 is a view illustrating an emergency alert message format according to an embodiment of the present invention.

FIG. 48 is a view illustrating a parameter representing a state of an emergency alert that a broadcast receiving device signals, an action for emergency alert, and an action argument according to another embodiment of the present invention.

FIG. 49 is a view illustrating information including on an emergency alert signaled by a broadcast receiving device according to an embodiment of the present invention.

FIG. 50 is a ladder diagram illustrating operations when a broadcast receiving device signals an emergency alert to a companion device according to an embodiment of the present invention.

FIG. 51 is a view illustrating the criteria of a broadcast receiving device to determine the priority of an emergency alert according to an embodiment of the present invention.

FIG. 52 is a view illustrating the criteria of a broadcast receiving device to determine the priority of an emergency alert according to another embodiment of the present invention.

FIG. 53 is a view illustrating the criteria of a broadcast receiving device to determine the priority of an emergency alert according to another embodiment of the present invention.

FIG. 54 is a view illustrating a parameter representing a state of an emergency alert that a broadcast receiving device signals, an action for emergency alert, and an action argument according to another embodiment of the present invention.

FIG. 55 is a ladder diagram illustrating operations when a broadcast receiving device signals an emergency alert to a companion device according to another embodiment of the present invention.

FIG. 56 is a ladder diagram illustrating operations when a broadcast receiving device signals an emergency alert to a companion device according to another embodiment of the present invention.

FIG. 57 is a ladder diagram illustrating operations when a broadcast receiving device signals an emergency alert to a companion device according to another embodiment of the present invention.

FIG. 58 is a flowchart of hybrid broadcast service processing according to an embodiment of the present invention.

FIG. 59 is a flowchart of hybrid broadcast service processing according to another embodiment of the present invention.

BEST MODE FOR CARRYING OUT THE INVENTION

Hereinafter, embodiments of the present invention will be described in more detail with reference to the accompanying drawings, in order to allow those skilled in the art to easily realize the present invention. The present invention may be realized in different forms, and is not limited to the embodiments described herein. Moreover, detailed descriptions related to well-known functions or configurations will be ruled out in order not to unnecessarily obscure subject matters of the present invention. Like reference numerals refer to like elements throughout.

In additional, when a part "includes" some components, this means that the part does not exclude other components unless stated specifically and further includes other components.

The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudorandom value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFTsize.

reserved for future use: not defined by the present document but may be defined in future superframe: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_f$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

MathFigure 1

$$C_{ldcp}=[I_{ldcp}P_{ldcp}]=[i_0,i_1,\ldots,i_{K_{ldpc}-1},p_0,p_1,\ldots,p_{N_{ldpc}-K_{ldpc}-1}] \quad [\text{Math. 1}]$$

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ ($=N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/ reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Future-cast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PRO-FILE = '000' (base) | Current PHY_PRO-FILE = '001' (handheld) | Current PHY_PRO-FILE = '010' (advanced) | Current PHY_PRO-FILE = '111' (FEF) |
|---|---|---|---|---|
| FRU_CON-FIGURE = 000 | Only base profile present | Only handheld profile present | Only advanced profile present | Only FEF present |
| FRU_CON-FIGURE = 1XX | Handheld profile present | Base profile present | Base profile present | Base profile present |
| FRU_CON-FIGURE = X1X | Advanced profile present | Advanced profile present | Handheld profile present | Handheld profile present |
| FRU_CON-FIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP The type of MIMO encoding process is signaled according to the table 17.

TABLE 17

| Value | MIMO encoding |
|---|---|
| 0000 | FR-SM |
| 0001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I$=1). The allowed $P_I$ values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
| --- | --- |
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
| --- | --- | --- |
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

MathFigure 2

$$D_{DP1} + D_{DP2} \leq D_{DP} \qquad [\text{Math.2}]$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, ..., DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$, is either 64800 bits (long FEC-BLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}$ - $K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}$ - $K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

MathFigure 3

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Math.3]}$$

The parameters for long FECBLOCK and short FEC-BLOCK are given in the above table 28 and 29, respectively.

The detailed procedure to calculate $N_{ldpc}$-$K_{ldpc}$ parity bits for long FECBLOCK, is as follows:

1) Initialize the parity bits,

MathFigure 4

$$p_0=p_1=p_2=\ldots=p_{N_{ldpc}-K_{ldpc}-1}=0 \quad \text{[Math.4]}$$

2) Accumulate the first information bit—$i_0$, at parity bit addresses specified in the first row of an addresses of parity check matrix. The details of addresses of parity check matrix will be described later. For example, for rate 13/15:

MathFigure 5

$$p_{983}=p_{983}\oplus i_0\ p_{2815}=p_{2815}\oplus i_0$$

$$p_{4837}=p_{4837}\oplus i_0\ p_{4989}=p_{4989}\oplus i_0$$

$$p_{6138}=p_{6138}\oplus i_0\ p_{6458}=p_{6458}\oplus i_0$$

$$p_{6921} = p_{6921} \oplus i_0 \ p_{6974} = p_{6974} \oplus i_0$$

$$p_{7572} = p_{7572} \oplus i_0 \ p_{8260} = p_{8260} \oplus i_0$$

$$p_{8496} = p_{8496} \oplus i_0 \qquad \text{[Math.5]}$$

3) For the next 359 information bits, $i_s$, s=1, 2, ..., 359 accumulate $i_s$ at parity bit addresses using following Math figure.

MathFigure 6

$$\{x + (s \bmod 360) \times Q_{ldpc}\} \bmod(N_{ldpc} - K_{ldpc}) \qquad \text{[Math.6]}$$

where x denotes the address of the parity bit accumulator corresponding to the first bit $i_0$, and $Q_{ldpc}$ is a code rate dependent constant specified in the addresses of parity check matrix. Continuing with the example, $Q_{ldpc}$=24 for rate 13/15, so for information bit $i_1$, the following operations are performed:

MathFigure 7

$$p_{1007} = p_{1007} \oplus i_1 \ p_{2839} = p_{2839} \oplus i_1$$

$$p_{4861} = p_{4861} \oplus i_1 \ p_{5013} = p_{5013} \oplus i_1$$

$$p_{6162} = p_{6162} \oplus i_1 \ p_{6482} = p_{6482} \oplus i_1$$

$$p_{6945} = p_{6945} \oplus i_1 \ p_{6998} = p_{6998} \oplus i_1$$

$$p_{7596} = p_{7596} \oplus i_1 \ p_{8284} = p_{8284} \oplus i_1$$

$$p_{8520} = p_{8520} \oplus i_1 \qquad \text{[Math.5]}$$

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, ..., 719 are obtained using the Math FIG. 6, where x denotes the address of the parity bit accumulator corresponding to the information bit $i_{360}$, i.e., the entries in the second row of the addresses of parity check matrix.

In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

MathFigure 8

$$p_i = p_i \oplus p_{i-1}, i=1,2,\ldots,N_{ldpc}-K_{ldpc}-1 \qquad \text{[Math.8]}$$

where final content of $p_i$, i=0,1, ... $N_{ldpc}-K_{ldpc}-1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}$=64800/$\eta_{mod}$ or 16200/$\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word $(c_{0,l}, c_{1,l}, \ldots, c_{nmod-1,l})$ of the bit interleaving output is demultiplexed into $(d_{1,0,m}, d_{1,1,m} \ldots, d_{1,mod-1,m})$ and $(d_{2,0,m}, d_{2,1,m} \ldots, d_{2,mod-1,m})$ as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word $(c_{0,l}, c_{1,l}, \ldots, c_{9,l})$ of the Bit Interleaver output is demultiplexed into $(d_{1,0,m}, d_{1,1,m} \ldots, d_{1,3,m})$ and $(d_{2,0,m}, d_{2,1,m} \ldots, d_{2,5,m})$, as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame.

There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1' (NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

In each DP, the TI memory stores the input XFECBLOCKs (output XFECBLOCKs from the SSD/MIMO encoding block). Assume that input XFECBLOCKs are defined as $(d_{n,s,0,0}, d_{n,s,0,1}, \ldots, d_{n,s,0,Ncells-1}, d_{n,s,1,Ncells-1}, \ldots, d_{n,s,NxBLOCK\_TI(n,s)-1,0}, \ldots, d_{n,s,NxBLOCK\_TI(n,s)-1,Ncells-1})$, where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & \text{the output of SSD encoding} \\ g_{n,s,r,q}, & \text{the output of MIMO encoding} \end{cases}$$

In addition, assume that output XFECBLOCKs from the time interleaver are defined as $(h_{n,s,0}, h_{n,s,1}, \ldots, h_{n,s,i}, \ldots, h_{n,s,NxBLOCK\_TI(n,s) \times Ncells-1})$, where $h_{n,s,i}$ is the ith output cell (for $i=0, \ldots, N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ is while the number of columns $N_c$ is equal to the number $N_{xBLOCK\_TI}(n,s)$.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_r N_c$) as the TI memory cell position to be read sequentially, the reading process in such an interleaving array is performed by calculating the row index $R_{n,s,i}$ the column index $C_{n,s,i}$, and the associated twisting parameter $T_{n,s,i}$ as follows expression.

MathFig. 9

$$\text{Generate}(R_{n,s,i}, C_{n,s,i}) = \quad\quad [\text{Math. 9}]$$
$$\{$$
$$R_{n,s,i} = \text{mod}(i, N_r),$$
$$T_{n,s,i} = \text{mod}(S_{shift} \times S_{n,s,i}, S_c)$$
$$C_{n,s,i} = \text{mod}\left(T_{n,s,i} + \left\lfloor \frac{i}{N_r} \right\rfloor, N_c\right)$$
$$\}$$

where
$S_{shift}$
is a common shift value for the diagonal-wise reading process regardless of
$N_{xBLOCK\_TI}(n,s)$,
and it is determined by
$N_{xBLOCK\_TI\_MAX}$
given in the PLS2-STAT as follows expression.

MathFig. 10

$$\text{for} \begin{cases} N'_{xBLOCK\_TI\_MAX} = N_{xBLOCK\_TI\_MAX} + 1, & [\text{Math. 10}] \\ \text{if } N_{xBLOCK\_TI\_MAX} \bmod 2 = 0 \\ N'_{xBLOCK\_TI\_MAX} = N_{xBLOCK\_TI\_MAX}, \\ \text{if } N_{xBLOCK\_TI\_MAX} \bmod 2 = 1' \end{cases}$$

$$S_{shift} = \frac{N'_{xBLOCK\_TI\_MAX} - 1}{2}$$

As a result, the cell positions to be read are calculated by a coordinate as $$z_{n,s,i} = N_r C_{n,s,i} + R_{n,s,i}.$$

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$.

Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

MathFig. 11

$$p = 0; \quad\quad [\text{Math. 11}]$$
$$\text{for } i = 0; i < N_{cells} N'_{xBLOCK\_TI\_MAX}; i = i+1$$
$$\{\text{Generate}(R_{n,s,i}, C_{n,s,i});$$
$$V_i = N_r C_{n,s,i} + R_{n,s,i}$$
$$\text{if } V_i < N_{cells} N_{xBLOCK\_TI}(n,s)$$
$$\{$$
$$Z_{n,s,p} = V_i; p = p+1;$$
$$\}$$
$$\}$$

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}=1$, $I_{JUMP}=1$, and $P_1=1$. The number of XFECBLOCKs, each of which has $N_{cells}$, =30 cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $\lfloor N_{xBLOCK\_Group\_MAX}/N_{TI} \rfloor N_{xBLOCK\_TI\_MAX}=6$.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and $S_{shift}=(7-1)/2=3$. Note that in the reading process shown as pseudocode above, if $V_i \geq N_{cells} N_{xBLOCK\_TI}(n,s)$, the value of $V_i$ is skipped and the next calculated value of $V_i$ is used.

Figure 29:
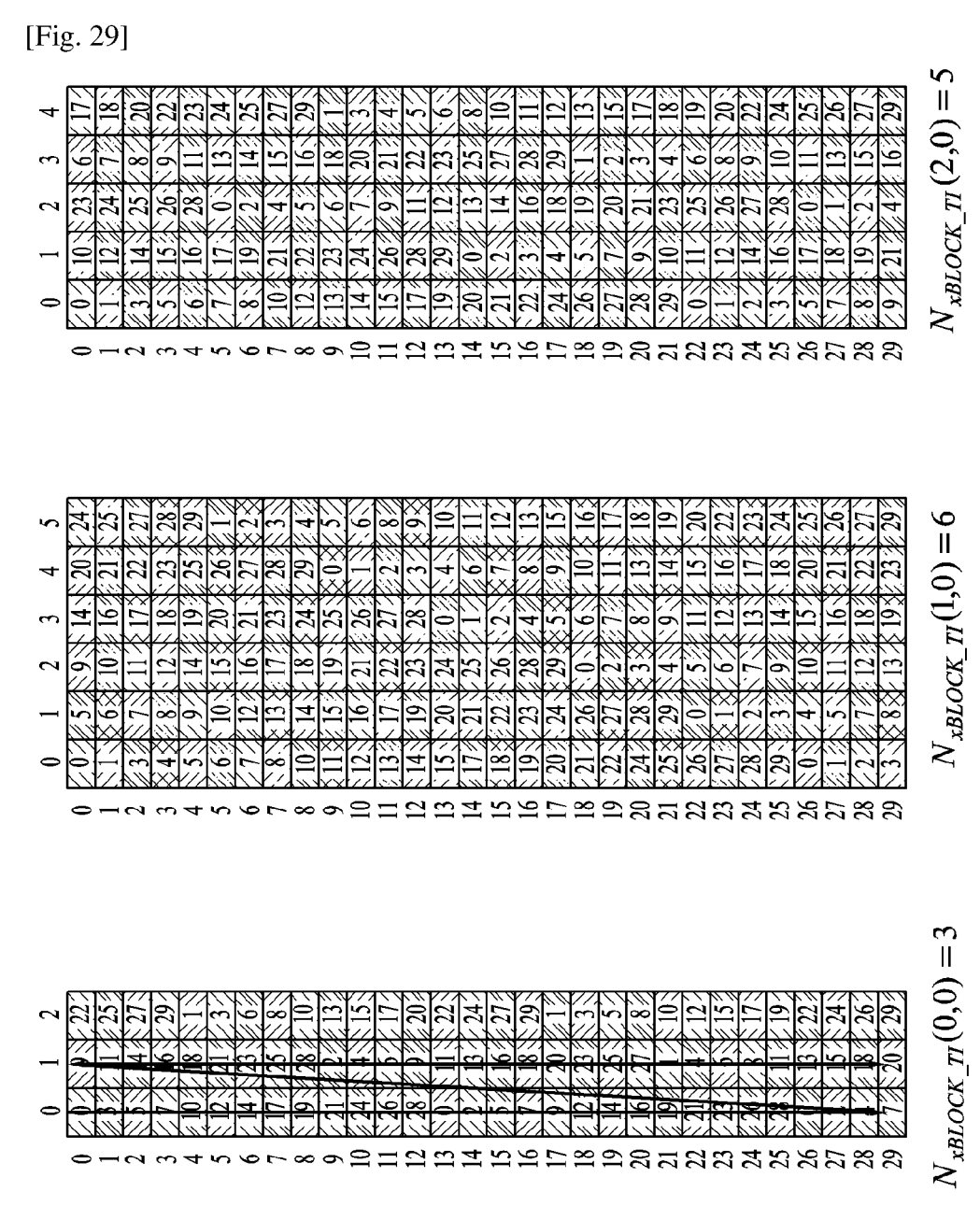

FIG. 29 illustrates interlaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}=7$ and $S_{shift}=3$.

FIG. 30 is a view illustrating a configuration of a broadcast receiving device according to another embodiment of the present invention.

In an embodiment of FIG. 30, the broadcast receiving device 100 of FIG. 30 includes a broadcast reception unit 110, an internet protocol (IP) communication unit 130, and a control unit 150.

The broadcast reception unit 110 may include one or more processors, one or more circuits, and one or more hardware modules, which perform each of a plurality of functions that the broadcast reception unit 110 performs. In more detail, the broadcast reception unit 110 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast reception unit 110 may include a physical layer module 119 and a physical layer IP frame module 117. The physical layer module 119 receives and processes a broadcast related signal through a broadcast channel of a broadcast network. The physical layer IP frame module 117 converts a data packet such as an IP datagram obtained from the physical layer module 119 into a specific frame. For example, the physical layer module 119 may convert an IP datagram into an RS Frame or GSE.

The IP communication unit 130 may include one or more processors, one or more circuits, and one or more hardware modules, which perform each of a plurality of functions that the IP communication unit 130 performs. In more detail, the IP communication unit 130 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130 may include an internet access control module 131. The internet access control module 131 may control an operation of the broadcast receiving device 100 to obtain at least one of service, content, and signaling data through an internet communication network (for example, broad band).

The control unit 150 may include one or more processors, one or more circuits, and one or more hardware modules, which perform each of a plurality of functions that the control unit 150 performs. In more detail, the control unit 150 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and a data sharing unit 191.

The service/content acquisition control unit 187 controls operations of a receiver to obtain services or contents through a broadcast network or an internet communication network and signaling data relating to services or contents.

The signaling decoder 151 decodes signaling information.

The service signaling parser 163 parses service signaling information.

The application signaling parser 166 extracts and parses service related signaling information. At this point, the service related signaling information may be service scan related signaling information. Additionally, the service related signaling information may be signaling information relating to contents provided through a service.

The alert signaling parser 168 extracts and parses alerting related signaling information.

The target signaling parser 170 extracts and parses information for personalizing services or contents or information for signaling targeting information.

The targeting processor 173 processes information for personalizing services or contents.

The alerting processor 162 processes alerting related signaling information.

The application processor 169 controls application related information and the execution of an application. In more detail, the application processor 169 processes a state of a downloaded application and a display parameter.

The A/V processor 161 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a content decoded by at least one of the scheduled streaming decoder 181, the file decoder 182, and the user request streaming decoder 183.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast receiving device 100.

The data sharing unit 191 performs a data transmission operation between the broadcast receiving device 100 and an external device and processes exchange related information. In more detail, the data sharing unit 191 may transmit AV data or signaling information to an external device. Additionally, the data sharing unit 191 may receive AV data or signaling information from an external device.

As the uses of terminal devices such as smartphones or tablets increase, broadcast services interoperating with such terminal devices increase also. Accordingly, terminal devices require the properties of broadcast services representing information on the broadcast services in order to interoperate with the broadcast services. However, in many cases, companion devices do not receive broadcast services directly. In such cases, an operating device needs to obtain the properties of broadcast services through broadcast transmitting devices. Accordingly a broadcast receiving device and an operating method thereof for efficiently transmitting the properties of broadcast services are required. This will be described with reference to FIGS. 31 to 43.

FIG. 31 is a view illustrating a broadcast system providing a broadcast service interoperating with a companion device according to an embodiment of the present invention.

The broadcast system includes a broadcast receiving device 100, a companion device 200, a broadcast transmitting device 300, and a content/signaling server 400, and an ACR server 500.

The broadcast transmitting device 300 refers to a broadcast server transmitting broadcast services. At this point, the broadcast receiving device 100 receives a broadcast service from the broadcast transmitting device 300 through a broadcast channel. Additionally, the broadcast receiving device 100 may receive information signaling a broadcast service from the broadcast transmitting device 300 through a broadcast network. Additionally, the broadcast receiving device 100 may receive additional information for broadcast service, for example, a trigger, a Trigger Parameter Table (TPT), a Trigger Declarative Object (TDO), from the broadcast transmitting device 300 through a broadcast network.

The content/signaling server 400 generates and manages a content on broadcast service. At this point, the broadcast receiving device 100 may receive at least one of additional information on broadcast service and signaling information of broadcast service from the content/signaling server 400 through a communication network (for example, broadcast channel).

The ACR server 300 manages ACR related data on broadcast service. At this point, the broadcast receiving device 100 may receive at least one of a trigger and an application on broadcast service from the ACR server 300 through a communication network (for example, broadcast channel).

The companion device 200 executes a broadcast service related additional function as interoperating with the broadcast receiving device 100 through a home network. In more detail, the companion device 200 may obtain at least one of applications and files relating to broadcast service. Additionally, the companion device 200 may execute applications and files relating to broadcast service. At this point, the companion device 200 may uses a mobile communication network such as 3GPP or an HTTP proxy server instead of a home network. Additionally, according to a specific embodiment, when broadcast service related applications or files are transmitted through File Delivery over Unidirectional Transport (FLUTE), the companion device 200 may receive at least one of the broadcast service related applications or files from the broadcast receiving device 100. Additionally, the companion device 200 may be referred to as a second screen device. Additionally, the companion device 200 may include at least one of smartphones, tablets, and laptops. In more detail, the companion device 200 may be a terminal device having a communication function such as network instead of a broadcast reception function through a broadcast network. Additionally, the companion device 200 may be one or more. The companion device 200 may include a control unit controlling overall operations of the companion device 200 and a communication unit performing a communication with an external device. The control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. Additionally, a communication unit may include one or more processors, one or more circuits, and one or more hardware modules, which perform each of a plurality of functions that the communication unit performs. In more detail, the communication unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

Additionally, the broadcast receiving device 100 may be referred to as a primary device.

Additionally, according to a specific embodiment, at least two of the broadcast transmitting device 300, the content/signaling server 400, and the ACR server 500 are integrated into one server and used.

As described above, the broadcast receiving device 100 may receive signaling information of broadcast service from the broadcast transmitting device 300. Additionally, the broadcast receiving device 100 may receive signaling information of broadcast service from the content/signaling server 400. At this point, the signaling information of broadcast service may include the properties of broadcast service. This will be described in more detail with reference to FIG. 32.

FIG. 32 is a view illustrating the properties of signaled broadcast service according to an embodiment of the present invention.

The signaling information of broadcast service that the broadcast receiving device 100 receives may include the properties of broadcast service. At this point, the properties of broadcast service may include at least one of a broadcast service identifier for identifying a broadcast service, the name of a broadcast service, the channel number of a broadcast service, a description of a broadcast service, the genre of a broadcast service, an icon representing a broadcast service, the primary language of a broadcast service, usage report information relating to a broadcast service, a targeting property representing information of a device providing a broadcast service, a property for broadcast service protection, a content advisory rating, and information on a media component in a broadcast service. The targeting property may represent at least one of a primary device or the companion device 200, as a device providing service. The channel number of a broadcast service may include a major channel number and a minor channel number. The information on a media component may include at least one of an identifier for identifying a media component, the type of a media component, the name of a media component, the start time of a media component, the duration of a media component, information representing a screen that a media components targets, URL for receiving a media component, the advisory rating of a media component, and the genre of a media component. At this point, the screen that a media component targets may represent the companion device 200.

The property of a broadcast service may be signaled in XML format as shown in FIG. 33. However, the signaling format for the property of a broadcast service is not limited thereto and the property of a broadcast service may be signaled in another format such as bit stream.

In more detail, the information signaling the property of a broadcast service may include as an element at least one of ServiceID, ServiceName, MajorChanNum, MinorChanNum, Description, Genre, Icon, Language, UsageReportingInfo, Targeting, ServiceProtection, AdvisoryRating, and ComponentItem.

ServiceID represents a broadcast service identifier for identifying service. At this point, there may be only one ServiceID. Additionally, according to a specific embodiment, ServiceID may have an unsigned short data type. In more detail, the broadcast receiving device 100 and the companion device 200 may identify broadcast service on the basis of ServiceID.

ServiceName represents the name of a broadcast service. ServiceName may be provided in zero, or one or more. According to a specific embodiment, ServiceName may have a string data type. In more detail, the broadcast receiving device 100 and the companion device 200 may display the name of a broadcast service on the basis of ServiceName.

MajorChanNum and MinorChanNum respectively represent the major number and minor number of the channel number of a broadcast service. According to a specific embodiment, MajorChanNum and MinorChanNum may be provided in zero or one. Additionally, MajorChanNum and MinorChanNum may have an integer value among 0 to 15. MajorChanNum and MinorChanNum may be used to easily select a user's broadcast service. In more detail, the broadcast receiving device 100 and the companion device 200 may display the channel number of a broadcast service on the basis of MajorChanNum and MinorChanNum.

Description represents a description of a broadcast service. Description may be provided in zero, or one or more. Description may have a string data type. A user may guess the content of a broadcast through Description. In more detail, the broadcast receiving device 100 and the companion device 200 may display a description of a broadcast service on the basis of Description.

Genre represents the genre of a broadcast service. Genre may be provided in zero, or one or more. According to a specific embodiment, Genre may have a string data type. A user may know the genre of a broadcast service through Genre. In more detail, the broadcast receiving device 100 and the companion device 200 may display the genre of a broadcast service on the basis of Genre.

Icon represents a broadcast service. Icon may be provided in zero, or one or more. Icon may have a base 64 binary data type. A user may easily know the content of a broadcast service through an icon representing a broadcast service. In more detail, the broadcast receiving device 100 and the companion device 200 may display an icon representing a broadcast service on the basis of Icon.

Language represents the main Language of a broadcast service. Language may be provided in zero or one. Language may have a string data type. In more detail, the broadcast receiving device 100 and the companion device 200 may display the primary language of a broadcast service on the basis of Language.

UsageReportingInfo represents usage report information relating to a broadcast service. UsageReportingInfo may be provided in zero, or one or more. UsageReportingInfo may have a string data type. In more detail, UsageReportingInfo may be used as a parameter for usage information report. For example, UsageReportingInfo may include at least one of a URL for usage information report and a report period. Through such usage information report, a broadcast service provider may obtain usage information of a broadcast service and billing information on a broadcast service. In more detail, the broadcast receiving device 100 and the companion device 200 may report usage information of a broadcast service on the basis of UsageReportingInfo.

Targeting represents the targeting property of a broadcast service. Targeting may be provided in zero, or one or more. In more detail, Targeting may have a string data type. In more detail, Targeting may represent whether a corresponding broadcast service is for a primary device such as the broadcast receiving device 100 or the companion device 200. In more detail, the broadcast receiving device 100 and the companion device 200 may determine whether to display a broadcast service on the basis of Targeting.

ServiceProtection represents the property on protection of a broadcast service. ServiceProtection may be provided in zero or one. In more detail, ServiceProtection may have a string data type.

AdvisoryRating represents the advisory rating of a broadcast service. AdvisoryRating may be provided in zero, or one or more. AdvisoryRating may have a string data type. The broadcast receiving device 100 and the companion device 200 may block a broadcast service on the basis of an advisory rating and personalization information.

ComponentItem represents information on a media component in a broadcast service. In more detail, ComponentItem may include at least one of componentId, ComponentType, ComponentName, StartTime, Duration, TargetScreen, URL, ContentAdvisory, and Genre.

ComponentId represents an identifier for identifying a corresponding media component. In more detail, ComponentId may be provided in one. In more detail, ComponentId may have an unsigned data type. In more detail, the broadcast receiving device 100 and the companion device 200 may identify a media component on the basis of ComponentId.

CmponentType represents the type of a corresponding media component. In more detail, CmponentTypemay be provided in one. CmponentType may have a string data type. In more detail, the broadcast receiving device 100 and the companion device 200 may display the type of a media component on the basis of CmponentType.

ComponentName represents the name of a corresponding media component. In more detail, ComponentName may be provided in zero, or one or more. ComponentName may have a string data type. In more detail, the broadcast receiving device 100 and the companion device 200 may display the name of a media component on the basis of ComponentName.

StartTime represents the start time of a corresponding media component. In more detail, StartTime may be provided in zero or one. In more detail, StartTime may have an unsigned short data type. In more detail, the broadcast receiving device 100 and the companion device 200 may determine the start time of a media component on the basis of StartTime.

Duration represents the Duration of a corresponding media component. In more detail, Duration may be provided in zero or one. In more detail, Duration may have an unsigned short data type. In more detail, the broadcast receiving device 100 and the companion device 200 may determine the duration of a media component on the basis of Duration.

TargetScreen represents a screen that a corresponding media component targets. In more detail, TargetScreen may be provided in zero, or one or more. In more detail, TargetScreen may have a string data type. In more detail, the broadcast receiving device 100 and the companion device 200 may determine whether to play a corresponding media component on the basis of TargetScreen.

URL represents an address for receiving a media component. In more detail, URL may be provided in zero, or one or more. In more detail, URL may have a URI data type. In more detail, URL may represent the address of the content/signaling server 400. In more detail, the broadcast receiving device 100 and the companion device 200 may receive a media component on the basis of URL.

ContentAdvisory represents the advisory rating of a corresponding media component. When a value of ContentAdvisory conflicts a value of AdvisoryRating, the value of ContentAdvisory may have priority. In more detail, ContentAdvisory may be provided in zero, or one or more. In more detail, ContentAdvisory may have a string data type. In more detail, the broadcast receiving device 100 and the companion device 200 may determine whether to play a media component on the basis of ContentAdvisory.

Genre represents the genre of a media component. In more detail, Genre may be provided in one or more. Genre may have a string data type. When Genre conflicts the above-mentioned genre of a service, Genre representing the genre of a media component may have priority. In more detail, the broadcast receiving device 100 and the companion device 200 may display the genre of a media component on the basis of Genre.

As described above, the broadcast receiving device 100 and the companion device 200 may interoperate with the broadcast receiving device 200 through at least one of a home network, a mobile communication network such as 3GPP, and an HTTP proxy server. At this point, a communication between the broadcast receiving device 100 and the companion device 200 may be made through various methods. In more detail, a communication between the broadcast receiving device 100 and the companion device 100 may be made through Universal Plug and Play (UPnP).

UPnP classifies a device into a control point (CP) and controlled devices (CDs). The CP controls the CDs through an UPnP protocol. According to a specific embodiment, the broadcast receiving device 100 corresponds to one of the CDs. Additionally, the companion device 200 may correspond to the CP. UPnP defines discovery, description, control, and eventing protocols. The discovery protocol is a protocol through which a CP searches for a CD. The description protocol is a protocol through which a CP obtains information of a CD. The control protocol is a protocol through which a CP invokes a predetermined operation of a CD. The eventing protocol is a protocol through which a CD delivers unsynchronized notifications to a CP. The broadcast receiving device 100 and the companion device 200 may interoperate with each other through at least one of the discovery, description, and control, and eventing protocols of the UPnP protocol. For example, the broadcast receiving device 100 may find the companion device 200 through the discovery protocol. Specific operations of the broadcast receiving device 100 and the companion device 200 will be described with reference to FIGS. 33 to 43.

FIG. 33 is a view illustrating a parameter representing a state of a signaled broadcast service property according to an embodiment of the present invention.

The broadcast receiving device 100 may transmit one parameter representing the property of a broadcast service to a companion device. One parameter representing the property of a broadcast service may include the property of a current broadcast service. In more detail, as shown in the embodiment of FIG. 33, a parameter such as ServiceProperty may be transmitted. According to a specific embodiment, ServiceProperty may be an essential parameter and may have a string data type. Additionally, according to a specific embodiment, ServiceProperty may not have a related action. When a subscription for ServiceProperty is requested, the broadcast receiving device 100 may transmit ServiceProperty to the companion device 200. A specific process of the broadcast receiving device 100 to transmit the property of a broadcast service is described with reference to FIG. 34.

FIG. 34 is a ladder diagram illustrating operations when a broadcast receiving device signals a broadcast service property to a companion device according to an embodiment of the present invention.

The broadcast receiving device 100 and the companion device 200 generate a pairing session in operation S2001. In more detail, the broadcast receiving device 100 may generate a pairing session with the companion device 200 through an IP communication unit 130. In more detail, the companion device 200 may generate a pairing session with the broadcast receiving device 100 through a communication unit. In more detail, the broadcast receiving device 100 and the companion device 200 may generate a pairing session for bidirectional communication. In more detail, the broadcast receiving device 100 and the companion device 200 may generate a pairing session by using the UPnP protocol. According to a specific embodiment, the broadcast receiving device 100 may find the companion device 200 through the discovery protocol of UPnP. For example, a discovery message that the broadcast receiving device 100 searches for a companion device to interoperate through a well known IP address may be multicasted. At this point, the companion device 200 receiving a multicasted message may request a description from the broadcast receiving device 100. The broadcast receiving device 100 may provide the description to the companion device 200 on the basis of the description request of the companion device 200. The companion device 200 may access the broadcast receiving device 200 on the basis of the description. According to another embodiment, the companion device 200 may find the broadcast receiving device 100 through the discovery protocol of UPnP. For example, a message that the companion device 200 searches for the broadcast receiving device 100 to interoperate through a well known IP address may be multicasted. At this point, the broadcast receiving device 100 may reply with a display message on the basis of the multicasted message. Accordingly, the companion device 200 receiving the discovery message may request a description from the broadcast receiving device 100. The broadcast receiving device 100 may provide the description to the companion device 200 on the basis of the description request of the companion device 200. The companion device 200 may access the broadcast receiving device 200 on the basis of the description.

The companion device 200 requests a property notification of a broadcast service from the broadcast receiving device 100 in operation S2003. In more detail, the companion device 200 may request a property notification of a broadcast service from the broadcast receiving device 100 through a control unit. In more detail, the companion device 200 may request a property notification of a broadcast service from the broadcast receiving device 100 through the UPnP protocol. According to a specific embodiment, the companion device 200 may request an event subscription for the property of a broadcast service from the broadcast receiving device 100 on the basis of an eventing protocol.

The broadcast receiving device 100 receives information signaling a broadcast service property on the basis of a broadcast service in operation S2005. In more detail, the broadcast receiving device 100 may receive information signaling a broadcast service property from the broadcast transmitting device 300 through the broadcast reception unit 110.

The broadcast receiving device 100 notifies the broadcast service property to the companion device 200 on the basis of the information signaling the property of a broadcast service in operation S2007. In more detail, the broadcast receiving device 100 notifies the broadcast service property to the companion device 200 through the control unit 150 on the basis of the information signaling the property of a broadcast service. In more detail, the broadcast receiving device 100 may determine whether the property of a broadcast service is changed compared to before. When the property of a broadcast service is changed compared to before, the broadcast receiving device 100 may notify the property of a broadcast service to the companion device 200. According to a specific embodiment, the broadcast receiving device 100 may notify the property of a broadcast service to the companion device 200 through a parameter representing a state of the broadcast service property. According to a specific embodiment, the parameter representing a state of the broadcast service property may be ServiceProperty of FIG. 33. A data format of the parameter representing a state of the broadcast service property will be described in more detail with reference to FIG. 35.

FIG. 35 is a view illustrating a data format of a broadcast service property that a broadcast receiving device signals to a companion device according to an embodiment of the present invention.

The data format of a broadcast service property may be XML format as shown in FIG. 35. However, the data format of a broadcast service property is not limited thereto. In the embodiment of FIG. 35, the data format of a broadcast service property includes all the properties of a broadcast service described with reference to FIG. 32. Accordingly, even if only part of the broadcast service properties is changed, the broadcast receiving device 100 needs to transmit the entire broadcast service properties and the companion device 200 needs to receive the entire broadcast service properties. In such a case, the data amount exchanged between the broadcast receiving device 100 and the companion device 200 increases. Additionally, the companion device 200 needs to check which broadcast service property is changed again. Accordingly, a method of the broadcast receiving device 100 to efficiently signal a broadcast service property to the companion device 200 is required. This will be described with reference to FIGS. 36 to 38.

FIG. 36 is a view illustrating a parameter representing a state of a broadcast service property that a broadcast receiving device signals to a companion device, an action for broadcast service property, and an action argument according to another embodiment of the present invention.

According to another embodiment of the present invention, the parameter representing the property of a broadcast service may include at least one of a parameter representing a broadcast service property, a parameter representing the name of a broadcast service property, and a parameter representing whether a broadcast service property is changed. In more detail, when the companion device 200 requests a specific property of a broadcast service, the broadcast receiving device 100 may transmit the property of a broadcast service on the basis of the request of the companion device 200. In more detail, the broadcast receiving device 100 may transmit the specific property of the broadcast service that the companion device 200 requests. For example, the broadcast receiving device 100 may notify the companion device 200 whether the property of a broadcast service is changed through a parameter representing whether the property of the broadcast service is changed. At this point, the companion device 200 may request the property of a broadcast service through a parameter representing the name of a broadcast service property. The broadcast receiving device 100 may notify the broadcast service property to the companion device 200 through a parameter representing the broadcast service property.

According to a specific embodiment, the parameter representing the property of a broadcast service may include at least one of ServiceProperty, ServicePropertyName, and ServicePropertyChangeFlag. ServiceProperty represents the property of a broadcast service. According to a specific embodiment, ServiceProperty may be an essential parameter and may have a string data type. ServicePropertyName represents the name of a broadcast service property. ServicePropertyName is an essential parameter and may have a string data type. ServicePropertyChangeFlag represents whether a broadcast service property is changed. According to a specific embodiment, ServicePropertyChangeFlag may be an essential parameter and may have a Boolean data type. Additionally, when the companion device 200 request a subscription for ServicePropertyChangeFlag, the broadcast receiving device 100 may transmit ServicePropertyChangeFlag to the companion device 200.

The companion device 200 may use a GetServiceProperty action to request the property of a broadcast service through a parameter representing the name of a broadcast service property. GetServiceProperty is an essential action. At this point, GetServiceProperty may have ServiceProgpertyName as an argument for input. Additionally, GetServiceProperty may have ServiceProperty as an argument for output. According to a specific embodiment, when the companion device 200 sets the property of a broadcast service to be obtained to SevicePropertyName and transmits a GetServiceProperty action to the broadcast receiving device 100, the companion device 200 may receive the property of a broadcast service corresponding to ServicePropertyName as ServiceProperty. Specific operations of the broadcast receiving device 100 and the companion device 200 will be described with reference to FIG. 37.

FIG. 37 is a ladder diagram illustrating operations when a broadcast receiving device signals a broadcast service property to a companion device according to another embodiment of the present invention.

The broadcast receiving device 100 and the companion device 200 generate a pairing session in operation S2021. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 34.

The companion device 200 requests a property change notification of a broadcast service from the broadcast receiving device 100 in operation S2023. In more detail, the companion device 200 may request a property change notification of a broadcast service from the broadcast receiving device 100 through a control unit. In more detail, operations of the companion device 200 may be identical to those in the embodiment of FIG. 34.

The broadcast receiving device 100 receives information signaling a broadcast service property on the basis of a broadcast service in operation S2025. In more detail, the broadcast receiving device 100 may receive information signaling a broadcast service property from the broadcast transmitting device 300 through the broadcast reception unit 110.

The broadcast receiving device 100 notifies the companion device 200 whether the broadcast service property is changed on the basis of the information signaling the property of a broadcast service in operation S2027. In more detail, the broadcast receiving device 100 notifies the companion device 200 whether the broadcast service property is changed through the control unit 150 on the basis of the information signaling the property of a broadcast service. In more detail, the broadcast receiving device 100 may determine whether the property of a broadcast service is changed compared to before. When the property of a broadcast service is changed compared to before, the broadcast receiving device 100 may notify the property change of a broadcast service to the companion device 200. In more detail, the broadcast receiving device 100 may determine whether the property of a broadcast service is changed on the basis of the version of information signaling the property of a broadcast is changed compared to before. Additionally, according to a specific embodiment, the broadcast receiving device 100 may notify the companion device 200 whether the property of a broadcast service is changed through a parameter representing whether the broadcast service property is changed. According to a specific embodiment, the parameter representing whether the broadcast service property is changed may be ServicePropertyChangedFlag of FIG. 33. At this point, a data format representing whether the broadcast service property is changed will be described in more detail with reference to FIG. 38.

FIG. 38 is a view illustrating a data format of whether a broadcast service property is changed that a broadcast receiving device signals to a companion device according to another embodiment of the present invention.

The data format of whether a broadcast service property is changed may be XML format. However, the data format of whether a broadcast service property is not limited thereto. According to a specific embodiment, the broadcast receiving device 100 may notify the companion device 200 only whether the property of a broadcast service is changed. As shown in the embodiment of FIG. 38, the broadcast receiving device 100 may display whether the property of a broadcast service is changed to the companion device 200 through a Boolean parameter having a TRUE value or a FALSE value. For example, when the property of a broadcast service is changed, the broadcast receiving device 100 may transmit to the companion device 200 data in which a parameter representing whether the property of a broadcast service has a TRUE value. However, in such an embodiment, the companion device 200 may not know which property in a broadcast service is changed and may only know that at least one of broadcast service properties is changed. Accordingly, even when a broadcast service property that the companion device 200 does not require is changed, the companion device 200 requests the property of a broadcast service. Accordingly, such an embodiment may cause unnecessary operations and unnecessary data exchanges of the broadcast receiving device 100 and the companion device 200. To resolve this issue, the broadcast receiving device 100 may need to notify a changed broadcast service property to the companion device 200. This will be described with reference to FIGS. 39 and 40.

FIG. 39 is a view illustrating parameters representing a state of a broadcast service property that a broadcast receiving device signals to a companion device according to another embodiment of the present invention.

When the property of a broadcast service is changed, the broadcast receiving device 100 may notify the companion device 200 the changed property and whether the broadcast service property is changed together. For this, the parameter representing whether a broadcast service property is changed may include information representing the changed property of a broadcast service. For this, the parameter representing whether a broadcast service property is changed may have a binary hex type. Accordingly, other parameters, actions, and action arguments are the same and according to an embodiment of FIG. 36, ServicePropertyChangedFlag that is a parameter representing whether the property of a broadcast service is changed may be a binary hex type. When a subscription for ServicePropertyChangedFlag is requested, the broadcast receiving device 100 may transmit ServicePropertyChangedFlag to the companion device 200. A data format of whether the property of a broadcast service is changed that the broadcast receiving device 100 signals to the companion device 200 will be described with reference to FIG. 40.

FIG. 40 is a view illustrating a data format of whether a broadcast service property is changed that a broadcast receiving device signals to a companion device according to another embodiment of the present invention.

The data format of whether a broadcast service property is changed may be XML format. However, the data format of whether a broadcast service property is not limited thereto. The broadcast receiving device 100 allocates a specific bit to each broadcast service property and when the property of a broadcast is changed, displays a corresponding bit with 1. In the embodiment of FIG. 4, a hexadecimal number 90080004 is a binary number 1001 0000 0000 1000 0000 0000 0100. At this point, the first four bits represent the primary language, genre, advisory rating, and targeting property of a broadcast, respectively. In this case, the companion device 200 may recognize that the primary language and targeting property of a broadcast are changed.

Again, referring to FIG. 37, the case that the broadcast receiving device 100 signals a broadcast service property to the companion device 2200 will be described according to another embodiment of the present invention.

The companion device 200 requests a specific property of a broadcast service from the broadcast receiving device 100 in operation S2029. The specific property of a broadcast service may be one or more properties among a plurality of broadcast service properties in information signaling the property of a broadcast. The companion device 200 may request a specific property of a broadcast service from the broadcast receiving device 100 through a control unit. In more detail, when the broadcast receiving device 100 transmits a property change notification of a broadcast service, the companion device 200 may request the specific property of the broadcast service from the broadcast receiving device 100. At this point, the specific property of the broadcast service may be the property of a broadcast service necessary for the companion device 200 to provide broadcast service related additional services. Additionally, as shown in FIGS. 41 and 42, when the broadcast receiving device 100 signals changed part among broadcast service properties, the companion device 100 may request the specific property of the broadcast service on the basis of the changed property type of the broadcast service. In more detail, when a specific property of a broadcast service is changed, the companion device 200 may request the specific property of the broadcast service. The specific property of the broadcast service may be a property necessary for the companion device 200 to provide broadcast service related additional services. For example, in the case that the companion device 200 determines whether to present a broadcast service on the basis of the targeting property of the broadcast service, when the targeting property of the broadcast service is changed, the companion device 200 may request the targeting property of the broadcast service.

The broadcast receiving device 100 notifies the specific property of the broadcast service to the companion device 200 in operation S2031. In more detail, the broadcast receiving device 100 may notify the specific property of the broadcast service to the companion device 200 through the control unit 150. In more detail, the broadcast receiving device 100 may notify the specific property of the broadcast service on the basis of a request of the companion device 200. For example, the broadcast receiving device 100 may transmit the specific property of the broadcast service that the companion device 200 requests to the companion device 200.

However, such an embodiment may require a continuous communication between the broadcast receiving device 100 and the companion device 200. Especially, when the broadcast receiving device 100 interoperates with a plurality of companion devices 200, a continuous communication may cause the overload to an operation of the broadcast receiving device 100. This issue may be resolved if the companion device 100 receives the property of a broadcast service from the content/signaling server 400. This will be described with reference to FIGS. 41 and 42.

FIG. 41 is a view illustrating parameters representing a state of a broadcast service property that a broadcast receiving device signals to a companion device according to another embodiment of the present invention.

When the property of a broadcast service is changed, the broadcast receiving device 100 may notify the companion device 200 of a URL address for receiving whether the broadcast service property is changed and the property of the broadcast service. For this, a parameter representing a state of a broadcast service property that the broadcast receiving device 100 signals to the companion device 200 may include information representing a URL address for the property of the broadcast service. According to a specific embodiment, a parameter representing a state of a signaled broadcast service property may include ServicePropertyChangeFlag representing a URL address for receiving the property of a broadcast service. According to a specific embodiment, ServicePropertyChangeFlag may be an optional parameter and may have a string data type. Specific operations of the broadcast receiving device 100 and the companion device 200 will be described with reference to FIG. 42.

FIG. 42 is a ladder diagram illustrating operations when a broadcast receiving device signals a broadcast service property to a companion device according to another embodiment of the present invention.

The broadcast receiving device 100 and the companion device 200 generate a pairing session in operation S2041. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 37.

The companion device 200 requests a property change notification of a broadcast service from the broadcast receiving device 100 in operation S2043. In more detail, the companion device 200 may request a property notification of a broadcast service from the broadcast receiving device 100 through a control unit. In more detail, operations of the companion device 200 may be identical to those in the embodiment of FIG. 37.

The broadcast receiving device 100 receives information signaling a broadcast service property on the basis of a broadcast service in operation S2045. In more detail, the broadcast receiving device 100 may receive information signaling a broadcast service property from the broadcast transmitting device 300 through the broadcast reception unit 110.

The broadcast receiving device 100 notifies the companion device 200 of a URL for obtaining whether the broadcast service property is changed and the property of a broadcast service on the basis of the information signaling the property of the broadcast service in operation S2047. In more detail, the broadcast receiving device 100 notifies the companion device 200 of a URL for obtaining whether the broadcast service property is changed and the property of a broadcast service through the control unit 150 on the basis of the information signaling the property of a broadcast service. In more detail, the broadcast receiving device 100 may determine whether the property of a broadcast service is changed compared to before. In more detail, the broadcast receiving device 100 may determine whether the property of a broadcast service is changed on the basis of the version of information signaling the property of a broadcast is changed compared to before. Additionally, when the property of a broadcast service is changed compared to before, the broadcast receiving device 100 may notify the companion device 200 of a URL address for obtaining the broadcast service property change and the broadcast service property. According to a specific embodiment, the broadcast receiving device 100 may notify the companion device 200 whether the property of a broadcast service is changed through a parameter representing whether the broadcast service property is changed. According to a specific embodiment, the parameter representing whether the broadcast service property is changed may be ServicePropertyChangeFlag of FIG. 41. Additionally, the broadcast receiving device 100 may notify the companion device 200 whether the property of a broadcast service is changed through a parameter representing a URL for obtaining the property of the broadcast service. According to a specific embodiment, the parameter representing a URL for obtaining the property of the broadcast service may be ServicePropertyURL of FIG. 41.

The companion device 200 obtains the property of a broadcast service on the basis of a URL for obtaining the property of the broadcast service in operation S2049. In more detail, the companion device 200 obtains the property of a broadcast service through a control unit on the basis of a URL for obtaining the property of the broadcast service. In more detail, the companion device 200 obtains the property of a broadcast service from the content/signaling server 400 on the basis of a URL for obtaining the property of the broadcast service. In more detail, the companion device 200 requests the property of a broadcast service from the content/signaling server 400 on the basis of a URL for obtaining the property of the broadcast service and then obtains the property of the broadcast service from the content/signaling server 400. Through this, the load of the broadcast communication device 100 resulting from a communication between the broadcast receiving device 100 and the companion device 200 may be reduced. However, according to such an embodiment, even when the property of a broadcast service that the companion device 200 does not require is changed, the broadcast receiving device 100 needs to notify the broadcast service property change. Accordingly, the broadcast receiving device 100 needs to perform an unnecessary operation. As a necessary broadcast service property is set in advance when the companion device 200 requests a notification change from the broadcast receiving device 100, unnecessary operations of the broadcast receiving device 100 may be reduced. This will be described with reference to FIGS. 43 and 44.

FIG. 43 is a view illustrating a parameter representing a state of a broadcast service property that a broadcast receiving device signals to a companion device, an action for broadcast service property, and an action argument according to another embodiment of the present invention.

The companion device 200 may designate a desired broadcast service property to be notified as requesting a property change notification of a broadcast service from the broadcast receiving device 100. For this, the companion device 200 may include an action for designating the desired broadcast service property to be notified. At this point, the action may have a parameter representing a desired broadcast service property to be notified as an input argument. Such an action may be SetServiceProperty of FIG. 43. According to a specific embodiment, SetServiceProperty may be an essential action. Additionally, SetServiceProperty may have ServicePropertyName representing the type of a broadcast service property as an input argument. Specific operations of the broadcast receiving device 100 and the companion device 200 will be described with reference to FIG. 44.

FIG. 44 is a ladder diagram illustrating operations when a broadcast receiving device signals a broadcast service property to a companion device according to another embodiment of the present invention.

The broadcast receiving device 100 and the companion device 200 generate a pairing session in operation S2061. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 42.

The companion device 200 requests a specific property change notification of a broadcast service from the broadcast receiving device 100 in operation S2063. In more detail, the companion device 200 may request a specific property change notification of a broadcast service from the broadcast receiving device 100 through a control unit. The companion device 200 may request only a specific property change of a broadcast service necessary for providing broadcast service related additional services. According to a specific embodiment, the companion device 200 may request a specific property change notification of a broadcast service through an action for requesting only the specific property change notification. At this point, the action for requesting only the specific property change notification may be SetServiceProperty of FIG. 43. An operation of the companion device 200 to request a specific property change notification of a broadcast service from the broadcast receiving device 100 may include the following operations. The companion device 200 requests a subscription for service property change notification from the broadcast receiving device 100. When accepting the request for service property change notification subscription, the broadcast receiving device 100 may transmit an acceptance message and a subscription identifier (SID) for identifying the subscription request to the companion device 200. The companion device 200 may request a specific property change notification of a broadcast service from the broadcast receiving device 100 on the basis of the SID. In more detail, the companion device 200 may transmit both the SID and a specific property change of a broadcast service to be notified. Additionally, the companion device 200 may request a plurality of changed specific properties of a broadcast service from the broadcast receiving device 100. At this point, the companion device 200 may request a plurality of specific properties of a broadcast service as in a list form.

The broadcast receiving device 100 receives information signaling a broadcast service property on the basis of a broadcast service in operation S2065. In more detail, the broadcast receiving device 100 may receive information signaling a broadcast service property from the broadcast transmitting device 300 through the broadcast reception unit 110.

The broadcast receiving device 100 checks whether a specific property of a broadcast is changed in operation S2067. In more detail, the broadcast receiving device 100 may check whether a specific property of a broadcast service is changed through the control unit 150. In more detail, the broadcast receiving device 100 may determine whether the specific property of a broadcast service is changed compared to before. In more detail, the broadcast receiving device 100 may determine whether the specific property of a broadcast service is changed by comparing a previous value and the current value of the specific property of the broadcast service.

When the specific property of the broadcast service is changed, the broadcast receiving device 100 notifies the companion device 200 whether the specific broadcast service property is changed on the basis of the information signaling the property of a broadcast service in operation S2069. In more detail, when the specific broadcast service property is changed, the broadcast receiving device 100 notifies the companion device 200 whether the specific broadcast service property is changed through the control unit 150 on the basis of the information signaling the property of a broadcast service.

The companion device 200 requests a specific property of a broadcast service from the broadcast receiving device 100 in operation S2071. In more detail, the companion device 200 may request a specific property of a broadcast service from the broadcast receiving device 100 through a control unit. In more detail, when the broadcast receiving device 100 transmits a specific property change notification of a broadcast service, the companion device 200 may request the specific property of the broadcast service from the broadcast receiving device 100. Specific operations of the companion device 200 may be identical to those in the embodiment of FIG. 37.

The broadcast receiving device 100 notifies the specific property of the broadcast service to the companion device 200 in operation S2073. The broadcast receiving device 100 may notify the specific property of the broadcast service to the companion device 200 through the control unit 150. In more detail, the broadcast receiving device 100 may notify the specific property of the broadcast service on the basis of a request of the companion device 200. For example, the broadcast receiving device 100 may transmit the specific property of the broadcast service that the companion device 200 requests to the companion device 200.

Additionally, the companion device 200 does not obtain the specific property of the broadcast service from the broadcast receiving device 100 but as described with reference to FIG. 42, obtains a URL for obtaining a broadcast service property and then obtains the specific property of the broadcast service on the basis of the URL for obtaining the broadcast service property. Through such an operation, unnecessary operations of the broadcast receiving device 100 to notify the property change of a broadcast service to the companion device 200 may be reduced.

The broadcast receiving device 100 may receive an emergency alert for disaster situations such as natural disasters, terrorism, and war through a network. Additionally, the broadcast receiving device 100 may notify this to users. Through this, many people can recognize national disaster situations quickly and efficiently. However, if a user cannot stare at the broadcast receiving device 100 all the time, there may be an emergency alert situation that is not recognized by the user. Even when a user cannot stare at the broadcast receiving device 100 all the time, it is highly possible for the user to carry the companion device 200 such as a mobile phone or a tablet all the time. Accordingly, if the broadcast receiving device 100 transmits an emergency alert to the companion device 200 and the companion device displays the emergency alert, a national disaster situation can be quickly notified to a user efficiently. This will be described with reference to FIGS. 45 to 57.

FIG. 45 is a view illustrating operations when an emergency alert is generated and transmitted through a broadcast network according to an embodiment of the present invention.

An alert system managing an emergency alert through broadcast service may receive an emergency situation from authorities having the authority to issue an emergency issue through Integrated Public Alert & Warning System (IPWS) or a message according to Common Alerting Protocol (CAP) through other sources. The alert system determines whether a CAP message corresponds to a current region. When the CAP message corresponds to the current region, the alert system inserts the CAP message into a broadcast signal. Accordingly, the CAP message is transmitted through a broadcast signal. An operation of the broadcast receiving device 100 to receive a broadcast signal and transmit an emergency alert to a user is described with reference to FIG. 46.

FIG. 46 is a view when a broadcast receiving device extracts and displays emergency information signaled through a broadcast network according to an embodiment of the present invention.

The broadcast transmitting device 200 may extract an Emergency Alter Table (EAT) on the basis of a broadcast signal and may extract a CAP message from the EAT. Additionally, the broadcast transmitting device 200 may obtain additional information relating to the emergency alert on the basis of an NRT service identifier in the EAT. In more detail, the broadcast receiving device 200 may obtain additional information relating to the emergency alert on the basis of an EAS_NRT_service_id field in the EAT. In more detail, the broadcast receiving device 200 may obtain information on a FLUTE session transmitting additional information relating to the emergency alert from a table signaling NRT service on the basis of the NRT service identifier in the EAT. At this point, the table signaling NRT service may be a Service Map Table (SMT). The broadcast receiving device 200 may receive additional information relating to an emergency alert from a corresponding FLUTE session on the basis of information on the FLUTE session. The broadcast receiving device 200 may receive the emergency alert and may then display it on a service guide displaying information on a broadcast service and a broadcast service program. In more detail, the broadcast receiving device 200 extracts a service identifier from a Guide Access Table (GAT) and extracts and receives information corresponding to the service identifier from a table signaling NRT service. According to a specific embodiment, the broadcast receiving device 200 may obtain information on the FLUTE session of a service corresponding to the extracted service identifier from the GAT. Then, the broadcast receiving device 200 may receive an emergency alert message on the basis of the information on the FLUTE session and may display the emergency alert message on the service guide. The format of the CAP message may be the same as FIG. 47.

Specific operations of the broadcast receiving device 100 and the companion device 200 will be described with reference to FIGS. 48 to 57.

FIG. 48 is a view illustrating a parameter representing a state of an emergency alert that a broadcast receiving device signals, an action for emergency alert, and an action argument according to an embodiment of the present invention.

According to an embodiment of the present invention, the parameter representing a state of an emergency alert may include at least one of a parameter representing information on an emergency alert message including an emergency alert and a parameter representing information on an emergency alert including all emergency alert messages. In more detail, when receiving an emergency alert, the broadcast receiving device 100 may notify the information on the emergency alert message to the companion device 100. The information on the emergency alert will be described with reference to FIG. 49.

FIG. 49 is a view illustrating information on an emergency alert message signaled by a broadcast receiving device according to an embodiment of the present invention.

The information on an emergency alert message may include at least one of the version of an emergency alert, the format of an emergency alert message, the date of receiving an emergency alert message, and the time of receiving an emergency alert message. In more detail, the information may include at least one of messageType representing the format of an emergency alert message, dateTime representing the date of receiving an emergency alert message and the time of receiving an emergency alert message, and version representing the version of an emergency alert. According to a specific embodiment, information on a message including an emergency alert may be in XML format as shown in FIG. 49. However, the format of a message including an emergency alert is not limited thereto.

Again, referring to FIG. 48, a parameter representing a state of an emergency alert that a broadcast receiving device signals, an action for emergency alert, and an action argument are described according to an embodiment of the present invention.

Additionally, the companion device 200 may request information on an emergency alert including all emergency alert messages through an action. At this point, the broadcast receiving device 100 may signal to the companion device 100 the information on an emergency alert including all emergency alert messages through the parameter including information on an emergency alert. According to a specific embodiment, the parameter representing a state of an emergency alert may include at least one of EmergencyAlert and EmergencyAlertProperty. EmergencyAlert includes information on a message including an emergency alert. According to a specific embodiment, EmergencyAlert may be an essential parameter and may have a string data type. The broadcast receiving device 100 may transmit EmergencyAlert through an eventing protocol of UPnP. According to a specific embodiment, when the broadcast receiving device 100 receives an emergency alert, EmergencyAlertProperty includes information on an emergency alert. EmergencyAlertProperty is an essential parameter and may have a string data type. Additionally, an action for requesting information on an emergency alert including all emergency alert message may be GetAllEmergencyAlertMessage. According to a specific embodiment, GetAllEmergencyAlertMessage may be an essential action. Additionally, GetAllEmergencyAlertMessage may have EmergencyAlertProperty as an output argument.

Operations of the broadcast receiving device 100 and the companion device 200 will be described with reference to FIG. 50.

FIG. 50 is a ladder diagram illustrating operations when a broadcast receiving device signals an emergency alert to a companion device according to an embodiment of the present invention.

The broadcast receiving device 100 and the companion device 200 generate a pairing session in operation S2101. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 34.

The companion device 200 requests an emergency alert reception notification from the broadcast receiving device 100 in operation S2103. In more detail, the companion device 200 may request an emergency alert reception notification from the broadcast receiving device 100 through a control unit. In more detail, the companion device 200 may request an emergency alert reception notification from the broadcast receiving device 100 through the UPnP protocol. According to a specific embodiment, the companion device 200 may requests an event subscription for an emergency alert reception notification from the broadcast receiving device 100 on the basis of an eventing protocol.

The broadcast receiving device 100 receives a message including an emergency alert from the broadcast transmission unit 300 in operation S2105. In more detail, the broadcast receiving device 100 may receive an emergency alert message from the broadcast transmitting device 300 through the broadcast reception unit 110.

The broadcast receiving device 100 notifies information on the emergency alert message to the companion device 200 on the basis of the emergency alert message in operation S2107. In more detail, the broadcast receiving device 100 may notify information on the emergency alert message to the companion device 200 through the control unit 150 on the basis of the emergency alert message. According to a specific embodiment, the broadcast receiving device 100 may notify the companion device 200 of the information on the emergency alert message through a parameter representing the information on the emergency alert message. According to a specific embodiment, the parameter representing the information on the emergency alert message may be EmergencyAlert of FIG. 49.

The companion device 200 requests the information on the emergency alert from the broadcast receiving device 100 in operation S2109. In more detail, the companion device 200 may request an emergency alert from the broadcast receiving device 100 through a control unit. According to a specific embodiment, the companion device 200 may request an emergency alert through an action requesting an emergency alert. According to a specific embodiment, the action requesting an emergency alert may be GetEmergencyAlertMessage of FIG. 49.

The broadcast receiving device 100 notifies information on an emergency alert including all emergency alert messages to the companion device 200 in operation S2111. In more detail, the broadcast receiving device 100 may notify information on the emergency alert including all emergency alert messages to the companion device 200 through the control unit 150. However, in such a case, since all emergency alert message need to be transmitted and received, this may serve as a load to operations of the broadcast receiving device 100 and the companion device 200. Accordingly, a method of efficiently transmitting an emergency alert message to the companion device 200 is required.

The broadcast receiving device 100 may extract information necessary for the companion device 200 from an emergency alert message and may then transmit the extracted information to the companion device 200. According to a specific embodiment, the broadcast receiving device 100 may extract from the emergency alert message at least one of an identifier for identifying an emergency alert, information representing the category of an emergency alert, information representing a description for an emergency alert, information representing a region corresponding to an emergency alert, information representing the urgency of an emergency alert, information representing the severity of a disaster causing an emergency alert, and information representing the certainty of a disaster causing an emergency alert. According to a specific embodiment, the broadcast receiving device 100 may extract from the emergency alert message at least one of identifier that is an element for identifying an emergency alert, category that is an element representing the category of an emergency alert, description that is an element representing a description for an emergency alert, areaDesc that is an element representing a region corresponding to an emergency alert, urgency that is an element representing the urgency of an emergency alert, severity that is an element representing the severity of a disaster causing an emergency alert, and certainty that is an element representing the certainty of a disaster causing an emergency alert.

The companion device 200 may determine the priority of an emergency alert and may operate on the basis of the priority of the emergency alert. A method of determining the priority of an emergency alert will be described with reference to FIGS. 51 to 53.

FIGS. 51 to 53 are views illustrating the criteria of a broadcast receiving device to determine the priority of an emergency alert according to an embodiment of the present invention.

The companion device 200 may classify the priority of an emergency alert on the basis of each value of information representing the urgency of an emergency alert, information representing the severity of a disaster causing an emergency alert, and information representing the certainty of a disaster causing an emergency alert. At this point, the companion device 200 may determine the priority of an emergency alert according to a value having the highest priority among information representing the urgency of an emergency alert, information representing the severity of a disaster causing an emergency alert, and information representing the certainty of a disaster causing an emergency alert. According to a specific embodiment, the companion device 200 may classify the priority of an emergency alert into three urgencies according to values of information representing the urgency of an emergency alert, information representing the severity of a disaster causing an emergency alert, and information representing the certainty of a disaster causing an emergency alert. For example, as shown in FIG. 52, it is determined that the companion device 200 has the highest priority when the Urgency element corresponds to Immediate or Expected, has a medium priority lower than the highest priority and higher than the lowest priority when the Urgency element corresponds to Future, has the lowest priority when the Urgency element corresponds to Past, and has a priority corresponding to an initial value when the Urgency element corresponds to Unknown. At this point, the initial value may have a medium priority lower than the highest priority and higher than the lowest priority. Additionally, as shown in FIG. 52, it is determined that the companion device 200 has the highest priority when the Severity element corresponds to Extreme or Severe, has a medium priority lower than the highest priority and higher than the lowest priority when the Severity element corresponds to Moderate, has the lowest priority when the Severity element corresponds to Minor, and has a priority corresponding to an initial value when the Severity element corresponds to Unknown. At this point, the initial value may have a medium priority lower than the highest priority and higher than the lowest priority. Additionally, as shown in FIG. 52, it is determined that the companion device 200 has the highest priority when the Certainty element corresponds to Very likely or likely, has a medium priority lower than the highest priority and higher than the lowest priority when the Certainty element corresponds to Possible, has the lowest priority when the Certainty element corresponds to Unlikely, and has a priority corresponding to an initial value when the Certainty element corresponds to Unknown. At this point, the initial value may have a medium priority lower than the highest priority and higher than the lowest priority.

According to another embodiment, the companion device 200 may assign points on the basis of each value of information representing the urgency of an emergency alert, information representing the severity of a disaster causing an emergency alert, and information representing the certainty of a disaster causing an emergency alert, and may then determine the priority of an emergency alert according to the point sum. According to a specific embodiment, the companion device 200 may assign points with the same weight to information representing the urgency of an emergency alert, information representing the severity of a disaster causing an emergency alert, and information representing the certainty of a disaster causing an emergency alert. For example, as shown in FIG. 53, the companion device 200 may assign five points when the Urgency element corresponds to Immediate, four points when the Urgency element corresponds to Expected, three points when the Urgency element corresponds to Future, two points when Urgency element corresponds to Past, and one point when Urgency element corresponds to Unknown. Additionally, as shown in FIG. 53, the companion device 200 may assign five points when the Severity element corresponds to Extreme, four points when the Severity element corresponds to Severe, three points when the Severity element corresponds to Moderate, two points when Severity element corresponds to Minor, and one point when Severity element corresponds to Unknown. Additionally, as shown in FIG. 53, the companion device 200 may assign five points when the Certainty element corresponds to Very likely, four points when the Certainty element corresponds to likely, three points when the Certainty element corresponds to Possible, two points when Certainty element corresponds to Unlikely, and one point when Certainty element corresponds to Unknown. At this point, when the point sum is greater than 10 or less than 15, the companion device 200 determines that an emergency alert has the highest priority. Additionally, when the point sum is greater than 5 or less than 10, the companion device 200 determines that an emergency alert has a medium priority lower than the highest priority and higher than the lowest priority. Additionally, when the point sum is greater than 0 or less than 5, the companion device 200 determines that an emergency alert has the lowest priority.

Additionally, according to another specific embodiment, the companion device 200 may assign points with different weights to information representing the urgency of an emergency alert, information representing the severity of a disaster causing an emergency alert, and information representing the certainty of a disaster causing an emergency alert. For example, as shown in FIG. 200, the companion device 200 may assign nine points when the Urgency element corresponds to Immediate, eight points when the Urgency element corresponds to Expected, seven points when the Urgency element corresponds to Future, five points when Urgency element corresponds to Past, and zero point when Urgency element corresponds to Unknown. Additionally, as shown in FIG. 54, the companion device 200 may assign five points when the Severity element corresponds to Extreme, four points when the Severity element corresponds to Severe, three points when the Severity element corresponds to Moderate, two points when Severity element corresponds to Minor, and zero point when Severity element corresponds to Unknown. Additionally, as shown in FIG. 54, the companion device 200 may assign six points when the Certainty element corresponds to Very likely, five points when the Certainty element corresponds to likely, four points when the Certainty element corresponds to Possible, three points when Certainty element corresponds to Unlikely, and zero point when Certainty element corresponds to Unknown. At this point, when the point sum is greater than 10 or less than 15, the companion device 200 determines that an emergency alert has the highest priority. Additionally, when the point sum is greater than 5 or less than 10, the companion device 200 determines that an emergency alert has a medium priority lower than the highest priority and higher than the lowest priority. Additionally, when the point sum is greater than 0 or less than 5, the companion device 200 determines that an emergency alert has the lowest priority.

The companion device 200 may display an emergency alert on the basis of the priority of an emergency alert. According to a specific embodiment, the companion device 200 may change at least one of an alarm sound according to an emergency alert, the duration of an alarm, the number of alarms, and an emergency alert display time on the basis of the priority of an emergency alert. For example, as the priority of an emergency alert is higher, the companion device 200 may allow an alarm sound to be higher. Additionally, as the priority of an emergency alert is higher, the companion device 200 may allow an alarm sound to be longer.

According to the embodiments described with reference to FIGS. 50 and 51, the broadcast receiving device 100 needs to transmit all emergency alert message to the companion device 200. However, the companion device 200 may require only part of information of an emergency alert message. Accordingly, the broadcast receiving device 200 requires an operating method thereof to transmit only part of information of an emergency alert message that the companion device 200 requires. This will be described in more detail with reference to FIGS. 54 and 55.

FIG. 54 is a view illustrating a parameter representing a state of an emergency alert that a broadcast receiving device signals, an action for emergency alert, and an action argument according to another embodiment of the present invention.

The companion device 200 may designate specific information of emergency information that the companion device 200 wants to obtain while requesting information on an emergency alert from the broadcast receiving device 100. Specific information of an emergency alert may be one or more information among a plurality of information included in an emergency alert message. At this point, the broadcast receiving device 100 may transmit specific information on an emergency alert to the companion device 200. For this, the companion device 200 may use an action for requesting specific information on an emergency alert. At this point, the action may have a parameter for identifying specific information on an emergency alert as an input argument. According to a specific embodiment, a parameter that the companion device 200 wants to obtain specific information of an emergency alert may be EmergencyAlertField. According to a specific embodiment, EmergencyAlertField may be an essential parameter and may have a string data type. An action for requesting specific information on an emergency alert may be GetEmergencyAlerMessage. GetEmergencyAlerMessage is an essential parameter and may have EmergencyAlertField as an input argument. Specific operations of the broadcast receiving device 100 and the companion device 200 will be described with reference to FIG. 55.

FIG. 55 is a ladder diagram illustrating operations when a broadcast receiving device signals an emergency alert to a companion device according to another embodiment of the present invention.

The broadcast receiving device 100 and the companion device 200 generate a pairing session in operation S2121. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 50.

The companion device 200 requests an emergency alert reception notification from the broadcast receiving device 100 in operation S2123. In more detail, the companion device 200 may request an emergency alert reception notification from the broadcast receiving device 100 through a control unit. In more detail, operations of the companion device 200 may be identical to those in the embodiment of FIG. 50.

The broadcast receiving device 100 receives an emergency alert message including an emergency alert on the basis of broadcast service in operation S2125. In more detail, the broadcast receiving device 100 may receive an emergency alert message including an emergency alert from the broadcast transmitting device 300 through the broadcast reception unit 110.

The broadcast receiving device 100 notifies information on the emergency alert message to the companion device 200 on the basis of the emergency alert message in operation S2127. In more detail, the broadcast receiving device 100 may notify information on the emergency alert message to the companion device 200 through the control unit 150 on the basis of the emergency alert message. Additionally, according to a specific embodiment, the broadcast receiving device 100 may notify the companion device 200 of the information on the emergency alert message through a parameter representing the information on the emergency alert message. According to a specific embodiment, the broadcast receiving device 100 may notify the companion device 200 of the information on the emergency alert message through a parameter representing the information on the emergency alert message. According to a specific embodiment, the parameter representing the emergency alert message may be EmergencyAlert of FIG. 49.

The companion device 200 requests specific information on the emergency alert from the broadcast receiving device 100 in operation S2129. The companion device 200 may requests specific information on the emergency alert from the broadcast receiving device 100 through a control unit. At this point, the specific information on the emergency alert may be information necessary for the companion device 200 to provide additionally information on the emergency alert. According to a specific embodiment, the companion device 200 may request from the broadcast receiving device 100 at least one of an identifier for identifying an emergency alert, information representing the category of an emergency alert, information representing a description for an emergency alert, information representing a region corresponding to an emergency alert, information representing the urgency of an emergency alert, information representing the Severity of a disaster causing an emergency alert, and information representing the certainty of a disaster causing an emergency alert in the emergency alert message. For example, the companion device 200 may request from the broadcast receiving device 100 at least one of identifier that is an element for identifying an emergency alert, category that is an element representing the category of an emergency alert, description that is an element representing a description for an emergency alert, areaDesc that is an element representing a region corresponding to an emergency alert, urgency that is an element representing the urgency of an emergency alert, severity that is an element representing the severity of a disaster causing an emergency alert, and certainty that is an element representing the certainty of a disaster causing an emergency alert in the emergency alert message. According to a specific embodiment, the companion device may request specific information on the emergency alert from the broadcast receiving device 100 through the GetEmergencyAlertMes sage action and EmergencyAlertField of FIG. 54.

The broadcast receiving device 100 extracts specific information on the emergency alert on the basis of the emergency alert message in operation S2131. In more detail, the broadcast receiving device 100 may extract the specific information on the emergency alert through the control unit 150 on the basis of the emergency alert message. In more detail, the broadcast receiving device 100 may extract the specific information on the emergency alert from the emergency alert message through the control unit 150.

The broadcast receiving device 100 notifies a specific property on the emergency alert to the companion device 200 in operation S2133. In more detail, the broadcast receiving device 100 may notify the specific property on the emergency alert to the companion device 200 through the control unit 150. In more detail, the broadcast receiving device 100 may notify the specific property on the emergency alert on the basis of a request of the companion device 200.

However, when the broadcast receiving device 100 interoperates with a plurality of companion devices 200, as the broadcast receiving device 100 directly transmits the specific information on the emergency alert necessary for the companion device 200, this may cause the overload to an operation of the broadcast receiving device 100. Accordingly, a method of signaling an emergency alert to the companion device 200, which reduces the load of the broadcast receiving device 100, may be required. This will be described with reference to FIG. 56.

FIG. 56 is a ladder diagram illustrating operations when a broadcast receiving device signals an emergency alert to a companion device according to another embodiment of the present invention.

The broadcast receiving device 100 and the companion device 200 generate a pairing session in operation S2141. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 55.

The companion device 200 requests an emergency alert reception notification from the broadcast receiving device 100 in operation S2143. In more detail, the companion device 200 may request an emergency alert reception notification from the broadcast receiving device 100 through a control unit. In more detail, operations of the companion device 200 may be identical to those in the embodiment of FIG. 55.

The broadcast receiving device 100 receives an emergency alert message including an emergency alert on the basis of broadcast service in operation S2145. In more detail, the broadcast receiving device 100 may receive an emergency alert message including an emergency alert from the broadcast transmitting device 300 through the broadcast reception unit 110.

The broadcast receiving device 100 notifies a URL for obtaining information on an emergency alert message and information on an emergency alert to the companion device 200 on the basis of the emergency alert message in operation S2147. In more detail, the broadcast receiving device 100 notifies a URL for obtaining information on an emergency alert message and information on an emergency alert to the companion device 200 through the control unit 150 on the basis of the emergency alert message.

The companion device 200 obtains information on an emergency alert on the basis of a URL for obtaining the information on the emergency alert. In more detail, the companion device 200 may obtain information on an emergency alert on the basis of a URL for obtaining the information on the emergency alert through a control unit. In more detail, the companion device 200 may obtain information on an emergency alert from the content/signaling server 400 on the basis of a URL for obtaining the information on the emergency alert. In more detail, the companion device 200 may request information on an emergency alert from the content/signaling server 400 on the basis of a URL for obtaining the information on the emergency alert and may then obtain the information on the emergency alert from the content/signaling server 400. Through this, the load of the broadcast communication device 100 resulting from a communication between the broadcast receiving device 100 and the companion device 200 may be reduced.

When the broadcast receiving device 100 transmits a user interface (UI) representing an emergency alert to the companion device 200, the load for processing the emergency alert of the companion device 200 may be reduced. This will be described with reference to FIG. 57.

FIG. 57 is a ladder diagram illustrating operations when a broadcast receiving device signals an emergency alert to a companion device according to another embodiment of the present invention.

The broadcast receiving device 100 and the companion device 200 generate a pairing session in operation S2161. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 56.

The companion device 200 requests an emergency alert reception notification from the broadcast receiving device 100 in operation S2163. In more detail, the companion device 200 may request an emergency alert reception notification from the broadcast receiving device 100 through a control unit. In more detail, operations of the companion device 200 may be identical to those in the embodiment of FIG. 56.

The broadcast receiving device 100 receives an emergency alert message including an emergency alert on the basis of broadcast service in operation S2165. In more detail, the broadcast receiving device 100 may receive an emergency alert message including an emergency alert from the broadcast transmitting device 300 through the broadcast reception unit 110.

The broadcast receiving device 100 notifies information on an emergency alert message and UI information on an emergency alert to the companion device 200 on the basis of the emergency alert message in operation S2167. In more detail, the broadcast receiving device 100 notifies the information on the emergency alert message and the UI information on the emergency alert to the companion device 200 through the control unit 150 on the basis of the emergency alert message. At this point, the UI information on the emergency alert may include a list of UIs representing the emergency alert.

The companion device 200 requests a UI for emergency alert from the broadcast receiving device 100 on the basis of the UI information on the emergency alert in operation S2169. In more detail, the companion device 200 may request a UI for emergency alert from the broadcast receiving device 100 through a control unit on the basis of the UI information on the emergency alert.

The broadcast receiving device 100 transmits a URI for obtaining the UI for emergency alert to the companion device 200 on the basis of a request of the companion device 200 in operation S2171. The broadcast receiving device 100 may transmit a UI for obtaining the UI for emergency alert through the control unit 150 on the basis of a request of the companion device 200.

The companion device 200 displays the UI for emergency alert on the basis of a URI for obtaining the UI for emergency alert in operation S2173. The companion device 200 may display a UI for emergency alert on the basis of a URI for obtaining the UI for emergency alert. In more detail, the companion device 200 may obtain a UI on the basis of a URI for obtaining the UI for emergency alert. At this point, the companion device 200 may obtain the UI for emergency information fro an external server. For example, the companion device 200 may receive at least one of image files, HTML files, and XML files for the UI for emergency information. At this point the external server may be the content/signaling server 400. According to another specific embodiment, the companion device 200 may store a UI for emergency alert in advance and may call a UI corresponding to URI among stored UIs. Additionally, the companion device 200 may display the UI for emergency obtained through such an operation. Since the companion device 200 processes an emergency alert through such an operation, the load of the companion device 200 may be reduced.

Hereinafter, a companion screen or companion device model according to an embodiment of the present invention will be described. The companion screen or companion device model according to the present embodiment may be referred to as a second screen model (or second screen). This may be changed by a designer.

As described above, when a primary device (PD) and a companion device (CD) are linked to each other and shared for services provided by the above-described broadcast transmission and reception system, the companion screen model according to the present embodiment may refer to the entire system including a broadcast transmitter that provides a broadcast service, the PD, the CD, and the like.

The PD according to the present embodiment may include the TV receiver or the receiver that processes broadcast signals described with reference to FIGS. 1 to 29. The PD according to the present embodiment may receive contents received through a broadband channel in addition to broadcast signals transmitted through a broadcast channel. The broadcast signals transmitted through the broadcast channel may include the broadcast services described with reference to FIG. 31. A service provided by the broadcast signals and the contents according to the present embodiment may be referred to as a hybrid broadcast service. The term and definition may be changed by a designer.

In addition, the CD according to the present embodiment may include a second screen device of the PD such as a smart phone, a tablet PC, a laptop computer, or the like. Discovery and pairing between the PD and the CD may be performed in accordance with a general scheme used in a second screen support-related technical field, which may be changed by a designer.

Hereinafter, attributes of the PD and the CD for the companion screen or companion device model according to the present embodiment, and attributes of a primary content component and a supplementary content component will be described.

The PD according to an embodiment of the present invention can include the following attribute.
Unique ID
User-friendly name (e.g., Living room TV)
User-friendly Device Type (e.g., "TV")
Manufacturer
Model (Device model name or number given by the manufacturer)
OS (e.g., Android 4.1.2)
Display capabilities (e.g., screen size, resolution, aspect ratio, 3D-capable)
Supported video formats
Internet access capabilities (speed, state)
Storage capabilities (total space, available space)
Content rights permissions (e.g., user is a valid subscriber to a given service)
User profile data
Known companion device(s)
Supported connection mechanisms (to companion device(s))
Connection type/speed to the companion device(s)
The above mentioned objects or attributes of the PD may be optionally chosen or deleted according to designer's intention. Also, additional parameters can be added according to designer's intention.

The CD according to an embodiment of the present invention can include the following attribute.
Unique ID
User-friendly name (e.g., John's iBla)
User-friendly Device Type (e.g., "Smartphone")
Manufacturer
Model (Device model name or number given by the manufacturer)
OS (e.g., Android 4.1.2)
Input capabilities (e.g., touch screen, keyboard)
Display capabilities (e.g., screen size, resolution, aspect ratio, 3D-capable)
Supported video formats
Internet access capabilities (speed, state)
Storage capabilities (total space, available space)
Content rights permissions (e.g., user is a valid subscriber to a given service)
User profile data
Known primary device(s)
Supported connection mechanisms (to primary device(s))
Connection type/speed/state to the primary device
The above mentioned objects or attributes of the CD may be optionally chosen or deleted according to designer's intention. Also, additional parameters can be added according to designer's intention.

The primary content component according to an embodiment of the present invention which is presented on the PD can include the following attribute.
Unique ID
Type
Audio-only component
Video-only component
Closed Caption component
Data component
Content component properties
Varies by component type (see Service Conceptual Model)
Essential device capabilities
Synchronization requirements (i.e., how accurate the synchronization with the PD must be)
Non-essential device capabilities
Targeting and personalization properties
Content advisory properties
Content rights properties
Service usage reporting properties
The above mentioned objects or attributes of the primary content component may be optionally chosen or deleted according to designer's intention.

The supplementary content component according to an embodiment of the present invention which is presented on the CD can include the following attribute.

Unique ID
Type
Audio-only component
Video-only component
Closed Caption component
Data component
Content component properties
Varies by component type (see Service Conceptual Model)
Essential device capabilities
Synchronization requirements (i.e., how accurate the synchronization with the PD must be)
Non-essential device capabilities
Targeting and personalization properties
Content advisory properties
Content rights properties
Service usage reporting properties The above mentioned objects or attributes of the supplementary content component may be optionally chosen or deleted according to designer's intention.

Hereinafter, operations of the companion screen model according to an embodiment of the present invention will be described.

The operations are required to support the CD requirements for the companion screen model according to an embodiment of the present invention.

There are five types of functions supported:

A. Using the PD to stream continuous components that are part of the service that is currently selected on the PD for simultaneous presentation on the CD. The components could be the same as those being presented on the PD or could be alternative components not currently presented on the PD.

B. Using the PD to deliver files or data to the CD that is part of the service currently selected on the PD. The data could include how/where to access content from sources other than the PD (e.g., URL of a remote server). The CD could request a single particular file or data package, or the CD could request to "subscribe" to a series of particular files or data.

C. Using the PD to deliver media timeline information to the CD for the service currently selected on the PD so that the CD can synchronize content it is presenting with content being presented on the PD.

D. Using a CD Application (CD App) in cooperation with a PD Application (PD App). The PD App could be an enhancement app that is part of a Scheduled Linear Service or could be an app that is part of an App-Based (unscheduled) Service.

E. EAM Delivery—Using the PD to deliver Emergency Alert Messages to the CD. This may be particularly important when the CD is displaying continuous content because the viewer may not be focused on the PD and may not even be in the same room as the PD when the emergency alert appears.

It is anticipated that the appropriate paradigm for CD support is a client-server paradigm, with the PD in the server role. I.e., the PD would support certain CD support operations, which a CD could invoke. Each interaction would be initiated by a request from the client (CD) to the server (PD) to invoke a particular operation. Two-way communications would be initiated by a request from a client (CD) to a server (PD) to set up the communications. A stream of asynchronous notifications from a PD to a CD would be initiated by a client (CD) request to the server (PD) asking to subscribe to the stream of notifications. All messages described below are unicast except where noted. A security mechanism may be needed to validate CD app requests.

In some operations, the CD is provided with a URL to retrieve content from a remote server. It is possible in these cases that the CD will provide information about itself to the remote server to enable the remote server to deliver a version of the requested content that is appropriate to the particular CD. For instance, the related standard ATSC 2.0 specified a "User Agent" for this purpose that is based on HbbTV specification. It can be changed according to designer's intention.

Therefore, as described in the above embodiment, in the companion screen model according to the present embodiment, the CD may receive continuous components, files, data, and the like associated with content displayed in the PD, and display the received continuous components, files, data, and the like. In addition, when the CD receives media timeline information from the PD to display supplementary contents, the CD may adjust synchronization between the contents and contents displayed in the PD. In addition, the CD may receive EAM information from the PD based on a subscription or receive a notification in advance. Moreover, the companion screen model according to the present embodiment may provide PD App to CD App communication.

Hereinafter, a specific operation between the PD and the CD for the above-described five types of functions, and associated parameters will be described.

Hereinafter, device discovery in the companion screen model according to an embodiment of the present invention will be described.

Both the PD and the CD application (hereinafter CD App) are capable of sending multicast discovery messages announcing their presence and broadcast services of the present invention support.

It is possible that the household has more than one PD on the home network, so a CD app could receive discovery messages from multiple PDs. In that case, the CD app can ask the user which one(s) to interact with (displaying information from the discovery messages to help the user decide).

Hereinafter, a request (or message) and a response (or message) used for the device discovery will be described.

For the CD App, a CD App Search Request Message for looking up PD (multicast) may be used. The CD App Search Request Message can be referred as CD app announcement Message.

When the CD joins the network or the CD App starts or the CD App is launched. A discovery scan is initiated within the CD App (e.g., user wants to connect to a new or different TV receiver, initiates new scan) periodically or anytime depending on implementation.

For this operation, the required parameters for the CD App Search Request Message are as follows:

Device and/or Service type CD app is looking for (to avoid responses from DVD players, etc.)
CD Device identification (ID)
CD App ID
CD App version The above mentioned parameters may be changed or optionally chosen or deleted according to designer's intention. Also, additional parameters can be added according to designer's intention.

For the PD, a PD Advertisement Message (multicast) may be used. The PD Advertisement Message can be referred as a PD Announcement Message.

When the PD joins the network/LAN (multicast) or at the time of a change in the list of CD support operations the PD offers, the PD can send PD Advertisement Message, periodically depending on implementation. Or the PD can send the PD Advertisement Message upon receiving a multicast request from a CD for the PD Advertisement Message (multicast or unicast).

For this operation, the required parameters for the PD Advertisement Message are as follows:

PD Device ID
PD Device type (a TV Set for the related broadcasting system e.g., ATSC 3.0 standard) and version (of the related broadcasting system support)
User-friendly name of PD (e.g., Living Room TV)
CD Support operations supported The above mentioned parameters may be changed or optionally chosen or deleted according to designer's intention. Also, additional parameters can be added according to designer's intention.

For the PD, a PD Search Response Message may be required in a unicast environment.

When the PD receives a multicast Search request from the CD, the PD can send the PD Search Response Message to the CD.

The parameters of the PD Search Response Message are as follows:

PD Device ID
PD Device type (a TV Set for the related broadcasting system e.g., ATSC 3.0 standard) and version (of the related broadcasting system support)
User-friendly name of PD (e.g., Living Room TV)
CD Support operations supported The above mentioned parameters may be changed or optionally chosen or deleted according to designer's intention. Also, additional parameters can be added according to designer's intention.

Hereinafter, a subscription based on content identification (or service identification) in the companion screen model according to an embodiment of the present invention will be described.

Some CD apps may be designed for just one Show (e.g., an "American Idol" companion app) or just one Service (e.g., the WBZ Channel 4 companion app), while others may be designed to operate across Services and Shows. It is also possible that a CD app may be designed to accompany interstitials (e.g., the Ford truck app). Thus, the CD app will need to know what Service is currently selected on the PD and track Service changes (e.g., channel changes), and in some cases the CD app will also need to know which Show or even which Segment is currently being presented and also track those changes. In the present invention, the content identification can be referred as service identification.

Hereinafter, a request (or message) and a response (or message) used for the subscription based on the content identification (or service identification) will be described.

For the CD, a Content Identification Subscription Request may be used. The Content Identification Subscription Request can be send anytime. The specific environment can be determined according to the designer's intention.

For this operation, the required parameters for Content Identification Subscription Request according to an embodiment of the present invention are as follows:

Subscription callback URL/information
Requested subscription duration
CD Information (e.g. CD Device ID, CD App ID, CD App Version etc.)
Notifications are requested (e.g., Service selected, Show playing, Segment playing, Service Guide info for selected service)
IP address and port for sending the notification messages The above mentioned parameters may be changed or optionally chosen or deleted according to designer's intention. Also, additional parameters can be added according to designer's intention.

For the PD, a Content Identification Subscription Response can be used. The Content Identification Subscription Response can be referred as a Service Identification Response.

The PD can send the Content Identification Subscription Response as an initial response upon receiving subscription the Content Identification Subscription Request from the CD or send the Content Identification Subscription Response as subsequent responses every time the content changes (i.e., upon change of Service, Show or Segment).

For this operation, the required parameters for the Content Identification Subscription Response are as follows:

PD Device ID
Subscription identification (ID)
Confirmed Subscription duration
Service ID, Show ID, and/or Segment ID (according to notification requested)
For each ID:
Available Media Timeline Checkpoint frequencies, e.g., n/a, every two seconds, every n frames, etc. (see Request Media Timeline Checkpoints below) and Timeline format (e.g., NTP, etc.)
Available Information, e.g., textual name, description, logo, other ESG info (rating, etc.)
Available components that the PD can stream to the CD (see Request Continuous Content from a PD below)
For each component,
Component identification (ID)
Component Type (audio, video, closed caption, etc.)
Component Name
Component Description
Component characteristics (e.g., bit rate, aspect ratio, device capabilities required/desired, etc.)
Available files and data that the PD provides to the CD (see Request Data/file from PD below)
For each file or data element
File/data ID
File/data Type
File/data Name
File/data Description
File/data characteristics (e.g., size, codec, device capabilities require/desired, etc.)
Available as subscription or one-off or both
Location to access data/file (e.g., from the PD, from a remote server at certain URL, etc.)

The above mentioned parameters may be changed or optionally chosen or deleted according to designer's intention. Also, additional parameters can be added according to designer's intention.

For the CD, a Content Identification Subscription Renew/Cancel Request can be used.

Before subscription timeout to renew subscription or anytime to cancel subscription, the CD can send the Content Identification Subscription Renew/Cancel Request.

For this operation, the required parameters for the Content Identification Subscription Renew/Cancel Request are as follows:

Subscription ID

Requested subscription duration to renew subscription

CD information (e.g. CD Device ID, CD App ID, CD App Version etc.)

The above mentioned parameters may be changed or optionally chosen or deleted according to designer's intention. Also, additional parameters can be added according to designer's intention.

For the PD, a Content Identification Subscription Renew/Cancel Response can be used.

Upon receiving the Content Identification Subscription Renew/Cancel Request from the CD, the PD can send the Content Identification Subscription Renew/Cancel Response.

For this operation, the required parameters for the Content Identification Subscription Renew/Cancel Response are as follows:

Subscription ID, Confirmed Subscription Duration for subscription renewal request The above mentioned parameters may be changed or optionally chosen or deleted according to designer's intention. Also, additional parameters can be added according to designer's intention.

For the PD, a Content Identification Message can be used.

Upon receiving subscription request or when Current Content's Identification or its associated information is changed, the PD can send the Content Identification Message.

For this operation, the required parameters for the Content Identification Message are as follows:

Service ID, Show ID, and/or Segment ID

Current temporal location within the given Show and/or Segment

For each ID:

Available Information, e.g., textual name, description, logo, other ESG info (rating, etc.)

Available Continuous Components

For each component:

Component ID

Component Type

Component Name

Component Description

Component characteristics (e.g., bit rate, aspect ratio, device capabilities required/desired, etc.)

Component filter criteria (e.g., targeted to certain demographic profiles)

Location (e.g. URLs or IP address, port, protocol) of each component (location may point to stream coming from PD or directly from Internet).

Available files and data

For each file or data element:

File/data ID

File/data Type

File/data Name

File/data Description

File/data characteristics (e.g., size, codec, device capabilities require/desired, etc.)

Available as subscription or one-off or both

Component filter criteria (e.g., targeted to certain demographic profiles)

Location to access data/file (e.g., from the PD, from a remote server at certain URL, etc.)

The above mentioned parameters may be changed or optionally chosen or deleted according to designer's intention. Also, additional parameters can be added according to designer's intention.

For the CD, a Response to Content Identification Message can be used.

Upon receipt of the Content Identification Message from the PD, the CD can send the Response to Content Identification Message.

For this operation, the required parameter for the Response to Content Identification Message is as follows:

CD Device ID (or CD App ID)

The above mentioned parameter may be changed or optionally chosen or deleted according to designer's intention. Also, additional parameters can be added according to designer's intention.

Hereinafter, Request ESG-type Information about a service, show or segment in the companion screen model according to an embodiment of the present invention will be described.

For the CD, a Service/Show/Segment Information Request can be used. The CD can send the Service/Show/Segment Information Request anytime. It's up to a designer's intention.

For this operation, the required parameters for the Service/Show/Segment Information Request are as follows:

CD Device ID

CD App ID

CD app version

Service/Show/Segment ID

Information requested (from available information, see Subscribe to Service Identification above)

The above mentioned parameters may be changed or optionally chosen or deleted according to designer's intention. Also, additional parameters can be added according to designer's intention.

For the PD, a Service/Show/Segment Information Response can be used.

The PD can send the Service/Show/Segment Information Response upon receiving the Service/Show/Segment Information Request from the CD.

For this operation, the required parameters for the Service/Show/Segment Information Response are as follows:

PD Device ID

Service/Show/Segment ID (according to notification requested)

Service, Show or Segment information (according to info requested, see Subscribe to Service Identification above)

The above mentioned parameters may be changed or optionally chosen or deleted according to designer's intention. Also, additional parameters can be added according to designer's intention.

Hereinafter, request/response-based content identification in the companion screen model according to an embodiment of the present invention will be described.

In addition to subscription based approach and follow-on request as described above, the CD is also able to directly obtain information about currently running service/show/segment on the PD without first having to subscribe to service identification, using a single transaction request-response style communication from the CD to the PD as follows.

Hereinafter, a request (or message) and a response (or message) used for the request/response-based content identification will be described.

For the CD, a Content Identification Request Message can be used.

Any time when needed by the app, the CD can send the Content Identification Request Message.

For this operation, the required parameters for the Content Identification Request Message are as follows:

filtering criterion (e.g. component characteristics)

CD information (e.g. CD Device ID, CD App ID, CD App Version etc.)

The above mentioned parameters may be changed or optionally chosen or deleted according to designer's intention. Also, additional parameters can be added according to designer's intention.

For the PD, a Response to Content Identification Request Message can be used.

Upon receipt of a Content Identification Request Message from the CD, the PD can send the Response to Content Identification Request Message.

For this operation, the required parameters for the Response to Content Identification Request Message are as follows:

Content information

Filtered by the filtering criterion in the Content Identification Request Message PD information (e.g. PD Device ID, etc.)

The above mentioned parameters may be changed or optionally chosen or deleted according to designer's intention. Also, additional parameters can be added according to designer's intention.

Hereinafter, "Request continuous component from the PD" in the companion screen model according to an embodiment of the present invention will be described.

If a PD Service Information Response includes the availability and access location of Continuous Components that can be streamed from the PD, the CD can request to receive this stream. (Continuous Components may also be available from a remote server via broadband, but the specification for requesting such content is out of scope of this document.

Hereinafter, a request (or message) and a response (or message) used for "Request continuous component from the PD" will be described.

For the CD, a Continuous Component Request can be used.

The CD can send Continuous Component Request any time. It's up to a designer's intention.

For this operation, the required parameters for the Continuous Component Request are as follows:

Component ID

CD information (e.g. CD Device ID, CD App ID, CD App Version etc.)

For each component: a start request or a stop request of the stream

The above mentioned parameters may be changed or optionally chosen or deleted according to designer's intention. Also, additional parameters can be added according to designer's intention.

For the PD, a Continuous Component Request Response can be used.

The PD can send the Continuous Component Request Response upon receiving valid the Continuous Component Request.

For this operation, the required parameters for the Continuous Component Request Response are as follows:

Component ID

Access Location of the Component

PD information (e.g. PD Device ID, etc.)

If responding to a Start request:

start the media stream (unless it is already streaming)

IP address and port that the desired stream is on

If responding to a Stop request: acknowledgement

The above mentioned parameters may be changed or optionally chosen or deleted according to designer's intention. Also, additional parameters can be added according to designer's intention.

After the CD obtains the access location of a component (i.e., URL), it can pull the content via HTTP GET method without specifying something new. In addition, because the stream is "pulled" by the CD not "pushed" by the PD (i.e., the streaming is controlled by CD), there is no need to define messaging protocols between the PD and the CD to control stream (e.g., "Start" or "Stop").

Hereinafter, "Request data/file from the PD" in the companion screen model according to an embodiment of the present invention will be described.

If a PD Service Information Response includes the availability of data or file Components that can be accessed from the PD, the CD can request to receive the component(s). (Data/file components may also be available from a remote server via broadband, but the specification for requesting such content is out of scope of this document.)

Hereinafter, a request (or message) and a response (or message) used for "Request data/file from the PD" will be described.

For the CD, a Data/file Request can be used.

The CD can send the Data/file Request any time. It's up to a designer's intention.

For this operation, the required parameters for the Data/file Request are as follows:

Data/File identification (ID)(s) for the item(s) the CD app wishes to receive (see Subscribe to Service Identification above)

If subscription is an option: specify if subscription is desired; if so, specify Start or Stop receiving subscription CD information (e.g. CD Device ID, CD App ID, CD App Version etc.)

The above mentioned parameters may be changed or optionally chosen or deleted according to designer's intention. Also, additional parameters can be added according to designer's intention.

For the PD, a Data/File Request Response can be used.

Upon receiving the Data/file Request the PD may send the Data/File Request Response. If subscription request is received, the PD may send additional data/files according to notifications in the broadcast stream.

For this operation, the required parameters for the Data/File Request Response are as follows:

Access Location of the Data/file

Data/File ID(s) for the requested item(s)

PD information (e.g. PD Device ID, etc.)

If stop subscription stop request: acknowledgement

Else the data/file(s) themselves

The above mentioned parameters may be changed or optionally chosen or deleted according to designer's intention. Also, additional parameters can be added according to designer's intention.

Hereinafter, "Request media timeline checkpoints" in the companion screen model according to an embodiment of the present invention will be described.

If the CD has accessed supplementary content from the PD directly or from another source (e.g., a remote server), it may need on-going media timeline information from the PD in order to maintain sync between the content displaying on the CD and the content displaying on the PD.

"Request media timeline checkpoints" according to the present embodiment may be performed according to a subscription-based approach and a request-response based approach.

The subscription based approach as well as single request response approach is supported for receiving the timeline checkpoints from the PD. Since the CD may have an accurate internal clock, the request response architecture allows polling the timeline at desired interval by the CD to stay in synch with PD.

Hereinafter, a request (or message) and a response (or message) used according to the subscription-based approach will be described.

The Subscription based approach:

For the CD, a Media Timeline Checkpoints Subscription Request can be used.

The CD can send the Media Timeline Checkpoints Subscription Request any time. It's up to a designer's intention.

For this operation, the required parameters for the Media Timeline Checkpoints Subscription Request are as follows:
Service/Show/Segment ID of interest
Notification frequency
Requested frequency to receive temporal updates which should not exceed the Maximum frequency to be specified. (e.g., not more often than every 2 seconds); if Notification frequency is not specified, the receiver will determine the frequency, or should set to a default value to be specified.
Subscription callback URL/information
Requested subscription duration
CD Information (e.g. CD Device ID, CD App ID, CD App Version etc.)
Service/Show/Segment ID of interest
Start or stop receiving timeline checkpoints
If start: Frequency desired from available frequencies (see Subscribe to Service Identification above)

The above mentioned parameters may be changed or optionally chosen or deleted according to designer's intention. Also, additional parameters can be added according to designer's intention.

For the PD, a Media Timeline Checkpoints Subscription Response can be used.

The PD can send the Media Timeline Checkpoints Subscription Response as an initial response upon request from the CD app or send the Media Timeline Checkpoints Subscription Response as subsequent responses with the confirmed Notification frequency.

For this operation, the required parameters for the Media Timeline Checkpoints Subscription Response are as follows:
PD Device ID
Service/Show/Segment ID of interest
Subscription ID
Confirmed Subscription duration
Confirmed Notification frequency
If responding to a Start request: Media timeline data
If responding to a Stop request: acknowledgement The above mentioned parameters may be changed or optionally chosen or deleted according to designer's intention. Also, additional parameters can be added according to designer's intention. For the CD, a Media Timeline Checkpoints Subscription Renew/Cancel Request can be used.

Before subscription timeout to renew subscription or anytime to cancel subscription For this operation, the required parameters for the Media Timeline Checkpoints Subscription Renew/Cancel Request are as follows:
Subscription ID
Requested subscription duration to renew subscription
CD information (e.g. CD Device ID, CD App ID, CD App Version etc.)

The above mentioned parameters may be changed or optionally chosen or deleted according to designer's intention. Also, additional parameters can be added For the PD, a Media Timeline Checkpoints Subscription Renew/Cancel Response can be used.

Upon receiving the Media Timeline Checkpoints Subscription Renew/Cancel Request, the PD can send the Media Timeline Checkpoints Subscription Renew/Cancel Response.

For this operation, the required parameters for the Media Timeline Checkpoints Subscription Renew/Cancel Response are as follows:
Subscription ID
Confirmed Subscription Duration for subscription renewal request The above mentioned parameters may be changed or optionally chosen or deleted according to designer's intention. Also, additional parameters can be added according to designer's intention.

For the PD, a Media Timeline Checkpoints Message can be used.

The PD can send the Media Timeline Checkpoints Message upon receiving subscription request. Or the PD can send the Media Timeline Checkpoints Message periodically with the Confirmed Notification frequency.

For this operation, the required parameter for the Media Timeline Checkpoints Message is as follows:
Media Timeline information The above mentioned parameter may be changed or optionally chosen or deleted according to designer's intention. Also, additional parameters can be added according to designer's intention.

For the CD, a Response to Media Timeline Checkpoints Message can be used.

The CD can send the Response to Media Timeline Checkpoints Message upon receipt of a Media Timeline Checkpoints Message from the PD.

For this operation, the required parameter for the Response to Media Timeline Checkpoints Message is as follows:
CD Device ID (or CD App ID)

The above mentioned parameter may be changed or optionally chosen or deleted according to designer's intention. Also, additional parameters can be added according to designer's intention.

Hereinafter, a request (or message) and a response (or message) used according to the request-response based approach will be described.

The Request-response based approach:

For the CD, a Request to Media Timeline Checkpoints Message can be used.

The CD can send the Request to Media Timeline Checkpoints Message. It's up to a designer's intention.

For this operation, the required parameter for the Request to Media Timeline Checkpoints Message is as follows:
CD Device ID (or CD App ID)

The above mentioned parameter may be changed or optionally chosen or deleted according to designer's intention. Also, additional parameters can be added according to designer's intention.

For the PD, a Media Timeline Checkpoints Message can be used.

The PD can send the Media Timeline Checkpoints Message upon receipt of the Request to Media Timeline Checkpoints Message from the CD.

For this operation, the required parameter for the Media Timeline Checkpoints Message is as follows:

Media Timeline information

The above mentioned parameter may be changed or optionally chosen or deleted according to designer's intention. Also, additional parameters can be added according to designer's intention.

Hereinafter, media playback state information communication in the companion screen according to an embodiment of the present invention will be described.

An operation to convey media playback state on the PD to the CD is supported. This can be useful when the CD is playing back a media stream in synchronization with PD.

Hereinafter, a request (or message) and a response (or message) used for the media playback state information communication will be described.

For the CD, a CD subscription request to PD to receive current media playback state information can be used.

The CD can send the CD subscription request any time when needed by the CD app.

For this operation, the required parameters for the CD subscription request are as follows:
  URL/ID for which media playback state is requested
  Media state subscription callback URL/information
  Requested subscription duration
  CD Information (e.g. CD Device ID, CD App ID, CD App Version etc.)

The above mentioned parameters may be changed or optionally chosen or deleted according to designer's intention. Also, additional parameters can be added according to designer's intention.

For the PD, a PD media playback state subscription response can be used.

The PD can send the PD media playback state subscription response upon receiving current media playback state subscription information request (The CD subscription request).

For this operation, the required parameters for the PD media playback state subscription response are as follows:
  PD Device ID
  Media playback state subscription ID
  Confirmed Subscription duration For the CD, a media playback state Subscription Renew/Cancel Request can be used.

Before subscription timeout to renew subscription or anytime to cancel subscription, the CD can send the media playback state Subscription Renew/Cancel Request.

For this operation, the required parameters for the media playback state Subscription Renew/Cancel Request are as follows:
  Subscription ID
  Requested subscription duration to renew subscription
  CD information (e.g. CD Device ID, CD App ID, CD App Version etc.)

The above mentioned parameters may be changed or optionally chosen or deleted according to designer's intention. Also, additional parameters can be added according to designer's intention.

For the PD, a media playback state Subscription Renew/Cancel Response can be used.

The PD can send the media playback state Subscription Renew/Cancel Response upon receiving the media playback state Subscription Renew/Cancel Request from the CD.

For this operation, the required parameters for the media playback state Subscription Renew/Cancel Response are as follows:
  Subscription ID
  Confirmed Subscription Duration for subscription renewal request The above mentioned parameters may be changed or optionally chosen or deleted according to designer's intention. Also, additional parameters can be added according to designer's intention.

For the PD, a PD notification of media playback state to CD can be used.

When the media playback state on the PD is changed, the PD can send the PD notification of media playback state. Or the PD can send the PD notification of media playback state periodically.

For this operation, the required parameters for the PD notification of media playback state are as follows:
  Current media playback state information for the requested URL/ID.
  The state can be e.g. Playing, Paused, Stopped, Fast Forward (Speed of Fast Forward), Fast Backward (Speed of Fast Backward), Buffering.

The above mentioned parameters may be changed or optionally chosen or deleted according to designer's intention. Also, additional parameters can be added according to designer's intention.

For the CD, a Response to media playback state Message can be used.

The CD can send the Response to media playback state Message upon receipt of the PD notification of media playback state from the PD.

For this operation, the required parameters for the Response to media playback state Message is as follows:
  CD Device ID (or CD App ID)

The above mentioned parameter may be changed or optionally chosen or deleted according to designer's intention. Also, additional parameters can be added according to designer's intention.

Hereinafter, PD App to CD App Communication in the companion screen model according to an embodiment of the present invention will be described.

In some instances a PD App and a CD App may be designed to work in tandem. In this case it is expected that the app designer determine the details of app-to-app communication. Both the PD and CD apps can include information for the user about the other app and how to download and launch the other app. The CD app could also include a mechanism to always "listen for" an announcement message from the PD app even if the CD app is not currently launched. It is not anticipated that this invention will specify any standards for this operation.

Hereinafter, transmission Emergency Alert Messages (EAM) from the PD to the CD in the companion screen model according to an embodiment of the present invention will be described.

As described in FIG. 18, EAC is a dedicated channel for carrying EAS messages and links to the DPs for EAS. The EAS according to an embodiment of the present invention can be transmitted within a signal frame (or frame) and EAM can include specific information of the EAS. The details have been described and thus will be omitted here.

Subscription based delivery of Emergency Alert Messages from PD to CD is supported using message exchange as shown below.

Hereinafter, a request (or message) and a response (or message) used for transmission Emergency Alert Messages (EAM) will be described.

For the CD, a CD Subscription request to PD to receive Emergency Alert Messages can be used.

The EAM functionality is enabled when the CD joins the network (or CD app starts). The CD can send the CD Subscription request to PD to receive Emergency Alert Messages.

For this operation, the required parameters for the CD Subscription request are as follows:

Subscription callback URL/information
Requested subscription duration
EAM Filtering criterion (e.g. geo-location)
CD Information (e.g. CD Device ID, CD App ID, CD App Version etc.)

The above mentioned parameters may be changed or optionally chosen or deleted according to designer's intention. Also, additional parameters can be added according to designer's intention.

For the PD, a PD EAM Subscription Response can be used.

The PD can send the PD EAM Subscription Response upon receiving the CD Subscription request from the CD.

For this operation, the required parameters for the PD EAM Subscription Response are as follows:

PD Device ID
Subscription ID
Confirmed Subscription duration

The above mentioned parameters may be changed or optionally chosen or deleted according to designer's intention. Also, additional parameters can be added according to designer's intention.

For the CD, a CD EAM Subscription Renew/Cancel Request can be used. The CD can send the CD EAM Subscription Renew/Cancel Request before subscription timeout to renew subscription or anytime to cancel subscription.

For this operation, the required parameters for the CD EAM Subscription Renew/Cancel Request are as follows:

Subscription ID
Requested subscription duration to renew subscription
CD information (e.g. CD Device ID, CD App ID, CD App Version etc.)

The above mentioned parameters may be changed or optionally chosen or deleted according to designer's intention. Also, additional parameters can be added according to designer's intention.

For the PD, a PD EAM Subscription Renew/Cancel Response can be used.

The PD can send the PD EAM Subscription Renew/Cancel Response upon receiving the CD EAM Subscription Renew/Cancel Request.

For this operation, the required parameters for the PD EAM Subscription Renew/Cancel Response is as follows:

Subscription ID, Confirmed Subscription Duration for subscription renewal request The above mentioned parameter may be changed or optionally chosen or deleted according to designer's intention. Also, additional parameters can be added according to designer's intention.

For the PD, a PD Notification of Emergency Alert Message can be used. The PD Notification of Emergency Alert Message can be referred as a PD Announcement of Emergency Alert Message (multicast).

The PD can send the PD Notification of Emergency Alert Message upon receipt of an Emergency Alert Message.

For this operation, the required parameters for the PD Notification of Emergency Alert Message are as follows:

Subscription ID
Initial contents of EAM
Characteristics of initial contents of EAM
TBD (e.g., new message, continual or one-time message, includes rich media as well as text)
Additional content available The above mentioned parameters may be changed or optionally chosen or deleted according to designer's intention. Also, additional parameters can be added according to designer's intention.

For the CD, a CD Response to Emergency Alert Message can be used.

The CD can send the CD Response to Emergency Alert Message upon receipt of an Emergency Alert Message from the PD.

For this operation, the required parameters for the CD Response to Emergency Alert Message are as follows:

CD Device ID (or CD App ID)
CD App ID
CD app version
Acknowledgement of message
a request for additional content according to content characteristics)

The above mentioned parameters may be changed or optionally chosen or deleted according to designer's intention. Also, additional parameters can be added according to designer's intention.

Many response messages according to an embodiment of the present invention may indicate success/failure in addition to parameters mentioned above.

Some of the parameters noted above as "CD information (e.g. CD Device ID, CD App ID, CD App Version etc.)", "PD information (e.g. PD Device ID, etc.)" may become required for security purposes.

Hereinafter, use cases of the companion screen model according to an embodiment of the present invention will be described.

The First Embodiment

The user A is watching a broadcast concert of his preferred Rock & Roll band on the TV screen. A notification pop-up on the TV informs the user A that alternative camera views of the concert presenting each musician are available through a dedicated application on the user A's CD. The user A launches that application which informs the first user that close-ups of the guitarist, bassist, singer and drummer are available. The user A selects the guitarist during the guitar solo and switches to the drummer later in the song. Media content on the TV screen and the companion screen are synchronously rendered.

The Second Embodiment

The user B is interested in hearing video description for the visually impaired, but does not wish to enable that for all the viewers in the room. Using an app on the user B's CD, the user B discovers the various audio tracks available and selects the description track for playing on own CD. The user C is hearing impaired and wants to read closed captions with sound description. Using an app in own CD, the user C discovers the various options for closed captions and selects the one with audio description to display on the user C's CD. The user D prefers voice over-dubs instead of reading Spanish subtitles. The user D has a CD app that has a text-to-voice function. Using own CD, the user D discovers the Spanish subtitles and uses own app to convert the text to voice which the user D listens to via own headphones.

The Third Embodiment

The user D is watching her favorite game show. A notification pop-up on the TV informs the user D that the user D can play along on own tablet through a dedicated tablet app. The user D launches that app and the user D is able to play along with the game show in real time. Each question is presented to the user D on own tablet at the same time as in the show, and the user D's response times are limited to the response time the contestants on the show have. The user D's score is tracked by the app and the user D can also see own ranking among other viewers who are also playing along using the tablet app.

The Fourth Embodiment

The user E launches an OnDemand app on main TV. The TV app requests some demographic information from the user E so that it can make program recommendations for the user E. The TV app suggests a companion tablet app that the user E can download to make data entry easier. The user E downloads and launches the tablet app. The tablet app offers the user E the data entry fields. The user E completes the data entry on own tablet and the information is registered in the TV app. The TV app recommends several OnDemand programs to the user E based on the user E's entries. The user E uses own tablet to select one of the recommended programs to be presented on his TV.

Alternatively, the user E uses own tablet to select one of the recommended programs to be presented on tablet instead of the main TV.

The Fifth Embodiment

The user F is watching favorite program in the living room. The user F has a variety of things the user F needs to do around the house but does not want to miss any of the user F's show. The user F launches an app on own tablet that allows the user F to watch the user F's show on the tablet as well as on TV. The user F continues watching the show on own tablet as the user F moves from room to room.

While the user F is in the laundry room, an emergency alert message is broadcast. The message appears on the user F's tablet. The tablet also informs the user F that there is a video of the event that the user F can view if the user F wishes. The user F selects the video and begins to watch. The user F follows the instructions that the emergency message conveys.

FIG. 58 is a flowchart of hybrid broadcast service processing according to an embodiment of the present invention.

FIG. 58 is a flowchart illustrating an operation of processing the hybrid broadcast service in the companion screen or companion device model.

The PD according to an embodiment of the present invention can receive broadcast signals though a broadcast channel or contents through a broadband channel for the hybrid broadcast service (SE58000). As described above, the PD according to the present embodiment may include a broadcast receiving device 100, that is, a receiver that processes the broadcast signal described with reference to FIGS. 1 to 29. Specifically, the broadcast reception unit 110 described with reference to FIG. 30 may receive broadcast signals or contents. The broadcast reception unit 110 according to the present embodiment may be referred to as a reception module, which may be changed by a designer.

The broadcast signals according to an embodiment of the present invention can include data for the hybrid broadcast service and an EAM. The details are as described above.

The PD according to an embodiment of the present invention can receive a request from a companion device (SE58100). As above described, the broadcast receiving device 100 of FIG. 30 can include a broadcast reception unit 110, an internet protocol (IP) communication unit 130, and a control unit 150. The IP communication unit 130 and the control unit 150 can be referred as a processor. It can be changed according to designer's intention. The processor according to an embodiment of the present invention can receive a request from a companion device. The request can be a request for a device discovery to pair the PD and the CD. After pairing, the PD can receive a request from CD for the five types of functions as described above.

The PD according to an embodiment of the present invention can send at least one of the content or continuous components or files or data or media timeline information or the EAM based on the request (SE58200). As above described, the continuous components or the files or the data are a part of the hybrid broadcast service which is currently selected. The details are as described above.

FIG. 59 is a flowchart of hybrid broadcast service processing according to another embodiment of the present invention.

FIG. 59 is a flowchart illustrating a reverse process of the hybrid broadcast service processing in the PD described with reference to FIG. 58, which corresponds to an operation of processing the hybrid broadcast service in the CD.

The CD according to an embodiment of the present invention can send a request to a receiver (SE59000). The receiver means the PD and the PD according to an embodiment of the present invention can receive broadcast signals though a broadcast channel or contents through a broadband channel for the hybrid broadcast service, wherein the broadcast signals include data for the hybrid broadcast service and an EAM. The details are as described above.

Although not illustrated, the CD may include a transmitter and a receiver for hybrid broadcast service processing. Therefore, the transmitter included in the CD can send a request to the PD. The request can be a request for a device discovery to pair the PD and the CD. After pairing, the CD can send a request to PD for the five types of functions as described above.

The CD according to an embodiment of the present invention can receive at least one of the content or continuous components or files or data or media timeline information or the EAM (Emergency Alert message) based on the request from the receiver (SE59100). As above described, the continuous components or the files or the data are a part of the hybrid broadcast service which is currently selected. The details are as described above.

The present invention is not limited to the features, structures, and effects described in the above embodiments. Furthermore, the features, structures, and effects in each embodiment may be combined or modified by those skilled in the art. Accordingly, it should be interpreted that contents relating to such combinations and modifications are included in the scope of the present invention.

While this invention has been particularly shown and described with reference to preferred embodiments thereof, it will be understood by those skilled in the art that various changes in form and details may be made therein without departing from the spirit and scope of the invention as defined by the appended claims. For example, each component in an embodiment is modified and implemented. Accordingly, it should be interpreted that differences relating to such modifications and applications are included in the scope of the appended claims.

The invention claimed is:

1. A method for processing a hybrid broadcast service, the method comprising:

receiving, by a receiving device, broadcast signals through a broadcast channel or contents through a broadband channel for the hybrid broadcast service, wherein the broadcast signals include data for the hybrid broadcast service and an Emergency Alert message; and sending, by the receiving device, the Emergency Alert message to a companion device, wherein the broadcast signals are generated by formatting input streams that include the data for the hybrid broadcast service and the Emergency Alert message into Data Pipe (DP), Low-Density Parity-Check (LDPC) encoding the Data Pipe according to a code rate, bit interleaving the LDPC encoded Data Pipe, mapping the bit interleaved Data Pipe onto constellations, building a signal frame including the mapped Data Pipe, and modulating data in the built signal frame by an Orthogonal Frequency Division Multiplexing (OFDM) method, wherein the broadcast signals include a preamble symbol inserted in front of the signal frame, and wherein the preamble symbol includes information indicating whether the Emergency Alert message is provided in the signal frame.

2. The method of claim 1, further comprising:

receiving, by the receiving device, a request from the companion device; and when the request is for a device discovery, sending, by the receiving device, a response according to the request to the companion device, wherein the request includes device type information or service type information and the response includes device identification (ID) information and the device type information.

3. The method of claim 2, further comprising:

receiving, by the receiving device, a request for a content identification subscription of the contents from the companion device; and sending, by the receiving device, a response according to the request for a content identification subscription to the companion device, wherein the request for a content identification subscription includes subscription callback URL information and requested subscription duration information and the response includes subscription identification (ID) information.

4. The method of claim 2, further comprising:

receiving, by the receiving device, a content Identification request message of currently running hybrid broadcast service from the companion device; and sending, by the receiving device, a response according to the content Identification request message to the companion device, wherein the content Identification request message includes filtering criterion to directly obtain information of the currently running hybrid broadcast service and the response includes content information filtered by the filtering criterion.

5. The method of claim 2, further comprising:

receiving, by the receiving device, a request of continuous components from the companion device; and sending, by the receiving device, a response according to the request of the continuous components to the companion device, wherein the request of the continuous components includes component identification (ID) information of each continuous component and the response includes the component ID information and access location information of a component.

6. The method of claim 2, further comprising:

receiving, by the receiving device, a request of files or data to the companion device; and sending, by the receiving device, a response according to the request of the files or the data to the companion device, wherein the request of the file or the data includes file identification (ID) information of each file or data identification (ID) information and the response includes the file ID information or the data ID information and access location information of the files or the data.

7. The method of claim 2, further comprising:

receiving, by the receiving device, a request of media timeline information from the companion device; and sending, by the receiving device, a response according to the request of the media timeline information to the companion device, wherein the media timeline information is used to maintain sync between contents of a receiver and the companion device.

8. The method of claim 2, further comprising:

receiving, by the receiving device, a request of a subscription of the Emergency Alert message from the companion device; and sending, by the receiving device, a response according to the request of a subscription of the Emergency Alert message to the companion device.

9. The method of claim 2, further comprising:

receiving, by the receiving device, a request of a subscription of current media playback state information from the companion device; and sending, by the receiving device, a response according to the request of a subscription of current media playback state information to the companion device, wherein the current media playback state information indicates media playback state on a receiver.

10. An apparatus for processing a hybrid broadcast service, the apparatus comprising:

a reception processor configured to receive broadcast signals through a broadcast channel or contents through a broadband channel for the hybrid broadcast service, wherein the broadcast signals include data for the hybrid broadcast service and an Emergency Alert message; and a processor configured to send the Emergency Alert message to a companion device, wherein the broadcast signals are generated by formatting input streams that include the data for the hybrid broadcast service and the Emergency Alert message into Data Pipe (DP), Low-Density Parity-Check (LDPC) encoding the Data Pipe according to a code rate, bit interleaving the LDPC encoded Data Pipe, mapping the bit interleaved Data Pipe onto constellations, building a signal frame including the mapped Data Pipe, and modulating data in the built signal frame by an Orthogonal Frequency Division Multiplexing (OFDM) method, wherein the broadcast signals include a preamble symbol inserted in front of the signal frame, and wherein the preamble symbol includes information indicating whether the Emergency Alert message is provided in the signal frame.

11. The apparatus of claim 10, wherein the processor is further configured to:
receive a request from the companion device, and
when the request is for a device discovery, send a response according to the request to the companion device, and
wherein the request includes device type information or service type information and the response includes device identification (ID) information and the device type information.

12. The apparatus of claim 11, wherein the processor is further configured to:
receive a request for a content identification subscription of the contents from the companion device, and
send a response according to the request for a content identification subscription to the companion device, and
wherein the request for a content identification subscription includes subscription callback URL information and requested subscription duration information and the response includes subscription identification (ID) information.

13. The apparatus of claim 11, wherein the processor is further configured to:
receive a content Identification request message of currently running hybrid broadcast service from the companion device, and
send a response according to the content Identification request message to the companion device, and
wherein the content Identification request message includes filtering criterion to directly obtain information of the currently running hybrid broadcast service and the response includes content information filtered by the filtering criterion.

14. The apparatus of claim 11, wherein the processor is further configured to:
receive a request of continuous components from the companion device, and
send a response according to the request of the continuous components to the companion device, and
wherein the request of the continuous components includes component identification (ID) information of each continuous component and the response includes the component ID information and access location information of a component.

15. The apparatus of claim 11, wherein the processor is further configured to:
receive a request of files or data from the companion device, and
send a response according to the request of the files or the data to the companion device, and
wherein the request of the file or the data includes file identification (ID) information of each file or data identification (ID) information and the response includes the file ID information or the data ID information and access location information of the files or the data.

16. The apparatus of claim 11, wherein the processor is further configured to:
receive a request of media timeline information from the companion device, and
send a response according to the request of the media timeline information to the companion device, and
wherein the media timeline information is used to maintain sync between contents of a receiver and the companion device.

17. The apparatus of claim 11, wherein the processor is further configured to:
receive a request of a subscription of the Emergency Alert message from the companion device, and
send a response according to the request of a subscription of the Emergency Alert message to the companion device.

18. The apparatus of claim 11, wherein the processor is further configured to:
receive a request of a subscription of current media playback state information from the companion device, and
send a response according to the request of a subscription of current media playback state information to the companion device, and
wherein the current media playback state information indicates media playback state on a receiver.

* * * * *

UNITED STATES PATENT AND TRADEMARK OFFICE
CERTIFICATE OF CORRECTION

PATENT NO. : 9,948,416 B2
APPLICATION NO. : 15/114348
DATED : April 17, 2018
INVENTOR(S) : Jinwon Lee et al.

Page 1 of 1

It is certified that error appears in the above-identified patent and that said Letters Patent is hereby corrected as shown below:

In the Claims

Column 83, Lines 23-24, Claim 1:
Change: "wherein the broadcast signals include a preamble symbol inserted in front of the signal frame, and"

To: -- wherein the broadcast signals include a preamble symbol inserted in the front of the signal frame, and --

Column 84, Lines 66-67, Claim 10:
Change: "wherein the broadcast signals include a preamble symbol inserted in front of the signal frame, and"

To: -- wherein the broadcast signals include a preamble symbol inserted in the front of the signal frame, and --

Signed and Sealed this
Eleventh Day of October, 2022

Katherine Kelly Vidal
*Director of the United States Patent and Trademark Office*